US007139860B2

(12) United States Patent
Walker et al.

(10) Patent No.: US 7,139,860 B2
(45) Date of Patent: Nov. 21, 2006

(54) ON CHIP NETWORK WITH INDEPENDENT LOGICAL AND PHYSICAL LAYERS

(75) Inventors: Gary A. Walker, Phoenix, AZ (US); Ned D. Garinger, Tempe, AZ (US); Martin L. Dorr, Chandler, AZ (US); Mark W. Naumann, Tempe, AZ (US)

(73) Assignee: Freescale Semiconductor Inc., Austin, TX (US)

( * ) Notice: Subject to any disclaimer, the term of this patent is extended or adjusted under 35 U.S.C. 154(b) by 446 days.

(21) Appl. No.: 10/207,588

(22) Filed: Jul. 29, 2002

(65) Prior Publication Data

US 2004/0019730 A1      Jan. 29, 2004

(51) Int. Cl.
*G06F 13/36*    (2006.01)
*G06F 5/00*     (2006.01)

(52) U.S. Cl. ................ 710/306; 710/45; 710/311
(58) Field of Classification Search .............. 710/306, 710/309, 305, 307, 106, 45, 129, 311
See application file for complete search history.

(56) References Cited

U.S. PATENT DOCUMENTS

| | | | | |
|---|---|---|---|---|
| 4,400,771 | A * | 8/1983 | Suzuki et al. ............... | 711/151 |
| 6,108,739 | A * | 8/2000 | James et al. ................ | 710/113 |
| 6,122,680 | A * | 9/2000 | Holm et al. ................. | 710/52 |
| 6,249,528 | B1 * | 6/2001 | Kothary ...................... | 370/466 |
| 6,317,804 | B1 * | 11/2001 | Levy et al. ................. | 710/305 |
| 6,574,688 | B1 * | 6/2003 | Dale et al. ................... | 710/52 |
| 6,633,580 | B1 * | 10/2003 | Tørudbakken et al. ...... | 370/461 |
| 6,715,023 | B1 | 3/2004 | Abu-Lebdeh et al. | |
| 6,725,307 | B1 * | 4/2004 | Alvarez et al. ............. | 710/110 |
| 6,748,479 | B1 * | 6/2004 | Sano et al. .................. | 710/316 |
| 6,751,698 | B1 | 6/2004 | Deneroff et al. | |
| 6,944,152 | B1 * | 9/2005 | Heil ............................ | 370/360 |
| 2002/0172221 | A1 * | 11/2002 | Dale et al. .................. | 370/466 |
| 2003/0217214 | A1 * | 11/2003 | Calvignac et al. .......... | 710/305 |
| 2004/0215868 | A1 | 10/2004 | Solomon et al. | |

OTHER PUBLICATIONS

Levy, Markus, "Motorola's MPC8540 Parts Ocean, Smart Peripherals and e500 Core Communicate Via Crossbar Switch," Microprocessor Report, Dec. 17, 2001, pp. 1-4.
Guerrier, Pierre et al., "A Generic Architecture for On-Chip Packet-Switched Interconnections," Universite Pierre et Marie Curie, 1999, pp. 1-7.
Bouvier, Dan, "RapidIO™, An Embedded System Component Network Architecture,", Mar. 2000, pp. 1-19.

(Continued)

*Primary Examiner*—John R. Cottingham
(74) *Attorney, Agent, or Firm*—Gary R. Stanford

(57) ABSTRACT

An OCN with independent logical and physical layers for enabling communication among integrated processing elements, including ports, bus gaskets and a physical layer interface. Each bus gasket includes a processor element interface and a port interface. Each processor element interface of at least two bus gaskets operates according to a first logical layer protocol. Each port interface operates according to a consistent port interface protocol by sending transaction requests and receiving acknowledgements and by sending and receiving packet datums via the corresponding port. The physical layer interface transfers packets between the ports and includes an arbiter and an interconnect coupled to each port. Additional bus gaskets may be added that operate according to a second logical layer protocol which may or may not be compatible with the first. Any bus gasket may be added that is configured to communicate using multiple logical layer protocols.

26 Claims, 40 Drawing Sheets

OTHER PUBLICATIONS

RapidIO Trade Association, RapidIO™ Interconnect Specification, Rev. 1.2, Jun. 2002, RapidIO Trade Association, pp. i-xxxvi and I-1-IV124.

Sonics Inc., Product Brief, "SiliconBackplane™ MicroNetwork," 2002. 2 pages.

Sonic Inc., "SiliconBackplane MicroNetwork," from http://www.sonicsinc.com/sonics/products/siliconbackplane, Copyright 2000-2002, Sonics Inc., 5 pages.

Sonics Inc., "Sonic μNetworks Technical Overview," Jan. 2002, pp. i-viii and pp. 1-52.

* cited by examiner

| NIDLE | | | | | | | | |
|---|---|---|---|---|---|---|---|---|
| 71:70 | 69:66 | 65 | 64 | 63:59 | 58:57 | 56:51 | 50:42 | 41:0 |
| CLS 0 | RSV 0 | TYPE 0 | WR 0 | REQ 00000 | PRIO 0 | SRCID 0 | SIZE 0 | ATTR/ADDR[44:3] 0 |
| | | | | RSV 0 | | | | |

| NREAD_R | | | | | | | | |
|---|---|---|---|---|---|---|---|---|
| 71:70 | 69:66 | 65 | 64 | 63:59 | 58:57 | 56:51 | 50:42 | 41:0 |
| CLS 0 | TAG – | TYPE 0 | WR 1 | REQ 00001 | PRIO 0-2 | SRCID – | SIZE – | RATTR/ADDR[44:3] 0 |

*FIG.39*

| NCFGREAD_R | | | | | | | | | |
|---|---|---|---|---|---|---|---|---|---|
| 71:70 | 69:66 | 65 | 64 | 63:59 | 58:57 | 56:51 | 50:42 | 41:29 | 28:0 |
| CLS 0 | TAG – | TYPE 0 | WR 1 | REQ 00011 | PRIO 0-2 | SRCID – | SIZE – | RSV 0 | INDEX[31:3] – |

*FIG.40*

| NRESPONSE_D (WITH DATA) | | | | |
|---|---|---|---|---|
| 71:70 | 69:66 | 65 | 64 | 63:0 |
| CLS 0 | TAG – | TYPE 1 | MOD 0 | DATA[63:0] – |
| RSV 0 | | ERROR – | INV – | DATA[63:0] – |

*FIG.41*

| NRESPONSE (WITHOUT DATA) |||||||
|---|---|---|---|---|---|---|
| 71:70 | 69:66 | 65 | 64 | 63:62 | 61:16 | 15:0 |
| CLS 0 | TAG - | TYPE 1 | MOD 1 | RSP TYPE - | RSV 0 | STATUS - |

*FIG. 42*

| NWRITE |||||||||
|---|---|---|---|---|---|---|---|---|
| 71:70 | 69:66 | 65 | 64 | 63:59 | 58:57 | 56:51 | 50:42 | 41:0 |
| CLS 0 | RSV 0 | TYPE 0 | WR 0 | REQ 00000 | PRIO 0-2 | RSV 0 | SIZE - | ATTR/ADDR[44:3] 0 |
| RSV 0 | ERROR - | INV - | | DATA[63:0] |||||

*FIG. 43*

| NWRITE_R |||||||||
|---|---|---|---|---|---|---|---|---|
| 71:70 | 69:66 | 65 | 64 | 63:59 | 58:57 | 56:51 | 50:42 | 41:0 |
| CLS 0 | TAG - | TYPE 0 | WR 1 | REQ 00000 | PRIO 0-2 | SRCID - | SIZE - | ATTR/ADDR[44:3] 0 |
| RSV 0 | ERROR - | INV - | | DATA[63:0] - |||||

*FIG. 44*

| NCFGWRITE_R ||||||||||
|---|---|---|---|---|---|---|---|---|---|
| 71:70 | 69:66 | 65 | 64 | 63:59 | 58:57 | 56:51 | 50:42 | 41:29 | 28:0 |
| CLS 0 | TAG - | TYPE 0 | WR 1 | REQ 00010 | PRIO 0-2 | SRCID - | SIZE - | RSV 0 | INDEX[31:3] - |
| RSV 0 | ERROR - | INV - | | DATA[63:0] - ||||||

*FIG. 45*

| NMESSAGE_R ||||||||||||||
|---|---|---|---|---|---|---|---|---|---|---|---|---|
| 71:70 | 69:66 | 65 | 64 | 63:59 | 58:57 | 56:51 | 50:42 | 41:37 | 36:31 | 30:27 | 26:19 | 18:11 | 10:0 |
| CLS 0 | TAG - | TYPE 0 | WR 1 | REQ 00100 | PRIO 0-2 | SRCID - | SIZE - | MLEN - | MSIZE - | MSEG - | MBOX - | MSLOT - | RSV 0 |
| RSV 0 | ERROR - | INV - | DATA[63:0] - |||||||||||

FIG. 46

| NDOORBELL_R ||||||||||
|---|---|---|---|---|---|---|---|---|
| 71:70 | 69:66 | 65 | 64 | 63:59 | 58:57 | 56:51 | 50:32 | 31:0 |
| CLS 0 | TAG - | TYPE 0 | WR 1 | REQ 00101 | PRIO 0-2 | SRCID - | RSV 0 | INFO[31:0] - |

FIG. 47

| NUSERDEFINED ||||||
|---|---|---|---|---|---|
| 71:70 | 69:66 | 65 | 64 | 63:59 | 58:0 |
| CLS 0 | UD - | TYPE 0 | WR 0 | REQ 00110 | USER DEFINED - |
| USER DEFINED - |||||||

FIG. 48

| NUSERDEFINED_R ||||||
|---|---|---|---|---|---|
| 71:70 | 69:66 | 65 | 64 | 63:59 | 58:0 |
| CLS 0 | TAG - | TYPE 0 | WR 1 | REQ 00110 | USER DEFINED - |
| USER DEFINED - |||||||

FIG. 49

ON CHIP NETWORK WITH INDEPENDENT LOGICAL AND PHYSICAL LAYERS

CROSS-REFERENCE TO RELATED APPLICATION(S)

The present application is based on U.S. application entitled"On Chip Network," application Ser. No. 10/207,298 filed Jul. 29, 2002; U.S. application entitled"On Chip Network That Maximizes Interconnect Utilization Between Processing Elements," application Ser. No. 10/207,459 filed Jul. 29, 2002; U.S. application entitled"Scalable On Chip Network," application Ser. No. 10/207,600 filed Jul. 29, 2002; and U.S. application entitled"On Chip Network With Memory Device Address Decoding," application Ser. No. 10/207,609 filed Jul. 29, 2002; all of which are commonly assigned to the same assignee and are hereby incorporated by reference in their entireties.

FIELD OF THE INVENTION

The present invention relates to communications for system on chip (SOC) configurations, and more particularly to a network with independent logical and physical layers that enables and manages data operations between multiple processing elements.

DESCRIPTION OF RELATED ART

A market trend that has been observed is to provide an increasing number of integrated processing cores on a single chip. An interconnect system must be provided to enable communication between each core. Although the cores may be homogeneous (each of the same type), the interconnect system must often support on-chip communications between heterogeneous processing elements. Current System On Chip (SOC) configurations are designed around shared bus communication mechanisms. These buses are bridges to other shared bus structures. A few examples include IBM's CoreConnect bus, Motorola's 60X bus, ARM's Advanced Microcontroller Bus Architecture (AMBA), and the industry standard Peripheral Component Interconnect (PCI) bus.

Typical bus architectures, including those listed above, are very similar in structure and share a set of problematic characteristics. The bus is loaded by each of the devices on the bus. As additional masters and slaves are connected to the bus, the loading on the bus and the length of the bus wires increase. As these factors increase, the maximum operable frequency of operation decreases. The bus topology is limited to a single set of wires, one each for the address, control, read data and write data. The result is limited concurrent operation capabilities, concurrency between address and data tenures, and concurrency between read and write data tenures. The protocol requires a handshake between the source of the transaction and the destination of the transaction during the address tenure, as well as a handshake during the data tenure. These handshakes can limit the maximum frequency of operation. The protocol is dependent on specific signals and timing relationships to define the type of transactions. New transaction types can not be added without changing the protocol operation of all devices on the bus.

Every time a new processing element type was added for a new application, the bus or the processor interface of a prior system had to be re-designed. SOC designs often required two or more different processor types, which were incompatible and not designed to directly communicate with each other. Each processor type was typically designed with its own protocol to optimize its originally-intended functions, and the corresponding bus structure was designed around the processor interface in order to maximize transaction throughput and/or optimize processor operation. The protocol addressed certain needs of the particular processor, such as, for example, cache coherency and specific bus signaling. Such specific processor and bus systems were typically designed around a single bus master and multiple slave devices. For SOC designs, however, it is desired to enable communication among multiple masters. It was possible to use existing bus structures, but this resulted in a significant performance penalty for the overall system and/or particular processors. The PCI bus, for example, limited the structure underneath to compatibility with a particular protocol that had to be met by all devices coupled to the bus. A possible solution was the use of a switch fabric. The existing switch fabric architectures, however, were complicated and expensive to integrate onto a single chip.

Since SOC designs are more common, it is desired to provide an interconnect system that is flexible and scalable to be employed in future generations rather than having to start from scratch and build a custom bus for each new application. It is desired to decrease design cycle time, to enable substantial re-use of previous generations, to allow independent design teams to develop processor cores, to support multiple technologies and foundries, and to provide scalability for both concurrency and frequency depending upon the needs of the particular application. It is desired to significantly reduce cycle time and to lower cost of each new generation appreciably by reducing the engineering input required for each specific project or application.

BRIEF DESCRIPTION OF THE DRAWINGS

The present invention is illustrated by way of example and not limitation in the accompanying figures, in which like references indicate similar elements, and in which:

FIGS. 38–49 are tabular diagrams illustrating exemplary packet formats defined for the logical layer, where each packet comprises one or more datums as specified.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention. Only those details pertinent to a complete understanding of the invention are included and described.

DETAILED DESCRIPTION OF EMBODIMENT(S) OF THE INVENTION

As used herein, the terms "assert" and "negate" are used when referring to the rendering of a signal, status bit, or similar apparatus into its logically true or logically false state, respectively. For positive logic, the logically true state is a logic level one (1) and the logically false state is a logic level zero (0). And for negative logic, the logically true state is a logic level zero and the logically false state is a logic level one. Signal names conform to positive logic. A number with a "b" appended thereto indicates that the number is represented in binary format. A number with an "h" appended thereto indicates that the number is represented in hexadecimal format. A number without an appended letter indicates decimal unless otherwise specified.

Figure 1:
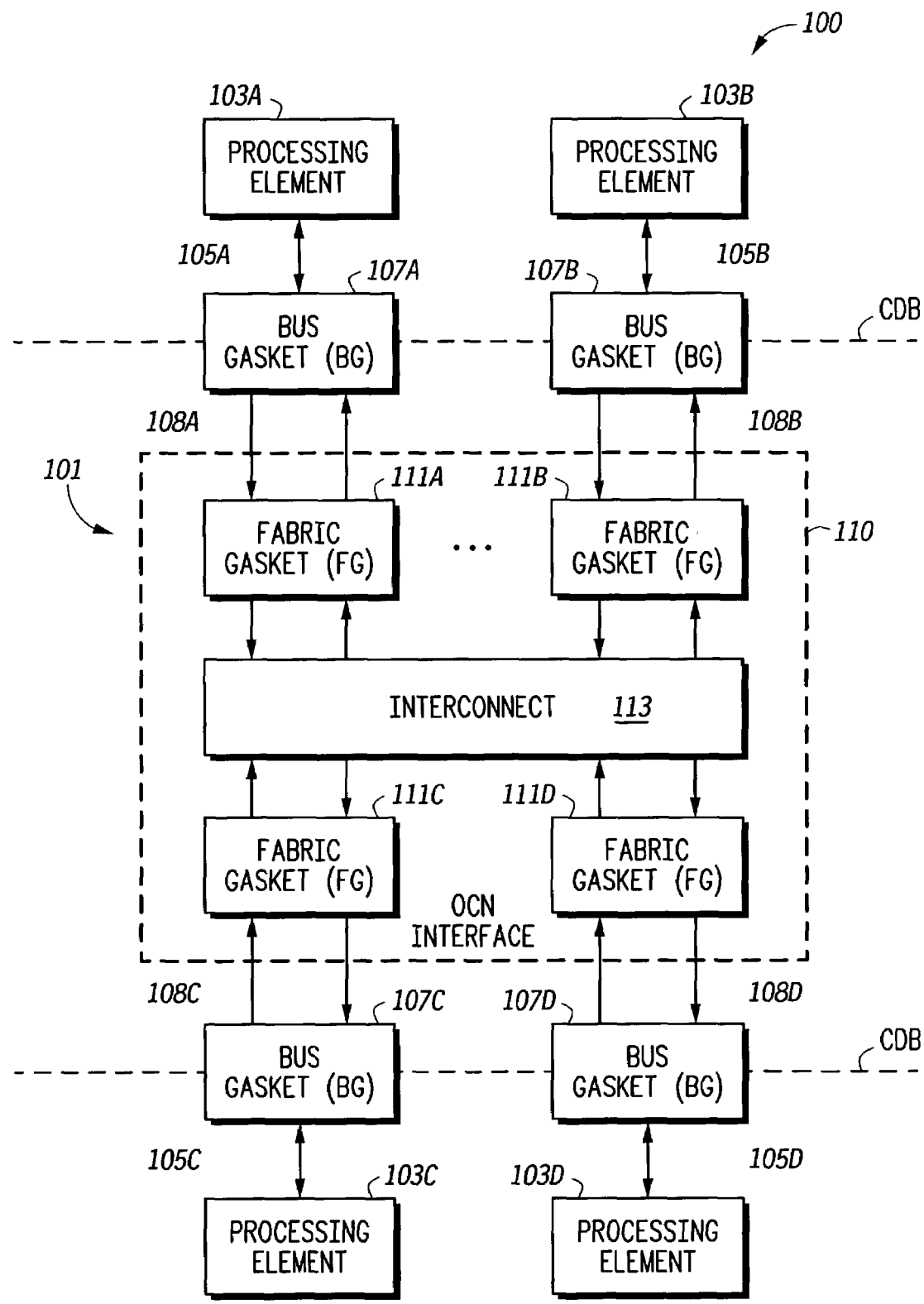
FIG. 1 is a simplified block diagram of an on chip communication system including an on chip network (OCN) implemented according to an embodiment of the present invention that enables communication among one or more processing elements.

FIG. 1 is a simplified block diagram of an on chip communication system 100 including an on chip network (OCN) 101 implemented according to an embodiment of the present invention that enables-communication among one or more processing elements 103. The processing elements are referred to collectively as 103 and individually as 103A, 103B, 103C, 103D, etc. Although only four processing elements 103 are shown, it is understood that any practicable number of processing elements 103 may be included. The entire communication system 100 may be implemented on a single integrated circuit (IC) with a common substrate, although chip to chip configurations are also contemplated. The processing elements 103 may incorporate processors, microcontrollers, microprocessors (processors) of the same type (homogeneous configuration) or of different types (heterogeneous configuration). Examples of microprocessors include PowerPC® processors by Motorola, x86 or Pentium® class processors by Intel, AMD-Kx, Athlon™ or Duron™ processors by AMD, etc. In general, the processing elements 103 are control or compute processor subsystems that contain or include their own peripherals and memory. The peripherals and memory of a given processing element may or may not be shared with other processing elements. A processing element may or may not include separate processors, but instead may be implemented to perform any type of designated function or operation, such as, for example, a network interface controller (NIC). Each processing element may be programmable or non-programmable.

Each processing element 103 interfaces the OCN 101 via a corresponding direct interface or via a corresponding bus 105, shown as bus 105A for processing element 103A, 105B for processing element 103B, 105C for processing element 103C, and 105D for processing element 103D. Each bus 105 is separate and implemented according to the bus interface of the corresponding processor element 103. Examples of buses include IBM's CoreConnect, ARM's Advanced Microcontroller Bus Architecture (AMBA), the Peripheral Component Interconnect (PCI) bus, the Motorola 60X bus, etc. A bus gasket 107 is provided for each processing element 103 and corresponding bus, including a bus gasket 107A for processing element 103A, a bus gasket 107B for processing element 103B, a bus gasket 107C for processing element 103C, and a bus gasket 107D for processing element 103D. Each bus gasket 107 serves as a conversion interface between a specific bus type and a corresponding port 108 of an interconnect fabric 110. In particular, a port 108A interfaces bus gasket 107A, a port 108B interfaces bus gasket 107B, a port 108C interfaces bus gasket 107C, and a port 108D interfaces bus gasket 107D. Each port 108 operates according to a common OCN interface, so that each bus gasket 107 converts a specific bus protocol and signaling to the OCN interface.

Although a separate bus gasket 107 may need to be designed for each type of processing element 103, all of the bus gaskets 0.107 are designed to the common OCN interface rather than to each other or a complicated bus structure. The interconnect fabric 110 and the bus gaskets 107 collectively form the OCN 101. A Clock Domain Boundary (CDB) exists within the bus gaskets 107, which perform clock domain transition and data rate adaption. The OCN 101 is synchronous within the CDB on the side of the interface fabric 110. The interconnect fabric 110 may include a fabric gasket 111 for each port 108, including a fabric gasket 111A for the port 108A, a fabric gasket 111F for the port 108B, a fabric gasket 111C for the port 108C, and a fabric gasket 111D for the port 108D. Each fabric gasket 111 includes buffering and/or registers, as further described below, and is connected to a central interconnect 113. Transactions may be generated by the processing elements 103 either directly (integrated) or via a corresponding bus gasket. Each bus gasket 107 converts transactions into packets, which are transmitted through the interconnect 113 as a series of one or more datums. Each datum is a slice of a packet configured to synchronously traverse the interconnect fabric 110 according to the OCN protocol, as further described below.

The OCN interface conforms to an OCN protocol that incorporates a consistent interface to the interconnect fabric 110 that allows the interconnect fabric structure and the number of pipeline stages to be independent of the type and number of processing elements 103 connected to it. The OCN interface and protocol are designed to be reusable for any application requiring multi-processor communication. In this manner, the interconnect fabric 110 can be tuned for each application while allowing reuse of processing element configurations. The OCN interface includes both a physical and logical layer protocol. The physical layer protocol defines how to pass messages between the processing elements 103. The logical layer protocol defines the actual messages and packet formats. The physical and logical layers are independent of each other.

Each processing element and bus gasket pair collectively form a port interface to the interconnect fabric 110. A processing element may be implemented to be compatible with the OCN protocol and interface directly with the interconnect fabric 110. In this case, a corresponding bus gasket is not necessary or is integrated in whole or part within the compatible processing element. It is appreciated that a compatible port interface does not convert transactions but still conforms to the consistent port interface protocol and communicates using packets via the interconnect fabric 110.

Figure 2:
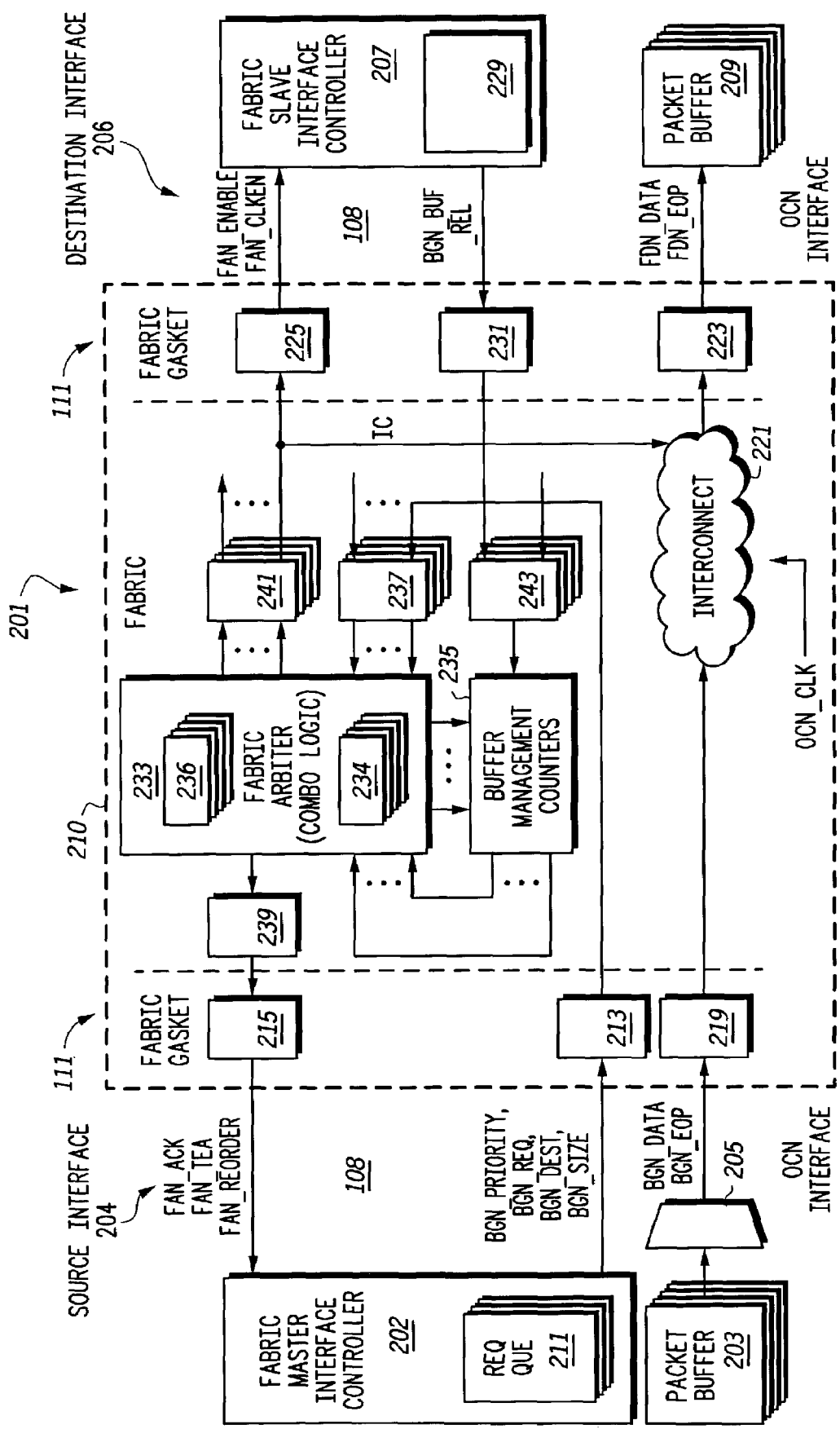
FIG. 2 is a more detailed block diagram of an exemplary embodiment of the physical layer of the OCN of FIG. 1 depicting a single source interface on the left and a single destination interface on the right of a given port or of a pair of ports.

FIG. 2 is a more detailed block diagram of an exemplary embodiment of the physical layer of the OCN 101, shown as OCN 201, depicting a single source interface 204 on the left and a single destination interface 206 on the right of a given port 108 or of a pair of ports 108. In a full system, each port interface includes source and destination interfaces 204, 206 to enable communications with the interconnect fabric 110. Each port interface comprises a bus gasket or an integrated processing element. In this embodiment, the port interface includes a Fabric Master Interface Controller (FMIC) 202, an output packet buffer 203 and buffer select logic 205 as the source interface 204, and a Fabric Slave Interface Controller (FSIC) 207 and an input packet buffer 209 as the destination interface 206. The interconnect fabric 110 is shown as an exemplary interconnect fabric 210. In the embodiment shown, the fabric gasket 111 is shown as several sets of synchronous flip-flop sets or register sets (herein referred to as register sets) on both source and destination interfaces of the port of the interconnect fabric 210. Each register set of the interconnect fabric 210 includes one or more flip-flops or the like, where each flip-flop has a clock input, a data input and a data output. Each clock input of each flip-flop receives a master interface clock signal OCN_CLK for synchronous operation. The data provided to a flip-flop input is asserted at the flip-flop output for every cycle of the OCN_CLK clock. The number of flip-flops in each register set is determined by the number of data signals or bits being transferred by that register set. In this manner, one or more bits are synchronously clocked through respective register sets for each cycle of the OCN_CLK signal. Each register set implements a pipeline stage that is added to achieve a desired latency to support a target frequency level. In addition, active drive elements can be added between register sets to achieve a target frequency level.

The FMIC 202 initiates a transaction by asserting request information from its request queue 211 to inputs of a first register set 213 of the fabric gasket 111. The request information includes signals bgn_priority, bgn_req, bgn_dest and bgn_size, as further described below, where "n" is an integer denoting a port number of the interconnect fabric 210. Acknowledgement information is received from outputs of another register set 215 of the fabric gasket 111 coupled to inputs of the FMIC 202. The acknowledgement information includes signals fan_ack, fan_tea, and fan_reorder. The collective signals of the request information and the acknowledgment information form an arbitration interface for each port 108.

When a transaction is authorized or acknowledged, successive datums are asserted at an output of the buffer select logic 205 to inputs of another register set 219 of the fabric gasket 111. The outputs of the register set 219 are coupled to an interconnect 221 implemented within the interconnect fabric 210, which forwards the data to a selected destination. The interconnect 221 of OCN 201 corresponds to the interconnect 113 of OCN 101. Each datum is transported via a signal bgn_data at the output of the buffer select logic 205. A sideband signal bgn_eop is also provided by the select logic 205 denoting the End Of Packet (EOP). Although the size information is provided to a fabric arbiter 233 within the interconnect fabric 210, the destination and an interconnect 221 are not provided with the size of the packet. The EOP signals are asserted coincident with the last datum of each packet to denote the end of a packet. A data output of the interconnect 221 is coupled to inputs of another register set 223 of the fabric gasket 111, which has its outputs coupled to corresponding inputs of the input buffers 209. Datums are transferred via the datapath between the interconnect 221 and the input packet buffer 209 on a signal fdn_data and a sideband signal fdn_eop indicating the EOP. The fabric gasket 111 includes another register set 225 asserting output signals fan_enable and fan_clken to a data flow control input of the FSIC 207. The FSIC 207 includes buffer management logic 229, which tracks the number of input packet buffers 209 that are available to receive the datums of each packet. The buffer management logic 229 asserts a buffer release signal bgn_buf_rel to a register 231 of the fabric gasket 111 to release a buffer.

It is noted that the interconnect 221 is implemented with a selected maximum datum width for each configuration corresponding to a maximum datum width for the packets. The maximum datum width is selected to include a minimum number of bits necessary to support all of the logical layer protocols to be used in the selected configuration, and thus is designed to support the logical layer protocol requiring the most datum bits. Nonetheless, any number of ports 108 may communicate with each other using one or more different logical layer protocols that utilize less than the selected maximum datum width of the interconnect 221, where the remaining datum bits of the interconnect 221 are simply ignored by those ports. The "size" of packets using this different logical layer protocol refers to the number of datums of each packet regardless of the particular datum width employed. Although protocols using smaller datum widths than the selected maximum datum width may be viewed as not utilizing the full bandwidth of the interconnect 221, the ability to communicate using smaller datum widths than the selected maximum data width of the interconnect 221 provides significant design flexibility benefits. For example, any number of ports may be designed according to a programmed logical layer protocol that uses a smaller data interface and that employs a reduced number of bits as compared to other ports in the system.

The OCN 201 includes a fabric arbiter 233 that controls data flow and transactions through the interconnect fabric 210. Request information from the FMIC 202 is clocked through the register set 213 and provided to an input of a request register set 237, which asserts its outputs to a request input of the fabric arbiter 233. The fabric arbiter 233 includes multiple request queues 234, each for enqueing outstanding transaction requests for each port. The fabric arbiter 233 also includes one or more packet datum counters 236, each for tracking the progress of a data packet being transferred in the interconnect 221. In a particular configuration, for example, a packet datum counter 236 is programmed with the size of a packet (number of datums), and the counter is decremented for each OCN_CLK cycle as the datums propagate through the interconnect 221 so that the fabric arbiter 233 can determine precisely when the transfer will complete. The fabric arbiter 233 includes arbitration logic that performs arbitration according to a selected arbitration scheme, and provides the acknowledgement information from an acknowledge output to inputs of a register set 239. The outputs of the register set 239 are coupled to inputs of the register set 215 for conveying the acknowledgement to the FMIC 202.

The fabric arbiter 233 provides datum "flow control" information (e.g., route, steering, or data path control information) to inputs of a register set 241, which provides portions of the flow control information to the interconnect 221 and to the register set 225. The register set 225 receives and forwards data enable signals including the fan_enable and fan_clken signals to the FSIC 207. The datum flow control signals include interconnect control (IC) signals to the interconnect 221 including data path enable signals to establish a data path through the interconnect 221 between the acknowledged source and the destination indicated by the request transaction. The collective signals bgn_data, bgn_eop, fdn_data, fdn_eop and fan_enable form a data interface of the ports of the interconnect fabric 210.

The output of the register 231 is coupled to an input of a corresponding register of a register set 243, which has its output coupled to buffer management logic and counters 235. The fabric arbiter 233 has a set of buffer management inputs and outputs for controlling, programming and reading the counters of the buffer management logic and counters 235. The bgn_buf_rel signal and the buffer management logic 229 and the buffer management logic and counters 235 collectively form a buffer control mechanism for each port 108.

The fabric arbiter 233 is shown as a central arbiter within the interconnect fabric 210. In an alternative embodiment, the functions of the fabric arbiter 233 may be distributed among the ports, where each port includes source arbitration logic and destination arbitration logic.

The signals of the OCN interface employed by the OCN 201 are now described. The signals shown in FIG. 2 define the source and destination interface for a single OCN port or of two ports. The FMIC 202 of a source port generates transaction requests to the fabric arbiter 233 for packet transfers. These packet transfers are transmitted from the packet buffer 203 of the source port across the interconnect fabric 210 and the interconnect 221 to the input packet buffer 209 of a specified destination port. The signals can be separated into two functional groups, including requests and data. The request group is only associated with the source and includes the bgn_priority, bgn_dest, bgn_size, bgn_req, fan_ack, fan_tea, and fan_reorder signals. The data signal group includes signals bgn_data and bgn_eop for the source portion and fdn_data, fdn_eop, fan_enable, fan_clken, and bgn_buf_rel, for the destination portion. As described above, the signal names include "n", which is the port number. The number of ports depends upon the particular configuration. In one embodiment, the maximum number of ports is 64 (0–63), where the fabric arbiter 233 is defined to be port 0. The two-letter prefix for each signal name denotes the source of the signal. As shown, for example, "bg" denotes the bus gasket 107, "fa" denotes fabric arbiter 233, and "fd" denotes the fabric datapath through the interconnect 221.

The bgn_priority signal denotes the priority of the requested transfer. Priority is the relative importance of a transaction or packet. A subsequent higher priority transaction or packet can be serviced or transmitted before one of lower priority. The priority levels are used to define transaction flows. A transaction flow is made up of request transaction that has a priority level of N and a response transaction that has a priority level of N+1. In this manner, the response transaction has a higher priority level than the corresponding request transaction for a given operation. In one embodiment, four priority levels are defined, including a lowest priority level 0 [00b], a low priority level 1 [01b], a high priority level 2 [10b] and a highest priority level 3 [11b]. The numbers in brackets "[ ]" are binary numbers indicating the level of each bit for a two-bit bgn_priority signal. Request transactions may have priority levels 0–2 and response transactions have priority levels 1–3. Additional bits may be included to define a greater number of priority levels.

The bgn_dest signal indicates the port address or identifier of the destination port, having a number of bits commensurate with the total number of ports included. A six-bit word allows for 64 unique ports. The fabric arbiter 233 uses the bgn_dest signal to verify that the appropriate resources, interconnect 221 (data path) and input packet buffer 209 at the target destination are available before acknowledging the request. The arbiter 233 does a full decode on the bgn_dest signal. If an unimplemented destination address is requested to the fabric arbiter 233, it is treated as a port with no available buffers so that the request times out and the bgn_tea signal is asserted in the embodiment shown.

The bgn_size signal indicates the size of the packet for the requested packet transfer. The packet size is defined as the number of datums in the packet. The packet size also corresponds to the number of OCN_CLK cycles for the packet to propagate past any given point in the interconnect fabric 210. The fabric arbiter 233 uses the packet size to schedule transactions in order to maximize utilization of the interconnect 221 by reducing or otherwise eliminating dead cycles. In one embodiment, the bgn_size signal is a 6 bit word for a total of 63 datums per packet, where 000000b indicates 1 datum and 111110b indicates 63 datums. The fabric arbiter 233 uses this information to determine when the current packet transfer is completed so that it is able to acknowledge the next packet transfer without dead cycles. In particular, the fabric arbiter 233 programs one of the packet datum buffers 236 with the size of an acknowledged packet, and the programmed packet data counter 236 counts down the number of OCN_CLK clock cycles from the beginning of the transfer to determine the precise clock cycle in which the transfer is complete. The fabric arbiter 233 acknowledges the very next transaction to the same destination, if any, to begin at a calculated OCN_CLK cycle so that that data pipeline remains full and dead clock cycles are eliminated.

In some conditions, the FMIC 202 may start a transaction before the full size is known. This is done by setting the size to 111111b to indicate a "cut-through" transaction. In this case, the fabric arbiter 233 does not count down the size, but instead waits for assertion of the bgn_eop signal to determine when the next cycle can be acknowledged. Transactions that utilize the cut-through feature may result in dead cycles between the cut-through transaction and the next transaction. The dead cycles are a result of the fabric arbiter 233 sampling the bgn_eop signal before performing the next arbitration and the number of dead cycles is dependent on the arbitration latency.

The bgn_req signal is a request signal asserted by the FMIC 202 to indicate that the request is active or valid. When asserted, for example, the bgn_req signal indicates to the fabric arbiter 233 that there is a valid request. The request information includes the signals bgn_priority, bgn_dest, and bgn_size.

The fan_ack signal indicates that the request at the head of a request queue 211 has been acknowledged and that the first datum of a packet has been transmitted. The fan_ack signal is asserted for one cycle of OCN_CLK for each requested packet transfer. When the fan_ack signal is sampled asserted by the FMIC 202, it drives the second datum to the interconnect fabric 210, followed by the next datum on the next clock until all datums have been transferred. If the packet contains only a single datum, then the FMIC 202 drives the first datum of the packet of the next request in the request queue when the fan_ack signal is sampled asserted.

The fan_tea signal is asserted by the fabric arbiter 233 when an error is detected with a request by the FMIC 202, such as when a time out due to the requested destination being blocked is detected. When the fan_tea signal is asserted, it indicates to the source of the transaction that the requested transaction could not be completed and is to be removed from the request queue. If the fan_tea and fan_ack signals are asserted simultaneously, the error condition is not valid and is ignored.

The fan_reorder signal is asserted by the fabric arbiter 233 to the FMIC 202 to indicate that a request in the request queue 211 of that FMIC 202 is to be re-ordered to the front of the request queue. The fan_reorder signal includes one or more bits that collectively indicate which request should be re-ordered to the front of the queue 211. In one embodiment, the fan_reorder includes 3 bits limiting the depth of the request queue 211 to a maximum of eight, where a value of 000b indicates that no re-ordering is required. The request that is indicated is moved to the front of the queue and the remaining requests that are jumped over are shifted back in the request queue 211 up to the vacated position. For example, a value of 001b indicates that the second positioned request in the request queue 211 is to be re-ordered to the front and that the request in the front of the request queue 211 is moved to the second position. A value of 010b indicates that the third positioned request in the request queue 211 is to be re-ordered to the front, that the request in the second position is moved to the vacated third position, and that the request in the front of the request queue 211 is moved to the second position. A value of 011b indicates that the fourth positioned request in the request queue 211 is to be re-ordered to the front, that the request in the third position is moved to the vacated fourth position, that the request in the second position is moved to the third position, and that the request in the front of the request queue 211 is moved to the second position, and so on. The minimum depth of the request queue 211 is set by the number of priority levels.

The fdn_data signal includes each datum driven from the source into register set 219 and into the interconnect 221 when a transaction request is acknowledged. The number of bits of the fdn_data signal depends upon the particular configuration and system needs, and may be any selectable size to transfer any number of bits per datum as desired to support the logical layer protocols employed in a given configuration. In one embodiment, for example, the fdn_ data signal includes 72 bits corresponding to a maximum datum width for the interconnect 221. The datum contains data and optionally any defined in-band signals, such as header information or the like. As described previously, however, logical layer protocols may be defined to used datum widths less than the maximum selected width (e.g., 30 bits) where the remaining datum bits of the interconnect 221 are not used or otherwise ignored.

The bgn_eop signal from the source is a sideband signal that indicates when the last datum of a packet is being driven into the register set 219. This signal is also used by the fabric arbiter 233 to determine the end of a cut-through transaction when the bgn_size signal indicates a cut-through packet (e.g., 111111b).

The fdn_data signal incorporates the datum driven from the interconnect 221 to the destination port via any intermediate register sets. The size and content of the fdn_data signal is determined by the particular processing element needs and configuration and is typically the same as the bgn_data signal at a given port. The fdn_data and bgn_data signals of a port correspond to the datum width selected for that port, where different port widths may be implemented for different processing elements of a given fabric. The fdn_eop signal indicates that the last datum of a packet is valid at the destination port and corresponds with the bgn_eop signal. The fan_enable signal indicates to the FSIC 207 that the fdn_data and fdn_eop signals are valid at the destination.

The fan_clken signal indicates to the FSIC 207 that it should enable its clock circuitry. The destination portion of a port can be placed into a low power state whenever data is not being transmitted to that destination. The destination could use the fan_enable signal from fabric arbiter 233 to enable its clock circuitry, but this would require that the fan_enable signal be set up to the falling edge of the clock, which would otherwise create a difficult timing path. To alleviate this difficult timing path, the fabric arbiter 233 informs the destination to enable the clock circuitry by asserting the fan_clken signal one clock cycle before the fan_enable signal is driven to the destination. This allows the fan_clken signal to be sampled before it is used to enable the clocks. The destination circuitry is responsible for tuning off the clock when fan_clken is de-asserted and when the destination determines that the packet transfer processing is complete. The destination power management may be implemented to be enabled or disabled on a per destination basis. When the destination power management is disabled, the fan_clken signal is asserted.

After initialization (e.g., power on or reset), each destination asserts its bgn_buf_rel signal for the number of OCN_CLK cycles equal to the number of input packet buffers 209 that the destination port has available, which initializes the corresponding input buffer counter of the buffer management logic and counters 235 to the correct value. The buffer management logic and counters 235 tracks the available input packet buffers 209 at each destination. In particular, each counter of the buffer management logic and counters 235 decrements its count of available buffers for a corresponding destination port each time that a transaction request is acknowledged to that destination port and increments the count for each OCN_CLK cycle that the corresponding bgn_buf_rel signal is asserted. At each destination port, the buffer management logic 229 decrements its count of available input buffers each time a packet is received. When that destination has completed the transaction and no longer requires the information in the transaction buffer, and decides that the transaction buffer should be made available for future packets, it increments its count and indicates to the buffer management logic and counters 235 by asserting the bgn_buf_rel signal for one OCN_CLK cycle. The bgn_buf_rel signal may be asserted by the buffer management logic 229 at any time to inform the fabric arbiter 233 that the destination has an additional transaction buffer available. In the illustrated embodiment, the buffer management logic 229 is not allowed to withdraw an input buffer once made available. Nonetheless, after use of a buffer, the buffer management logic 229 may determine not to assert the bgn_buf_rel signal if the number of available packet buffers should remain reduced at that time.

The transactions across the OCN 201 are now described. There are three phases in every packet exchange between a source and destination. The first is the request, the second is the arbitration and the third is the packet transfer. A request is indicated by a source by assertion of the bgn_req signal. During the request phase, the destination port address, the size and the packet priority are transferred from the source port to the fabric arbiter 233 via the bgn_dest, bgn_size and bgn_priority signals, respectively, as previously described. The destination port address identifies where the source is transferring the packet. The size indicates the number of datums in the packet. The priority provides a method for higher priority requests to pass lower priority requests which are blocked because destination packet buffers are limited.

During the arbitration phase, the fabric arbiter 233 determines which requesting sources, if any, should begin their respective packet transfers and in which order. Each packet transfer only occurs when the destination port is able to accept the packet (available input packet buffer 209) and a datapath for transferring the packet is available in the interconnect 221 between the source and destination. The fabric arbiter 233 decides which source should transfer a packet when multiple sources are trying to transfer a packet to the same destination. The fabric arbiter 233 provides the fan_ack signal to a source port via the registers sets 239, 215 as acknowledgement.

During the packet transfer phase, the packet is transferred from the source to the destination via the interconnect 221. The fabric arbiter 233 controls the packet transfer phase by asserting the fan_ack signal to the source, the interconnect control signals to enable a data path from the source to the destination within the interconnect 221, and the fan_enable and fan_clken signals to the destination. Once the packet transfer phase begins, the entire packet is transferred in which all the datums of the packet are clocked through the interconnect 221 on consecutive OCN_CLK cycles. The FMIC 202 of the source port is involved in the request and packet transfer phases since it generates the packet transfer request bgn_req signal to the fabric arbiter 233 and receives the fan_ack acknowledge signal from the fabric arbiter 233 that indicates that the packet transfer phase has started. The fabric arbiter 233 receives the packet transfer request, performs the arbitration process and begins the packet transfer phase at the source and destination. The destination port only receives the packet, so that the FSIC 207 is involved in the packet transfer phase.

The OCN protocol is independent of the latency of the interconnect fabric 110. Each implementation of the interconnect fabric 110 is characterized by two latency parameters, including an arbitration latency and a datapath latency. The arbitration and data path latencies may be changed with the number of pipeline stages implemented by the register sets. FIG. 2 shows an implementation of the interconnect fabric 110 with an arbitration latency of four clock cycles through registers sets 213, 237, 239 and 215, and a datapath latency of two clock cycles through register sets 219 and 223. For example, when a request is asserted from the FMIC 202, the fabric arbiter 233 does not see the request for two clock cycles. The OCN 201 implementation illustrated allows one full clock cycle to determine the arbitration results and two clock cycles of propagation delay for signals from the fabric arbiter 233 to the source and destination ports. The number of clocks of latency for each specific implementation depends on the target frequency of operation and the process technology used.

In alternative fabric implementations, register sets may be removed or additional register sets may be added. In either case, the OCN protocol does not change as long as the fdn_data/fdn_eop and fan_enable signals arrive at the destination at the same time. For example, if a pipeline stage register set is inserted anywhere along the fdn_data/fdn_eop path, then another pipeline stage register set is added along the fan_enable path.

Figure 3:
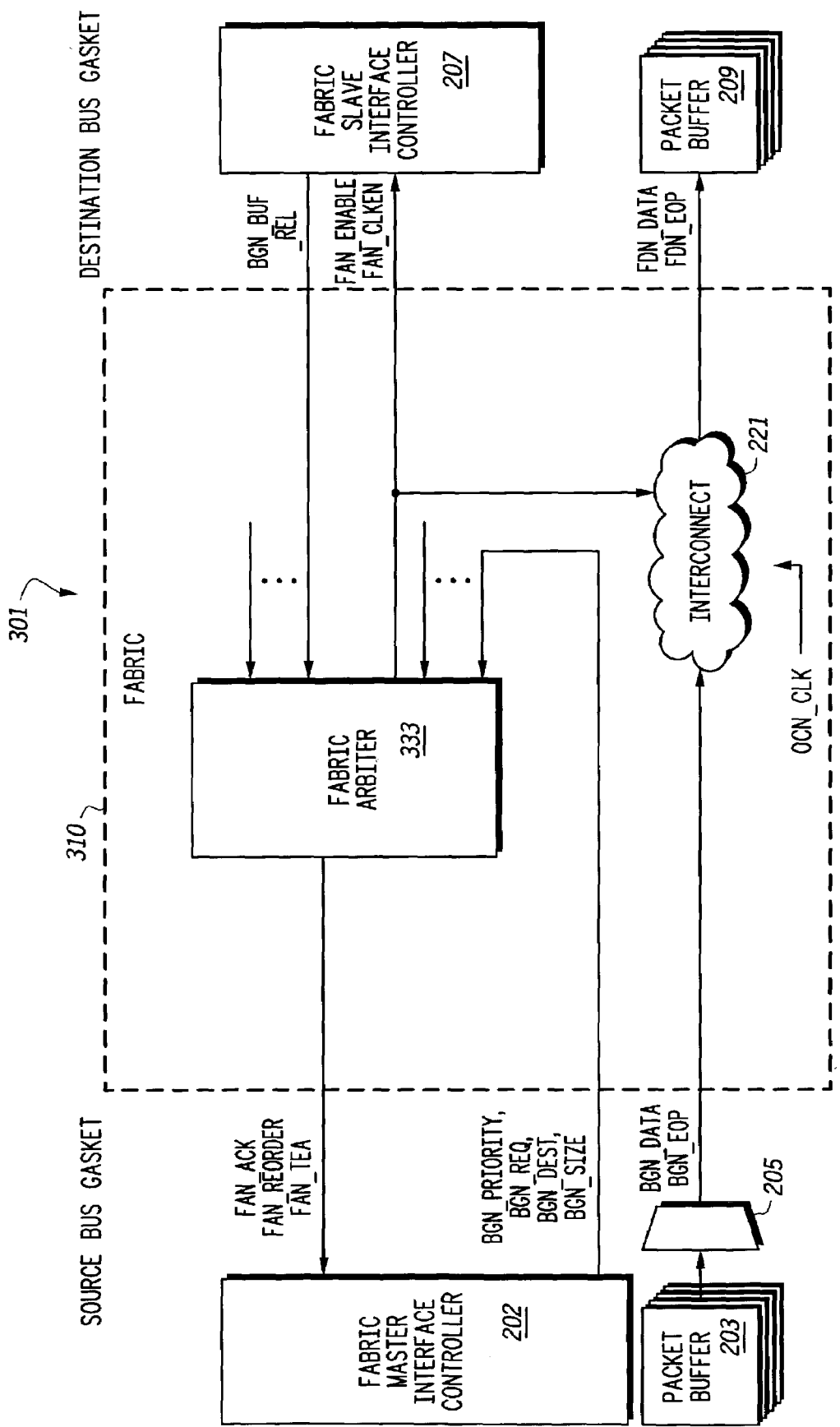
FIG. 3 is a block diagram of another exemplary embodiment of the physical layer of the OCN of FIG. 1, which is similar to the OCN of FIG. 2 except that all of the register sets have been removed.

FIG. 3 is a is block diagram of another exemplary embodiment of the physical layer of the OCN 101, shown as OCN 301, which is similar to the OCN 201 except that all of the register sets have been removed. The OCN 301 includes an interconnect fabric 310 with a fabric arbiter 333 and has an arbitration and datapath latency of zero clock cycles.

Figure 4:
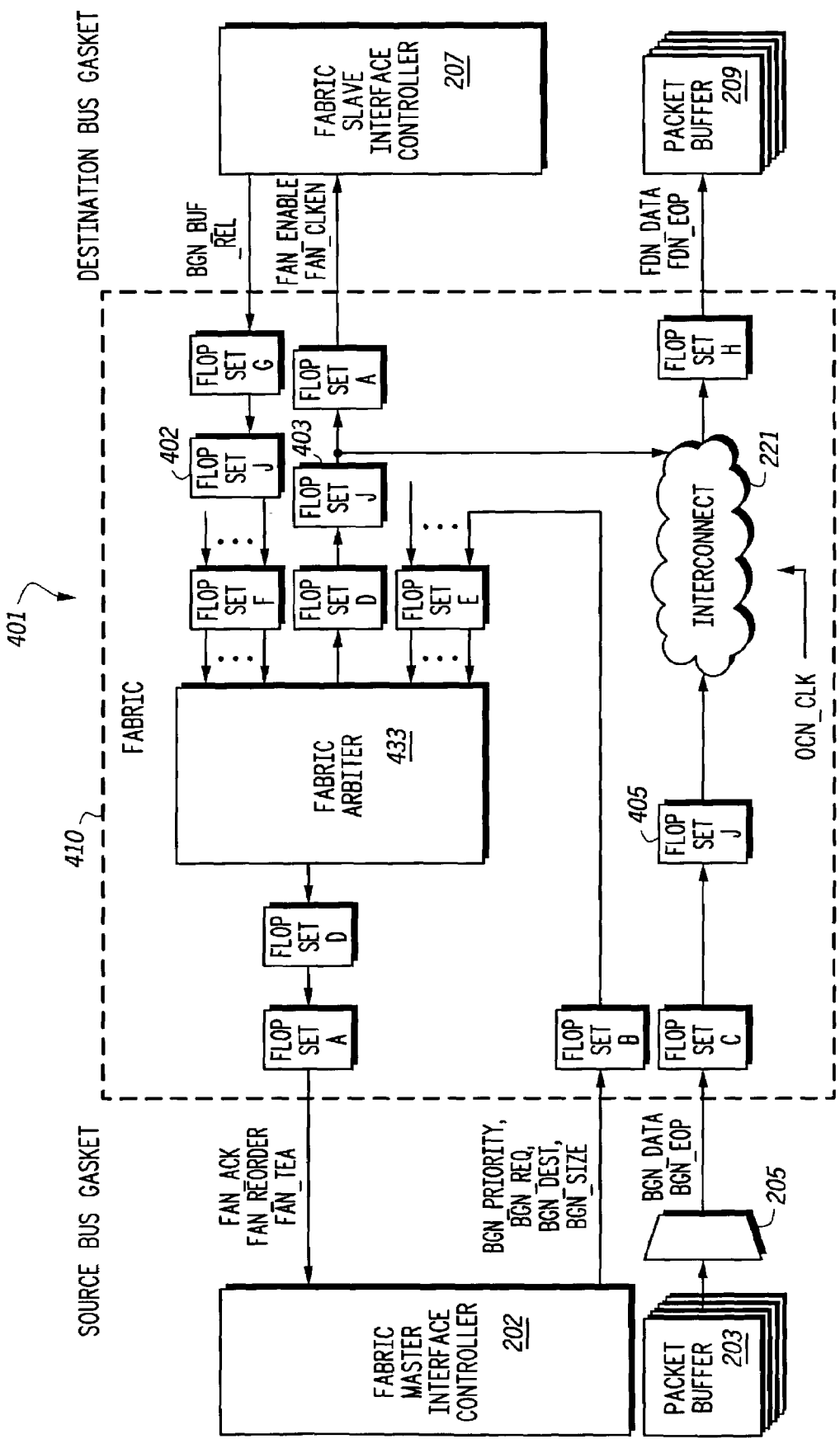
FIG. 4 is a block diagram of another exemplary embodiment of the physical layer of the OCN of FIG. 1, which is similar to the OCN of FIG. 2 except that register sets have been added.

FIG. 4 is block diagram of another exemplary embodiment of the physical layer of the OCN 101, shown as OCN 401, which is similar to the OCN 201 except that register sets 402, 403 and 405 have been added. The OCN 401 includes an interconnect fabric 410 with a fabric arbiter 433 and has an arbitration latency of five clock cycles and a datapath latency of 3 clock cycles.

The various embodiments of OCN 101, including OCN 201, 301, 401 and 501 (FIG. 5) demonstrate that pipeline stages can be easily added allowing the frequency of the interconnect fabric 110 to be tuned for any particular application. Instead of having to make complicated bus changes or increasing frequency or adding bus bridges and stages as is done in typical bus structures, the frequency of an OCN system may be maintained or increased simply by adding register sets implementing the pipelined stages.

Figure 5:
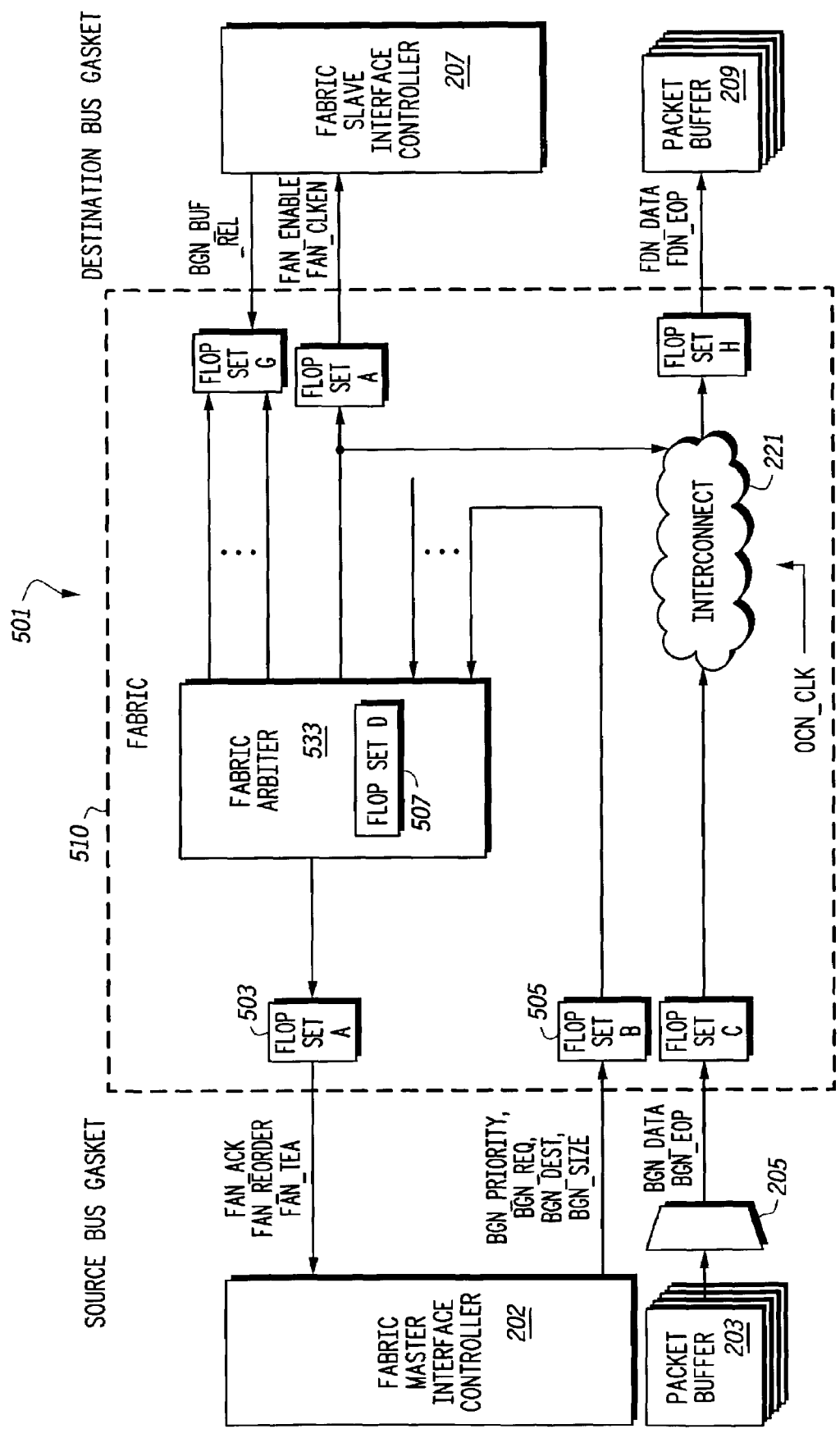
FIG. 5 is a block diagram of another exemplary embodiment of the physical layer of the OCN of FIG. 1, which is similar to the OCN of FIG. 2 except that the fabric arbiter is implemented so that the arbitration decision is spread across multiple clock cycles instead of just one.

FIG. 5 is block diagram of another exemplary embodiment of the physical layer of the OCN 101, shown as OCN 501, which is similar to the OCN 201 except that the fabric arbiter, shown as 533, is implemented so that the arbitration decision is spread across multiple clock cycles instead of just one. Again, the protocol does not change but the clock cycles are part of the arbitration latency. The OCN 501 has an arbitration latency of 3 clocks and a datapath latency of 2 clocks. The arbitration latency is made up of register sets 503, 505, and another register set 507 within the fabric arbiter 533. The register set 505 samples the request and drives it to the fabric arbiter 533. A portion of the arbitration decision is made and is registered in the register set 507. The final arbitration decision is then made and sampled by the register set 501 and driven to the requesting source. Comparing OCN 501 with OCN 201, the register sets 241, 237 and 243 are reduced from being two register stages on either side of the fabric arbiter 233 to being a single register stage 507 within the fabric arbiter 533.

In the following discussion, the OCN 201 configuration and corresponding components are referenced unless otherwise specified, where it is understood that any other OCN 101 implementation may be employed (e.g., 301, 401, 501, etc.). It is preferred that there be a packet transfer phase for every request phase for the OCN protocol. However, multiple request phases can occur before a packet transfer phase occurs. The following Table 1 illustrates three single datum packet requests queued to the fabric arbiter 233 of the OCN 201, where "req" indicates the request phase at the source, "arb" indicates the arbitration phase at the fabric arbiter 233 and "xfer" indicates the packet transfer phase at the source:

TABLE 1

A Source Port Generating Three Outstanding Transactions

| Request Number | Clock Number | | | | | | | | | | |
|---|---|---|---|---|---|---|---|---|---|---|---|
| | 1 | 2 | 3 | 4 | 5 | 6 | 7 | 8 | 9 | 10 | 11 |
| req/ | req | | | arb | | xfer | | | | | |
| req/+1 | | req | | | arb | | xfer | | | | |
| req/+2 | | | req | | | | | | arb | | xfer |

Figure 6:
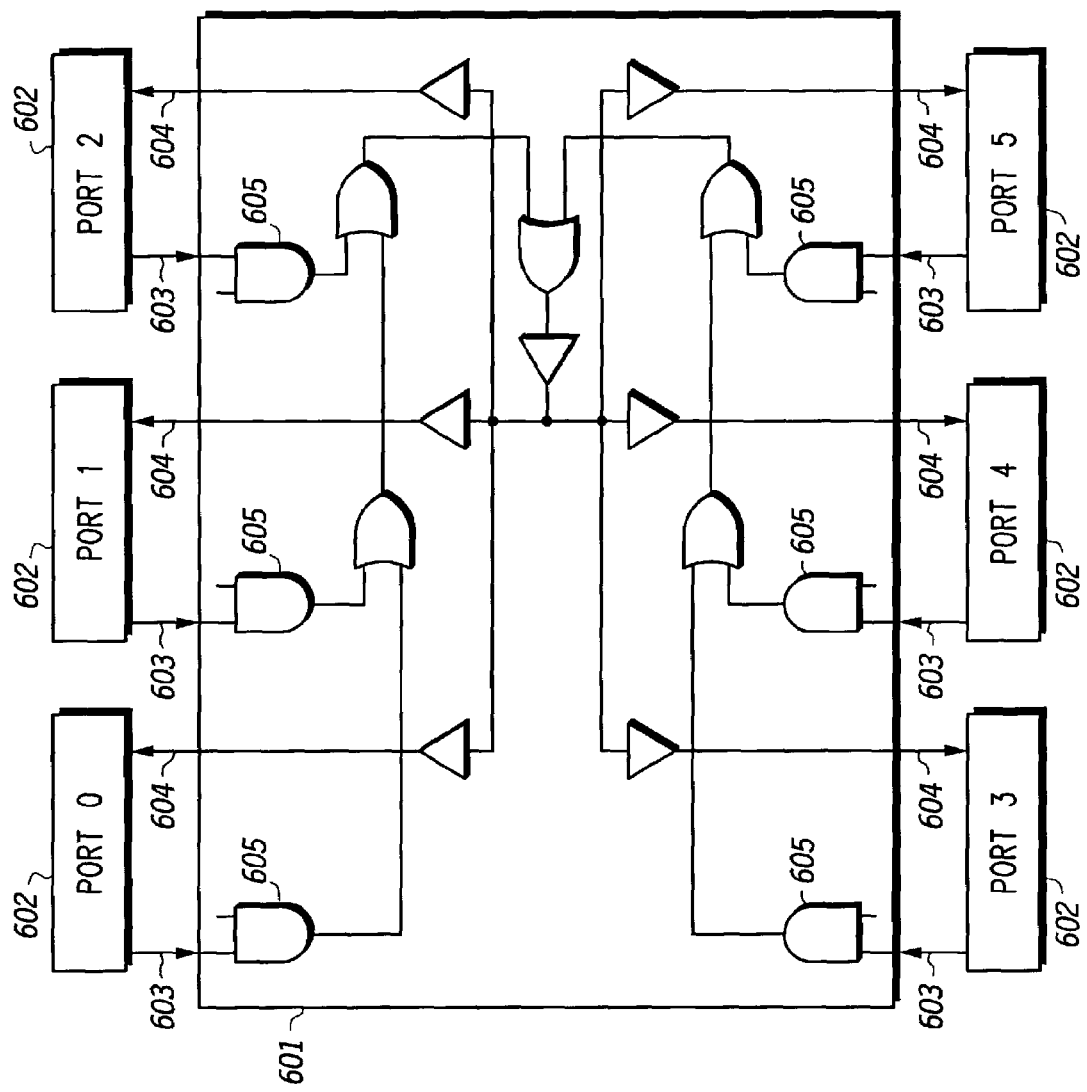
FIGS. 6–8 are logic block diagrams of exemplary fabric structures that may be used as the interconnect of FIG. 1 or 2.
Figure 7:
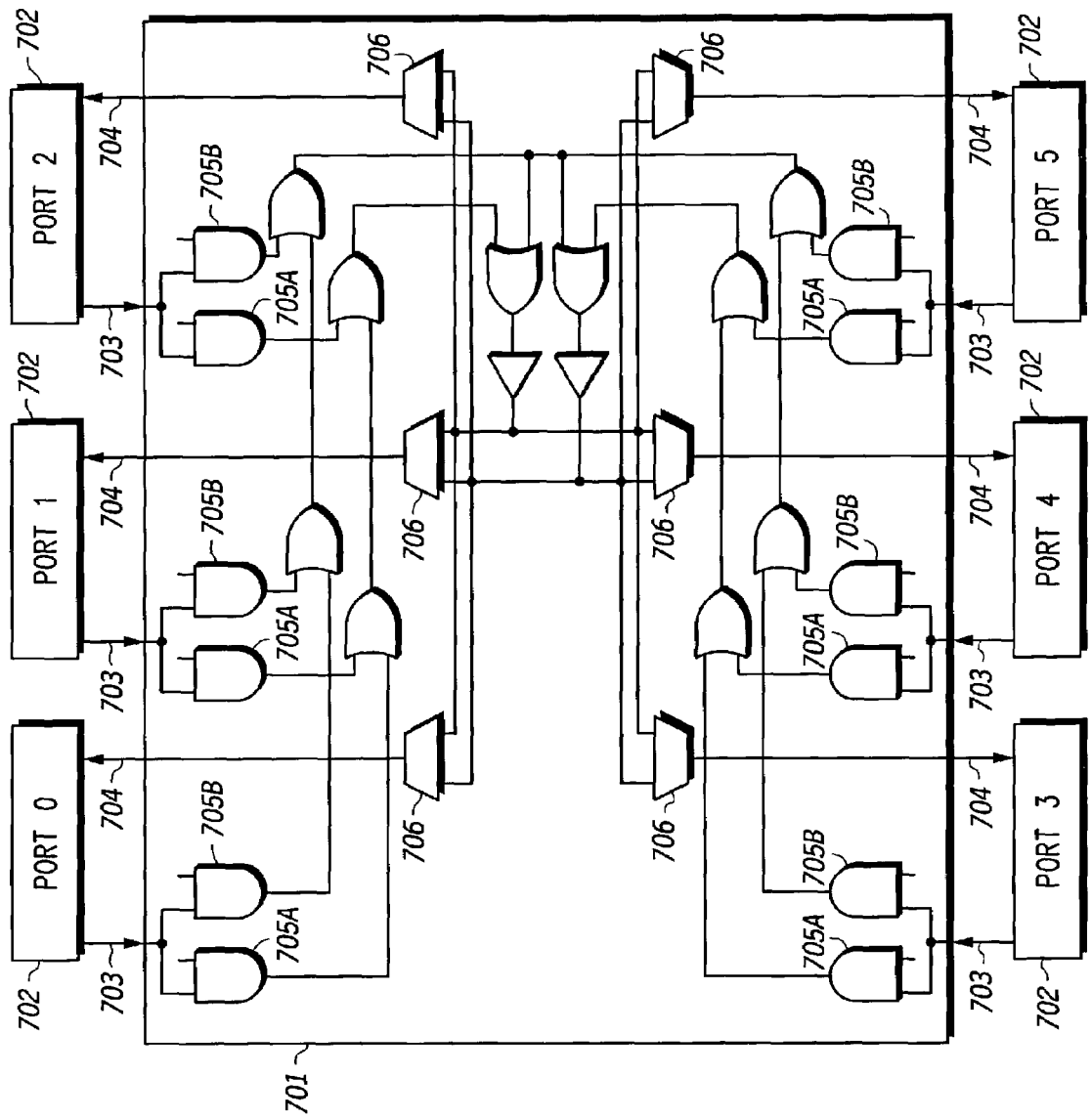
Figure 8:
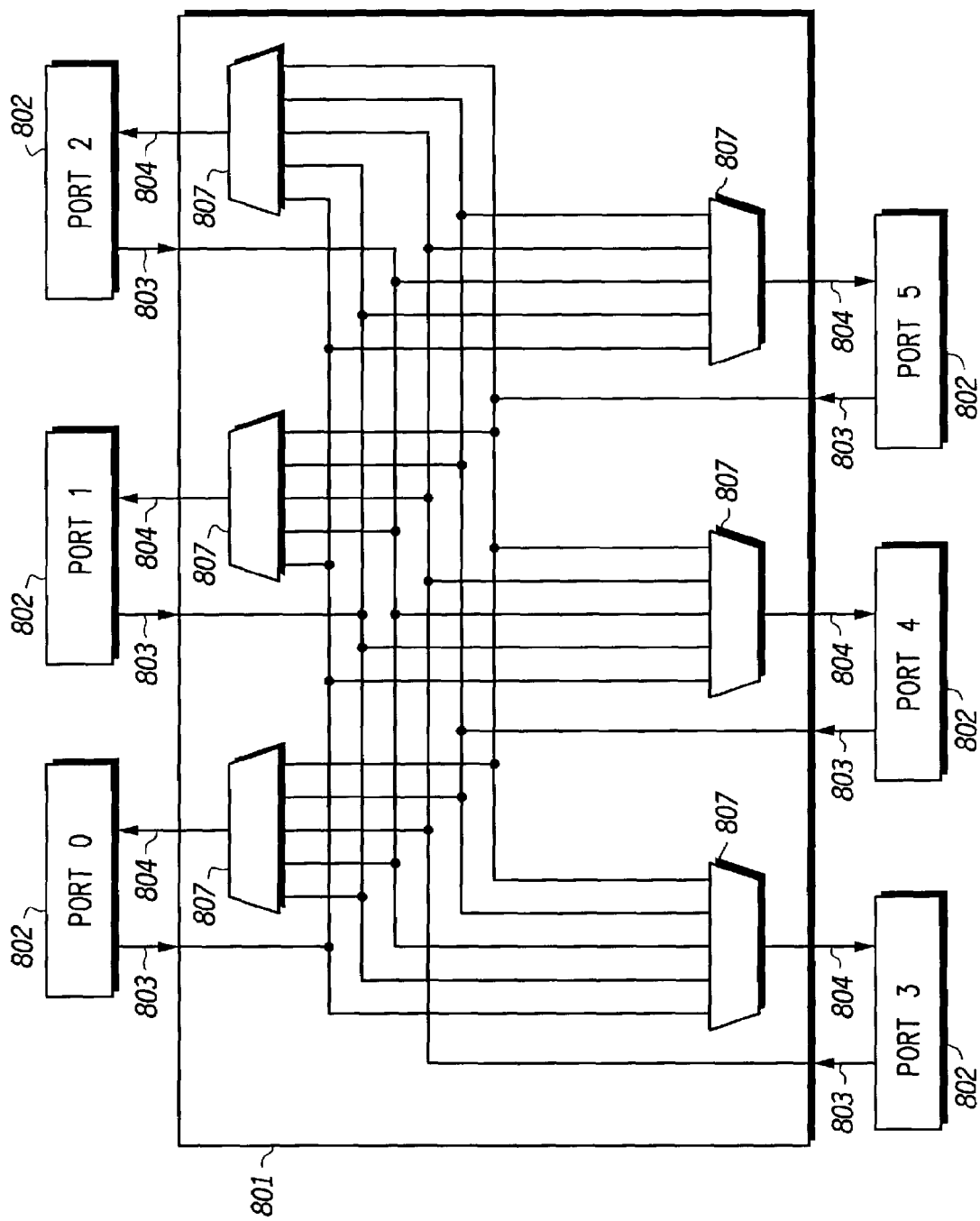

FIGS. 6, 7 and 8 are logic block diagrams of exemplary fabric structures 601, 701 and 801, respectively, that may be used as the interconnect 113 (or as the interconnect 221). Each structure 601–801 shown is a bit-slice representing 1 bit of a datum, so that x bit-slices are included for an interconnect having a maximum datum size of x. To support concurrency scaling, the OCN interface protocol is independent of the structure of the interconnect 113. The interconnect 113 may be implemented to support from one transaction to up to N concurrent transactions, where N is the number of devices connected to the fabric. For example, a 6 port fabric can have 6 concurrent transactions, each source with a transaction to a different destination. This is accomplished without modification to existing processing elements 103. The interconnect 113 is not limited to any particular structure as long as it adheres to the OCN protocol described herein. The interconnect 113 may be implemented as a bus or as a switch fabric if desired. It is noted, however, that a bus has many deficiencies as previously described and a switch fabric can be costly and complicated.

FIG. 6 is a block diagram of an exemplary AND-OR bus structure 601 having 6 ports 602 (individually shown as ports 0–5). The structure 601 is capable of only one transaction at any given time, such as enabling only one source to send data to one destination at a time. Each port 602 has an output for providing a data bit on an input data line 603 and an input for receiving data on an output data line 604. Each input data line 603 is provided to one input of a two-input AND gate 605, receiving an enable signal from the fabric arbiter at its other input. The fabric arbiter only enables one of the AND gates 605 at a time, so that the data from the enabled port propagates to the output data line 604 of every other port (and to the source port). The fabric arbiter also asserts the fan_enable signal of the selected destination port to receive the data. In an alternative multicast or broadcast mode, the fabric arbiter may assert additional fan_enable signals to multiple destination ports to receive the same data. During a packet transfer transaction, the logic locks out any other transfers until the current transaction is completed. The structure 601 can be extended to support multiple concurrent transactions.

FIG. 7 is a block diagram of another exemplary AND-OR structure 701 that supports two concurrent transactions at a time. Similar ports 702, input data lines 703 and output data lines 704 are included. Within the structure 701, each input data line 703 is provided to one input of each of a pair of two-input AND gates 705A and 705B. The other input of each AND gate 705A, 705B receives an enable signal from the fabric arbiter. Each output data line 704 is connected to the output of a corresponding one of six 2:1 multiplexors (muxes) 706 within the structure 701. The fabric arbiter enables only one AND gate 705A and only one AND gate 705B at a time to select up to two sources concurrently. The data from one enabled source port propagates to a first input and data from another enabled port propagates to a second input of each of the muxes 706. The fabric arbiter asserts select inputs to each of the muxes 706 to select between the two enabled source ports. Also, the fabric arbiter asserts the fan_enable signals of the indicated destination ports. In the AND-OR structure 701, the two sources that win the arbitration can send a transaction to two separate destinations simultaneously. The AND-OR structure 701 may be extended to support concurrent transactions up to the number of ports connected to the fabric.

FIG. 8 is a block diagram of an exemplary non-blocking cross-bar fabric structure 801. The same ports 802, input data lines 803 and output data lines 804 are included. Within the structure 821, six 5:1 muxes are provided, each having an output coupled to a corresponding one of the output data lines 804. Each input data line 803 of each port 802 is coupled to one input of each mux 807 at every other port 802. The fabric arbiter provides select signals to the select inputs of each mux 807 to select from among the other ports 802 as the source port. The fabric arbiter selects destination ports by asserting the appropriate fan_enable signals. The cross-bar fabric structure 801 allows each of the sources to simultaneously send transactions to a different destination as long as there are no conflicts between the destinations requested. The cross-bar fabric structure 801 provides the most flexible datapath with the maximum concurrency for transactions between the processing elements 103.

Typical bus structures do not allow for multiple concurrent transactions, but instead allow at most one read and one write transaction to complete concurrently. For a typical bus protocol, the particular bus structure is assumed and that bus structure may not be modified without modifying the bus protocol and the devices which connect to the bus. As illustrated by the structures 601–801, the OCN protocol is independent of the interconnect structure and the number of possible concurrent transactions.

Figure 9:
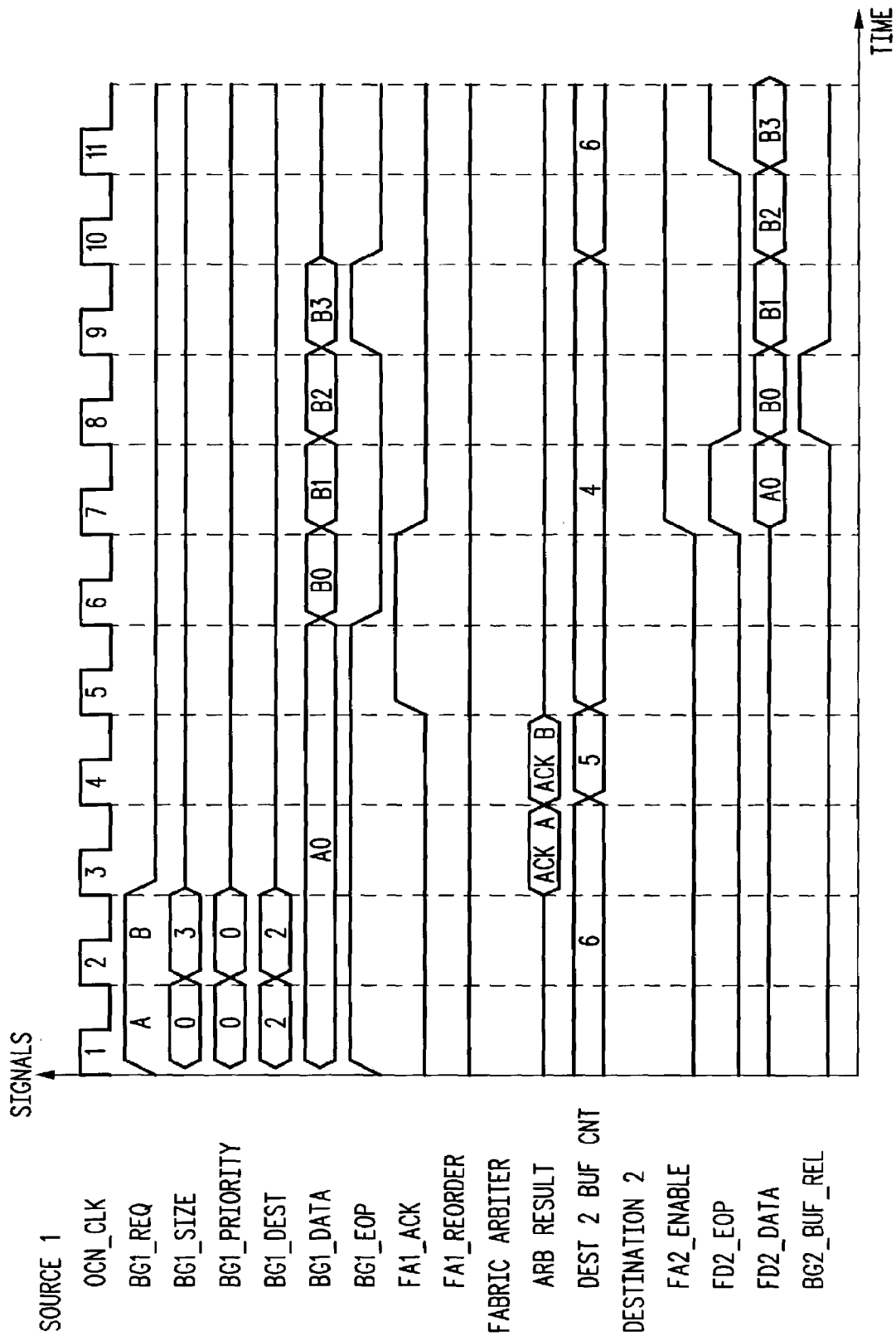
FIG. 9 is a timing diagram illustrating two packet exchanges based on the OCN of FIG. 2 including the request, arbitration and packet transfer phases between the source portion of port 1 (Source 1) and the destination portion of port 2 (Destination 2).

FIG. 9 is a timing diagram illustrating two packet exchanges based on the OCN 201 configuration including the request, arbitration and packet transfer phases between the source portion of port 1 (Source 1) and the destination portion of port 2 (Destination 2). Although the source and destination portions of OCN 201 were described as different portions of the same port, they are used to refer to different ports (Source 1 and Destination 2) for purposes of the following discussion. All signals are plotted versus time. The OCN_CLK signal is shown first at top as a synchronous timing reference for the remaining signals, where the clock cycles of the OCN_CLK signal are numbered from 1 to 11 to provide the timing reference. Clock cycles are determined between successive rising edges of OCN_CLK. The signals of Source 1 are plotted next and include signals bg1_req, bg1_size, bg1_priority, bg1_dest, bg1_data, bg1_eop, fa1_ack and fa1_reorder. The signals of the fabric arbiter 233 are plotted next including signals "arb_result" and "dest_2_buf_cnt". The arb_result signal denotes the arbitration results in response to requests, such as from source 1. The dest_2_buf_cnt signal indicates the buffer count for Destination 2 as provided within the buffer management logic and counters 235. The Destination 2 buffer count begins with 6 available buffers. The signals of Destination 1 are plotted last including signals fa2_enable, fd2_eop, fd1_data, and bg2_buf_rel. The value or contents of selected signals are provided within the corresponding signal plot of those signals.

During the request phase, information about the packet transfer is passed from Source 1 to the fabric arbiter 233. Signals involved in the request phase are bg1_req, bg1_size, bg1_dest and bg1_priority as controlled and generated by Source 1. The request phase is only one OCN_CLK clock cycle in duration and occurs when bg1_req is asserted by Source 1. Source 1 initiates two back-to-back request phases labeled "A" and "B" on clocks 1 and 2, respectively, denoting requests for transfer of packets A and B, respectively. On clock cycle 1, Source 1 generates a one datum (size="0"), priority 0 (priority="0") packet transfer request A to Destination 2 (dest="2"). The corresponding first (and only) datum of packet A, or datum "A0", is asserted on the bg1_data signal and remains valid until sampled. The bg1_eop signal is also asserted with the A0 datum since A0 is also the last datum of the packet A. Priority 0 is the lowest priority. A four datum (size="3"), priority 0 packet transfer request B to Destination 2 is generated by Source 1 on clock 2. The corresponding datums B0, B1, B2 and B3 of packet B are stored in the output packet buffer 203. In the embodiment shown, any source, including Source 1, is always prepared to transfer the packet upon generating a request, and the sources do not remove a request once submitted. It is noted that each source may need to locally arbitrate between several internal pending packet transfer requests before enqueuing and/or presenting the resulting request to the fabric arbiter 233. Such local arbitration is handled at layers above the physical layer, such as the logical, transport layers or even higher layers or applications.

The request information is clocked through the register set 213 at the beginning of clock 2 and clocked through the register set 237 and provided to the fabric arbiter 233 at the beginning of clock 3. The fabric arbiter 233 detects the assertion of the bg1_req signal and performs arbitration during clock 3. During the arbitration phase, the fabric arbiter 233 determines if the requested packet A should be transferred from Source 1 to Destination 2. A packet transfer request may participate in many arbitration phases before moving to the packet transfer phase. The packet transfer only occurs when the Destination 2 is able to accept the packet and a path for transferring the packet is available in the interconnect 221. A destination can accept a packet when it has at least one input buffer that is able to receive a packet with an indicated priority. The relationship between available input buffers and priority is further described below. The fabric arbiter 233 also decides which source should transfer a packet when multiple sources are trying to transfer a packet to the same destination. The arbitration policy is very flexible and may vary by application. Round robin, Least-Recently Used (LRU) and fixed priority arbitration algorithms are contemplated, among others. Any appropriate arbitration scheme may be used.

The fabric arbiter 233 actually starts the packet transfer phase and indicates to Source 1 that a packet transfer has begun and also indicates to the Destination 2 when a packet is arriving. The fabric arbiter 233 asserts the acknowledge to Source 1 during clock 3 as indicated by the arb_result signal ("Ack A"). The acknowledgement information is clocked through the register set 239 at the beginning of clock 4 and through the register set 215 at the beginning of clock 5. The fa1_ack signal is asserted, therefore, during clock cycle 5 indicating to Source 1 that the packet transfer has begun. Since the fabric arbiter 233 acknowledged the request from Source 1 to Destination 2, the dest_2_buf_cnt is decremented to 5 during clock cycle 4. The fabric arbiter 233 asserts the fa2_enable signal (and fan_clken signal) during clock 5, which signal is clocked to the output of the register set 241 and thus to the interconnect 221 during clock 6 to enable a datapath. The A0 datum is clocked through the register set 219 during clock 6 and into the enabled path of the interconnect 221. The A0 datum propagates through the interconnect 221 during clock 6 and is clocked to the output of the register set 223 at the beginning of clock 7. The fa2_enable signal is then clocked through the register set 225 at clock 7. As shown, the fa2_enable signal is asserted to the FMIC 207 of Destination 2 at the beginning of clock 7 to indicate that datum A0 is arriving at that time. The datum A0 is stored into the input packet buffer 209 during clock 7.

Meanwhile, the first datum B0 of the next packet B is asserted on bg1_data during clock 6. Note that the bg1_eop signal is negated in clock 6 since the datum B0 is not the last datum of packet B. As shown, the datum A0 is asserted on the fd2_data signal during clock 7. Also, since packet A has only one datum A0, the fd2_eop signal is also asserted during clock 7 to indicate the end of packet A. The Destination 2 asserts the bg2_buf_rel signal during the next clock cycle 8, if appropriate, to release the buffer for additional input packets. The bg2_buf_rel signal propagates through register sets 231 and 243 during the next two clock cycles, and the-buffer management logic and counters 235 increments the buffer count for port 2 to 5 as indicated by the dest_2_buf_cnt signal.

It is appreciated that the fabric arbiter 233 used the size information from the bg1_size signal along with knowledge of the arbitration and datapath latencies to determine when to assert the fa2_enable and fan_clken signals so that they would arrive just in time to the FSIC 207 to announce the arrival of the A0 datum. In the example shown, the fabric arbiter 233 asserted the fa2_enable signal (and the fa2_clken signal) two OCN_CLK cycles after asserting the fa1_ack signal. In this manner, the datapath through the interconnect 221 was enabled three clock cycles after acknowledge just in time to receive and convey the datum A0. The A0 datum and the fa2_enable signal are both clocked by one more register set each (223, 225) so that they arrive at the Destination 2 at the same time.

The FMIC 202 keeps the bg1_req signal asserted during clock 2 to request transfer of packet B. As described above, the bg1_size, bg1_priority and bg1_dest signals provide the size, priority and destination port for packet B. This request arrives at the fabric arbiter 233 during clock 4, which is the next clock after the packet A request arrived at the fabric arbiter 233. The fabric arbiter 233-uses the size information from the request for packet A to determine when the end of the first transaction occurs and when the next transaction can be acknowledged. In the example shown, the next request is for packet B. The size information enables the fabric arbiter 233 to acknowledge back to back transactions from the same source. The arbitration occurs and the acknowledgement information is generated during clock 4 as indicated by the arb_result signal ("Ack B"). The buffer count for Destination 2 is decremented to 4 in the clock cycle 5. The acknowledgement information reaches the Source 1 two clocks later during clock 6. Since the acknowledgement information for packet A arrived one clock earlier in clock 5, the fa1_ack signal remains asserted to two successive clock cycles 5 and 6 to acknowledge the back to back transactions. The B0, B1, B2 and B3 datums of packet B are asserted on successive clock cycles 6, 7, 8 and 9, respectively, to perform the transfer at the Source 1. Also, the bg1_eop signal is asserted during clock cycle 9 coincident with the last datum B3.

It is noted that since packet B was acknowledged at Source 1 immediately following the acknowledge for packet A, the datums A0 and B0–B3 are transferred on successive clock cycles with no dead cycles. The fa1_enable signal, asserted by the fabric arbiter 233 during clock cycle 5 for packet A, remains asserted by the fabric arbiter 233 during the next four cycles 6–9 for the four datums B0–B3, respectively, of the packet B. Thus, the same data path through the interconnect 221 remains enabled during clock cycles 7–10 to receive and transfer the B0–B3 datums immediately after transfer of datum A0. The fa2_enable signal is asserted to the FSIC 207 and the datums B0–B3 of packet B arrive at Destination 2 during the same successive clock cycles 8–11. The fd2_eop signal is asserted during clock cycle 11 coincident with the last datum B3 at the Destination 2. Again, since packet B was acknowledged immediately following packet A, the datums A0 and B0–B3 are received on successive clock cycles at the Destination 2 with no dead cycles It is possible for the source of a transaction to assert the bgn_eop signal earlier than the requested packet size. In this case, the fabric arbiter 233 does not re-arbitrate until the end of the requested packet size. It is up to the destination bus gasket to determine if this is an error condition.

The packet transfer phase occurs for the length of the packet and occurs at both the source and the destination. Once a packet transfer begins, the entire packet is transferred in consecutive clocks without interruption. In the embodiment shown, there is no method for the source or the destination to flow control or retry the packet transfer once it begins. The fan_enable signal is asserted if an error occurred and thus indicates whether the transaction on the bus side of the bus gasket 107 completed with or without error. If an error is indicated, the particular datum is treated as an idle and the destination discards the packet. The fan_ack signal is asserted by the fabric arbiter 233 and indicates to the source that the packet transfer request has begun, and is asserted for one clock for every packet. Once the source samples fan_ack asserted, it should transfer the entire packet during successive clock cycles without dead cycles.

The fan_enable signal indicates that the fdn_data and fdn_eop are valid at the destination. The fdn_enable signal is valid for the entire packet and is asserted by the fabric arbiter 233 and routed through the datapath. The bgn_eop and fdn_eop signals indicate that the last datum of the packet is occurring. The source port asserts bgn_eop signal and the destination port receives the fdn_eop signal. The source port sends the packet one datum per OCN_CLK clock cycle on the bgn_data signal. The destination port receives the packet one datum per clock on the fdn_data signal. The source port always provides the bgn_data and bgn_eop signals for the packet transfer request at the head of the request queue 211. When the source detects the fan_ack signal asserted from the fabric arbiter 233, the first datum corresponding to the packet at the head of the request queue 211 is already being transferred, and the source port should set the bgn_eop and bgn_data signals valid for the second datum if the packet is a multi-datum packet. If the packet only has one datum, then the source port should set bgn_eop and bgn_data signals valid for the next positioned request. If there are no outstanding requests, then the source sets the bgn_eop and bgn_data signals to zero or any other appropriate value. An exception occurs when packet transfer requests are re-ordered. When this occurs, the packet transfer request that was re-ordered is now the packet at the head of the request queue 211. The fa1_reorder signal remained negated since re-ordering did not occur. If the source generates a single datum packet transfer request followed by a single or multi-datum packet transfer request, the fan_ack signal can be asserted for back-to-back clocks, as illustrated by the fa1_ack signal. At the destination, the packet transfer phase begins when the fan_enable signal is detected asserted. Every clock cycle in which the destination samples the fan_enable signal asserted, the fdn_data and fdn_eop signals are valid. In this manner, a destination can receive multiple packets with no dead clocks between packets.

Packet priority allows higher priority packets to pass lower priority packets under certain circumstances to prevent deadlock or head of line blocking, which are further described below. In the embodiments shown, three transaction flows are defined with four priority levels. In a transaction flow, response packets, if used, are one priority level higher than the corresponding request packets. Request packets may have any one of three priority levels (00b, 01b, 10b) and the corresponding response packets may have any one of three priority levels (01b, 10b, 11b), where each response packet is one priority level higher than the corresponding request packet.

By using priority levels, the fabric arbiter 233 does not need to know anything about the packet contents such as the difference between request packets and response packets. This reduces the complexity of the fabric arbiter 233 and allows the transaction protocol to evolve without requiring modifications to the fabric arbiter 233 or the interface between the source and the interconnect fabric 210.

There are several procedures involving packet priority that are followed in the embodiments shown. When a port receives a request packet, it elevates the priority of the corresponding response packet by one. Order is maintained between packets of the same priority level from the same source and to the same destination at the source, the fabric arbiter 233 and the destination. However, order does not need to be maintained between packets of the same priority level from the same source to different destinations or from different sources to the same destination. Higher priority packets can always pass lower priority packets at the source, the fabric arbiter 233, or the destination. Lower priority packets cannot pass higher priority packets at the source, the fabric arbiter 233, or the destination from the same source to the same destination. However, lower priority packets can pass higher priority packets from the same source to different destinations or from different sources to the same destination. A destination allows higher priority packets to pass lower priority packets if the lower priority packets are stalled. Since packet transfer requests are queued in the fabric arbiter 233, the fabric arbiter 233 re-orders a higher priority packet request in front of a lower priority request when the destination cannot accept a lower priority packet because a packet buffer is unavailable for that priority level. Re-ordering is discussed below. A source should be able to generate a higher priority packet transfer request to the fabric arbiter 233 than any request the source currently has queued. In other words, a source does not fill its request queue with all low priority requests but instead reserves request queue locations for higher priority requests. These packet priority rules define the behavior of the OCN system.

To prevent the destination from being overrun with packets while allowing high priority packets to still be transferred to a destination, destination buffer management is provided at the fabric arbiter 233 and at each of the ports. The basic concept is that the fabric arbiter 233 knows how many buffers are provided by each of the destinations and tracks these buffers with an "available buffer counter" for each destination within the buffer management logic and counters 235. When the fabric arbiter 233 makes a determination that a packet can be transferred from a source to a destination, that destination's "available buffer count" is decremented by one. When the corresponding buffer of the input packet buffer 209 frees up at the destination, the FSIC 207 asserts the bgn_buf_rel signal and the "available buffer count" for that destination is incremented by one for each OCN_CLK cycle while the bgn_buf_rel signal remains asserted.

At initialization, each destination indicates how many packet buffers are initially available to the fabric arbiter 233 via the bgn_buf_rel signal. In particular, each destination asserts its bgn_buf_rel signal after the de-assertion of reset, allowing the fabric arbiter 233 to count the number of buffers available by counting the number of OCN_CLK cycles that each bgn_buf_rel signal is asserted. The destination can delay asserting bgn_buf_rel until it is ready to accept the first packet. For example, a destination could delay the assertion of its bgn_buf_rel signal until its internal self tests are completed. During normal operation, a destination may increase its input buffer count at any time by asserting its bgn_buf_rel signal for as many clock cycles as input buffers to be added. However, the destination should not attempt to withdraw input buffers once made available in the embodiment shown. Alternative buffer management schemes are contemplated. For every OCN_CLK cycle in which a bgn_buf_rel signal is asserted, the available buffer count for that destination is incremented in the buffer management logic and counters 235. Whenever the fabric arbiter 233 enables a packet transfer to a destination, the available buffer count for that destination is decremented. If the fabric arbiter 233 enables a packet transfer to a destination and samples its bgn_buf_rel signal asserted from the same destination on the same clock, the available buffer count for that destination is not changed.

A destination receiving a packet does not know the size or length of the packet until it is received. The fabric arbiter 233 is provided the packet size information, but does not know the size of any particular buffer at the destinations. Therefore, in one embodiment, each allocated buffer should at least have sufficient memory to store a maximum-sized packet. For example, if the maximum size of a packet is defined to be 256 bytes, then the size of each destination buffer is at least 256 bytes. Alternatively, the destination buffer sizes may be reduced by a processing capacity factor at a given destination. The combined processing capacity and buffer storage must be sufficient to store and/or process the maximum possible amount of data that can be delivered by the interconnect fabric 210 given the number of available input buffers reported and the maximum packet size.

The fabric arbiter 233 only allows a packet transfer to occur if the destination can accept the packet. The fabric arbiter 233 provides a method to allow higher priority packets to be transferred to a destination. The fabric arbiter 233 maintains a "high-water" mark for each priority level. For example, a destination with 8 packet buffers in a system that supports all four priority levels is managed by the fabric arbiter 233 as shown in the following Table 2:

TABLE 2

Method to Support 8 Packet Buffers and Four Priority Levels

| Packet Buffers Available | Packet Priority That Can Be Accepted By Destination Port |
|---|---|
| 8 | 0, 1, 2, 3 |
| 7 | 0, 1, 2, 3 |
| 6 | 0, 1, 2, 3 |
| 5 | 0, 1, 2, 3 |
| 4 | 0, 1, 2, 3 |
| 3 | 1, 2, 3 |
| 2 | 2, 3 |
| 1 | 3 |
| 0 | none |

Table 2 illustrates a basic scheme that may be used although other schemes are possible and contemplated. In Table 2, if the number of packet buffers available for a destination is 2, then the fabric arbiter 233 only allows a packet transfer request of priority 2 or 3 to be transferred from a source destination. Once the packet transfer was enabled by the fabric arbiter 233, the available count is decremented to 1 within the buffer management logic and counters 235 and only priority 3 requests are allowed to be initiated to that destination until the bgn_buf_rel signal is subsequently asserted to indicate that an input buffer has cleared. The maximum "available buffer count" may be set arbitrarily and is not limited.

To support queueing of multiple requests and request re-ordering, both the source and the fabric arbiter 233 each maintain a queue of packet transfer requests. In particular, each FMIC 202 of each source port includes a request queue, such as the request queue 211, and the fabric arbiter 233 includes the request queue 234, which includes one request queue per source port. Request queueing allows the request and arbitration phases to be pipelined hiding the latency of subsequent packet transfers and allows full utilization of source and fabric bandwidth. Normally, data phases occur in the same order that the requests are presented. Exceptions include a deadlock situation and head of line blocking, in which cases the fabric arbiter 233 performs re-ordering of packets. Request re-ordering allows the fabric arbiter 233 to move a different request in the request queue 211 in front of the request at the head of the request queue 211. In a potential deadlock situation, the fabric arbiter 233 moves a higher priority request in front of a lower priority request at the front of the request queue 211 that was not making progress. In a "head of line" blocking situation, the fabric arbiter 233 moves a request of the same or different priority but to a different destination that can make progress ahead of another request at the head of the request queue 211 that is not making progress.

When a source generates a packet transfer request to the fabric arbiter 233, it adds this request to its request queue 211. When the source detects its fan_ack signal asserted from the fabric arbiter 233 indicating that a packet transfer has begun, the source removes the corresponding request from the request queue 211. Similarly, when the fabric arbiter 233 receives a request from a source, it adds this request to its request queue 234. When the fabric arbiter 233 indicates that a packet transfer request should begin by asserting the fan_ack signal to a source, it removes the corresponding request from its request queue 234. Since there may be zero (zero latency if no pipeline stages are used) or more clock delays from when a source generates a request and when the fabric arbiter 233 receives the request, the two request queues 211, 234 are not always synchronized. Since the source generates the packet transfer request, the source adds a request entry to its request queue 211 before the fabric arbiter 233 adds a request entry to its request queue 234. Similarly, since the fabric arbiter 233 determines when the packet transfer for the corresponding request should begin, the fabric arbiter 233 removes the request entry from its request queue 234 before the source removes the request entry from its request queue 211.

When a packet cannot be transferred to a destination because the destination does not have any packet buffers of corresponding priority available, the fabric arbiter 233 re-orders a higher priority request to the head of the request queues 211 and 234 by setting the fan_reorder signal with a non-zero value for one clock cycle. The value of the fan_reorder signal indicates which request entry should be moved to the head of the request queue. The remaining entries in the request queue stay in the original order and those that are bypassed are shifted back in the queue. When the fan_reorder signal is zero, no re-ordering occurs. The value of the fan_reorder signal is always zero when the fan_ack signal is asserted, which allows the source to set the bgn_data and bgn_eop signals with the request that has been re-ordered to the head of the request queue one clock before the fan_ack signal is asserted. For example, if the source and the fabric arbiter 233 request queues 211, 234 are currently in the state given in Table 3A and request entry A at the head of the request queue cannot be transferred because the corresponding destination does not have a priority 0 buffer available, then the fabric arbiter 233 re-orders entry C to the head of the request queue. To move entry 2 to the head of the request queue, the fabric arbiter 233 sets the bgn_reorder signal with the value 2 for one clock. The order of the request queue in both the source and fabric arbiter 233 before and after the re-order is complete is shown in the following Tables 3A and 3B, respectively:

TABLE 3-A

Request Queue Before Re-ordering

| Request Entry Position | Request Entry | Priority |
|---|---|---|
| head | A | 0 |
| +1 | B | 0 |
| +2 | C | 1 |
| +3 | D | 0 |

TABLE 3-B

Request Queue After Re-ordering

| Request Entry Position | Request Entry | Priority |
|---|---|---|
| head | C | 1 |
| +1 | A | 0 |
| +2 | B | 0 |
| +3 | D | 0 |

It is noted that if packets B & D are to other destinations, they could be reordered to the head of the request queue.

To ensure that forward progress can always occur, the source always allows at least one higher priority request to be transferred to the fabric arbiter 233. One method the source achieves this by maintaining a "high-water" mark for each priority level. For example, a source that generated packet transfer requests using all four priority levels could use the method illustrated by the following Table 4:

TABLE 4

Minimum Request Queue that Supports all Priority Levels

| Request Entries Available | Priority Accepted |
|---|---|
| 4 | 0, 1, 2, 3 |
| 3 | 1, 2, 3 |
| 2 | 2, 3 |
| 1 | 3 |
| 0 | none |

Table 4 illustrates that each port should provide at least 4 input buffers to ensure being able to receive 0 priority packets.

Figure 10:
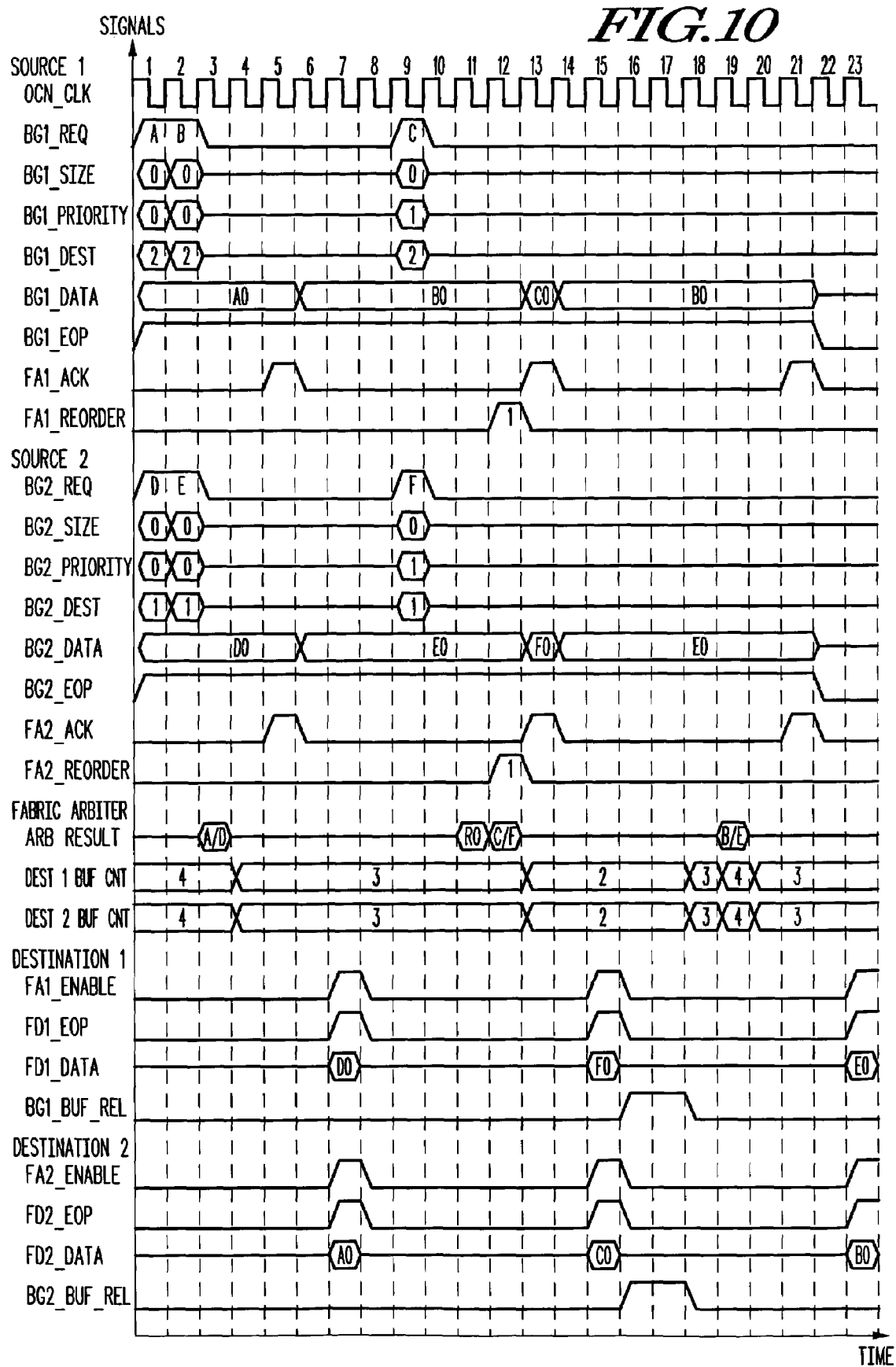
FIG. 10 is a timing diagram illustrating an example of a deadlock situation based on the OCN of FIG. 2 between two ports 1 and 2.

FIG. 10 is a timing diagram illustrating an example of a deadlock situation based on the OCN 201 configuration between two ports 1 and 2. Port 1 has source and destination portions Source 1 and Destination 1 and port 2 has source and destination portions Source 2 and Destination 2. The signals of the interfaces for Source 1, Source 2, the fabric arbiter 233, the Destination 1 and Destination 2 are plotted versus time in a similar manner as FIG. 9. Also, the OCN_CLK signal is shown at top to provide a timing reference. Assume that the ports 1 and 2 can generate up to two outstanding packet transfer requests, and that each port can only receive one priority 0 packet since each destination portion only has four packet buffers. A deadlock situation occurs when a packet that would otherwise allow progress to continue is blocked by another packet that is not allowing progress to continue. Blocking can occur at the source, the fabric arbiter 233 or the destination. The source provides a method to generate higher priority packet transfer requests following the request queue rules and to bypass pending lower priority packet transfer requests. The fabric arbiter 233 supports re-ordering of higher priority packet transfer requests in front of blocked lower priority requests. The destination supports the buffer management requirements and allows higher priority packets to pass lower priority packets.

The packet transfer sequence that causes the deadlock situation begins when each port 1 and 2 generates two priority 0 read requests to each other. As shown, Source 1 asserts the bg1_req signal in clock cycles 1 and 2 to request transfer for packets A and B, each to port 2 and each having a size of 1 datum and a priority of 0. Also, Source 2 asserts the bg2_req signal in clock cycles 1 and 2 to request transfer for packets D and E, each to port 1 and each having a size of 1 datum and a priority of 0. Since each port supports only one priority 0 packet transfer, the fabric arbiter 233 can only transfer one read request per port and the other read request is queued in the fabric arbiter 233. The first requests for packets A and D reach the fabric arbiter 233 at the same time in clock cycle 3 and an acknowledge ("A/D") is sent back to both ports arriving during clock cycle 5 as indicated by assertion of the fa1_ack and fa2_ack signals. Note that dest_1_buf_cnt and dest_2_buf_cnt signals are decremented from 4 to 3 during clock cycle 4. The datums A0 and D0 of packets A and D, respectively, are transferred via the interconnect 221 beginning clock cycle 5 and arrive at Destinations 2 and 1, respectively, during clock cycle 7 and indicated by the fd2_data and fd1_data signals, respectively. Also note assertion of the fa1_enable, fd1_cop, fa2_enable and fd2_cop signals during clock 7. The datums B0 and E0 of packets B and E are asserted on signals bg1_data and bg2_data signals, respectively, awaiting transfer.

After each port 1 and 2 completes the read requests, they each generate a priority 1 read response packet transfer request back to each other. As shown, Source 1 asserts the bg1_req signal during clock 9 to request transfer of packet C to Destination 2, where packet C has one datum and a priority of 1. Also, Source 2 asserts the bg2_req signal during clock 9 to request transfer of packet F to Destination 2, where packet F has one datum and a priority of 1. The problem is that the previous unacknowledged read requests (packets B and E) are blocking the read responses in the fabric arbiter 233 causing a deadlock situation. In this case, each of the Destinations 1 and 2 will not release an input packet buffer until the response is acknowledged causing the deadlock. Note that the dest_1_buf_cnt and dest_2_buf_cnt signals remain at 3 during clock cycles 4 to 12 so that Destinations 1 and 2 are unable to receive priority 0 packets.

To resolve the deadlock situation and allow the read responses to complete, the fabric arbiter 233 re-orders the read responses in front of the read requests and transfers the read response. The requests for response transfers C and F arrive at the fabric arbiter 233 at clock cycle 11 and the fabric arbiter 233 detects the deadlock situation. The fabric arbiter 233 makes the re-order decision based on the read responses being higher priority than the read requests. The fabric arbiter 233 issues re-order requests ("R0") to both Source 1 and Source 2, which arrive at the respective ports 1 and 2 during clock cycle 12. In particular, the fa1_reorder signal is asserted to the Source 1 at clock cycle 12 with value 1 indicating that response packet C is to be moved ahead of request packet B. Likewise, the fa2_reorder signal is asserted to the Source 2 at clock cycle 12 with value 1 indicating that response packet F is to be moved ahead of request packet E. On the next clock cycle 12 after issuing the re-order signals, the fabric arbiter 233 asserts acknowledges to Sources 1 and 2 for packets C and F ("C/F"). The dest_1_buf_cnt and dest_2_buf_cnt signals are both decremented on next clock cycle 13 from 3 to 2. The C and F acknowledges arrive during clock cycle 13 as indicated by assertion of the fa1_ack and fa2_ack signals, which initiate transfer of the C0 and F0 datums. The C0 and F0 datums arrive at Destinations 2 and 1, respectively, during clock cycle 15. In this example, the fabric arbiter 233 asserted the acknowledge signals in the next clock cycle after the re-order signals. It is noted that the fan_ack signals could occur two or more clocks after a re-order occurs. The fan_ack signal is not asserted, however, at the same time as the re-order signal to give the source 1 clock cycle to perform the re-order. Also it is possible that several re-orders can occur before the fan_ack singal is asserted.

Once the read responses are transferred, the port generating the read response indicates that a packet buffer is available. Once the port that generated the read requests frees up the packet buffer that holds the corresponding read response, it indicates that another packet buffer is available. As shown, the bg1_buf_rel and bg1_buf_rel signals are asserted for two clock cycles beginning at clock cycle 16. The dest_buf_cnt and dest 2_buf_cnt signals are both incremented from 2 to 3 at clock cycle 18 and then incremented again from 3 to 4 during following clock cycle 19. In the same clock cycle 19 that the input buffer counts for Destinations 1 and 2 are increased to 4 buffers, the fabric arbiter 233 asserts acknowledges to Sources 1 and 2 to initiate transfers of packets B and E, respectively ("B/E"). The fa1_ack and fa2_ack signals are correspondingly asserted during clock cycle 21, initiating transfer of datums B0 and E0, respectively, which arrive on the fd1_data and fd2_data signals, respectively, during clock cycle 23. Note that the bg1_eop and bg2_eop signals remain asserted from clock cycle 1 to clock cycle 21 since the datums asserted on the bg1_data and bg2_data signals remain as the only or last datums of the corresponding packets.

Figure 11:
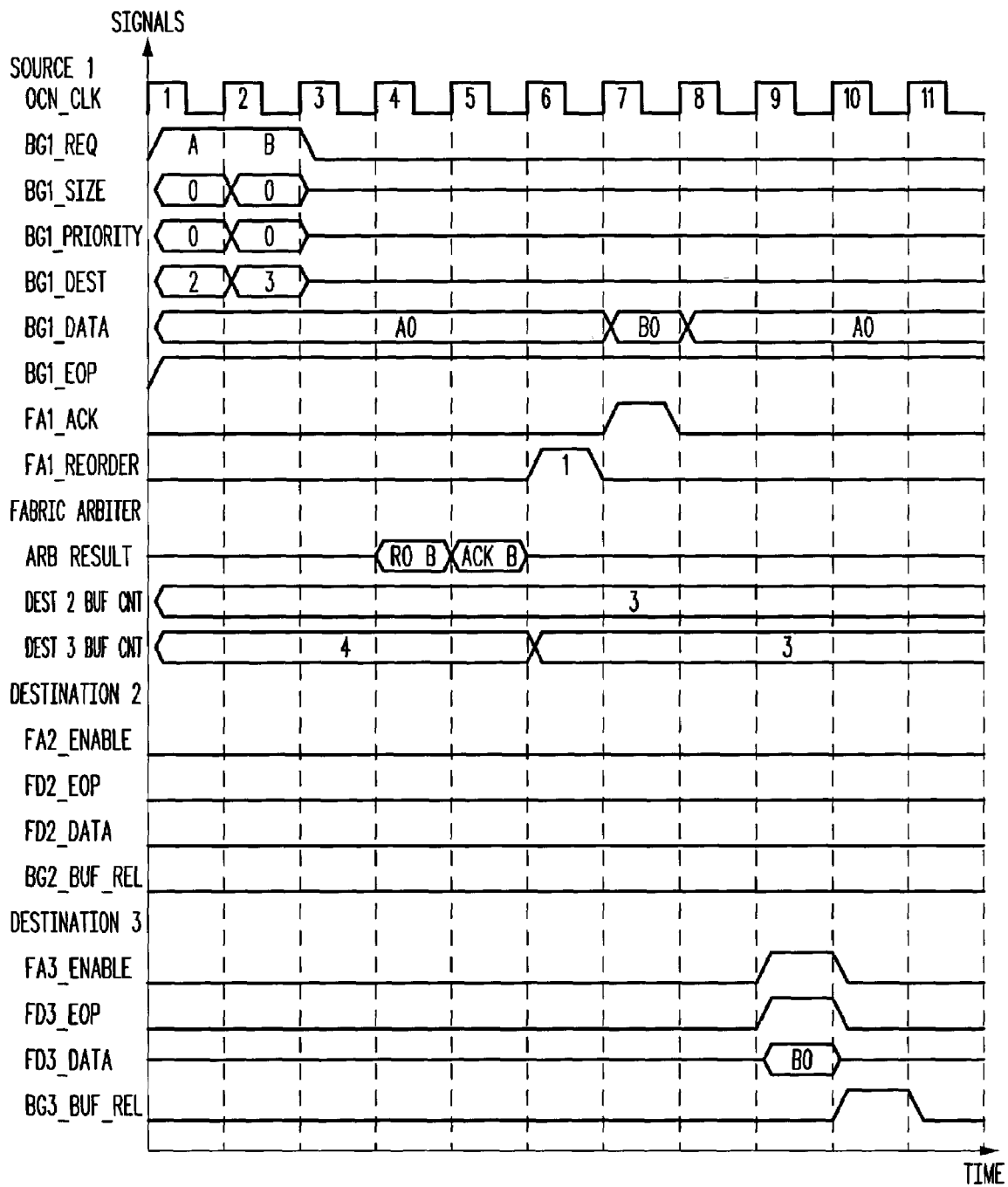
FIG. 11 is a timing diagram illustrating an example of a head of line blocking situation in which re-ordering allows progress to be made based on the OCN of FIG. 2 using 3 ports.

FIG. 11 is a timing diagram illustrating an example of a head of line blocking situation in which re-ordering allows progress to be made based on the OCN 201 configuration using 3 ports. The port 1 has a source portion Source 1 and ports 2 and 3 have destination portions Destination 2 and Destination 3, respectively. The signals of the interfaces for Source 1, the fabric arbiter 233, Destination 2, and Destination 3 are plotted versus time in a similar manner as FIG. 10. Also, the OCN_CLK signal is shown at top to provide a timing reference. Head of line blocking occurs when a first packet transfer request at the head of the request queue cannot complete because the destination does not have any packet buffers available and a second packet transfer request of any priority to a different destination located in the request queue behind the first packet transfer request could complete if allowed.

As shown, Source 1 asserts the bg1_req signal in clock cycles 1 and 2 to request transfer for a packet A to Destination 2 and another packet B to Destination 3. Each packet A and B has a size of 1 datum and a priority of 0. The datum A0 is asserted on bg1_data awaiting transfer and bg1_eop is asserted. Signals dest_2_buf_cnt and dest_3_buf_cnt indicate that Destination 2 has only 3 available input buffers while Destination 3 has 4 available input buffers. Assuming the priority levels and rules previously described, the transfer of packet A to Destination 2 is unable to complete since Destination 2 has only 3 available buffers and can not accept a priority 0 packet. Since Destination 3 has 4 buffers and can receive a priority 0 packet, the next transfer request of packet B to Destination 3 could otherwise complete if allowed. The fabric arbiter 233 detects the block situation when the requests arrive and sends a re-order command ("R0 B") to Source 1 to put packet B ahead of packet A at Source 1 as illustrated by "arb_result" in clock 4. The fabric arbiter 233 then sends an acknowledge ("Ack B") in next clock cycle 5. The fa1_reorder signal is asserted with value 1 in clock cycle 6 followed by the fa1_ack signal asserted in next clock cycle 7. Source 1 performs the re-order in clock cycle 6 and datum B0 begins transfer in clock 7. In next clock 8, datum A0 re-appears at the head of the output packet buffer 203 for subsequent transfer if and when the buffer count for Destination 2 increases to 4. In this manner, the second packet B is re-ordered in front of the first packet A since the second packet B can complete and the first packet A is blocked due to lack of a low priority buffer.

FIGS. 12–20 are miscellaneous timing diagrams based on the OCN 201 having arbitration latency of 4 and datapath latency of 2. The signals of each are plotted versus time in a similar manner as previous Figures and the OCN_CLK signal is shown at top to provide a timing reference.

Figure 12:
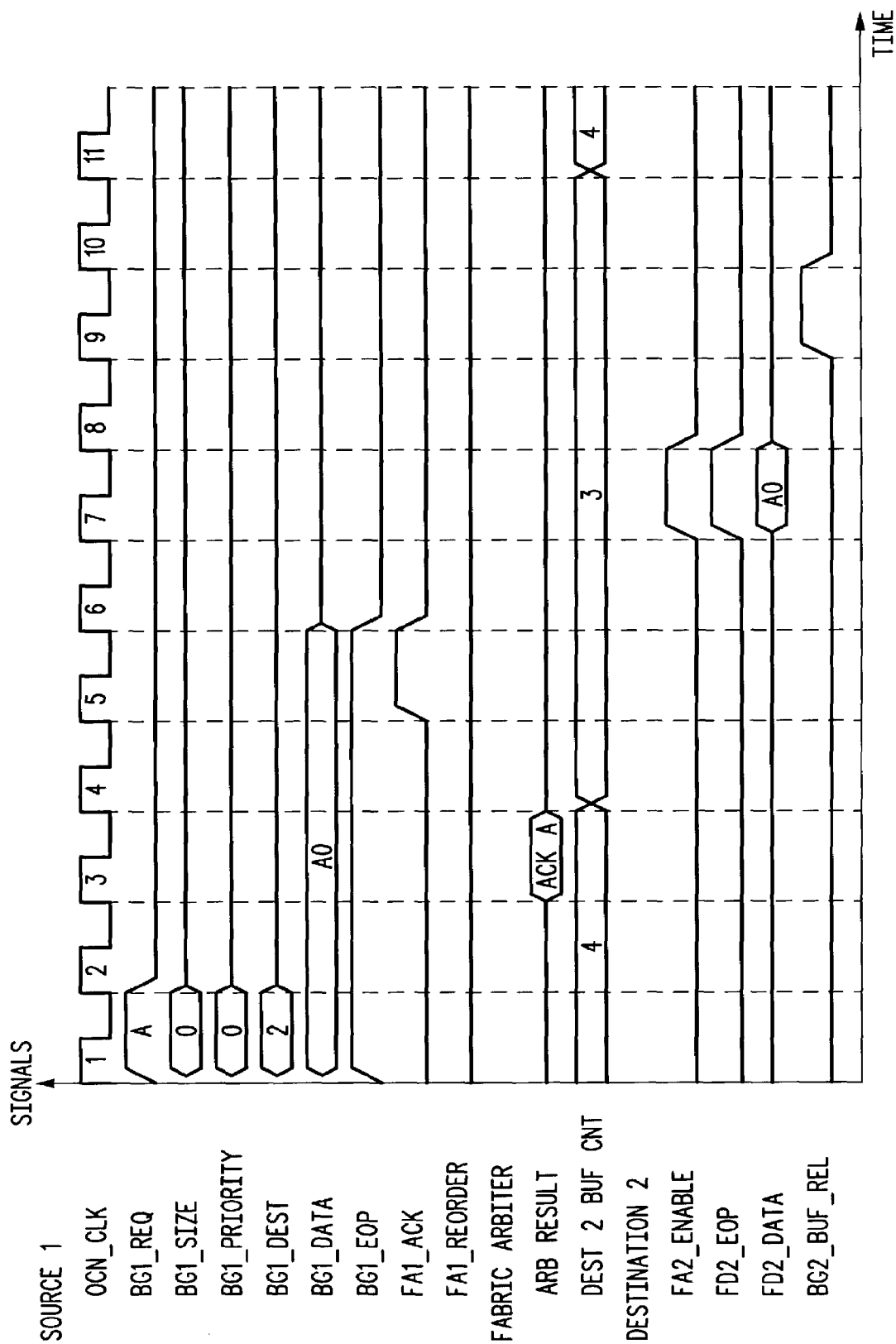
FIGS. 12–20 are miscellaneous timing diagrams based on the OCN of FIG. 2 having arbitration latency of 4 and datapath latency of 2.

FIG. 12 illustrates a single datum packet from Source 1 to Destination 2. Note that the bg2_buf_rel is asserted arbitrarily or not at all. The bg2_buf_rel may be asserted anytime after a buffer is available, or not at all. For the cases in which bgn_buf_rel is not shown being asserted, it may be assumed that it might be asserted at some later time assuming that the destination desired to re-submit the buffer to receive data.

Figure 13:
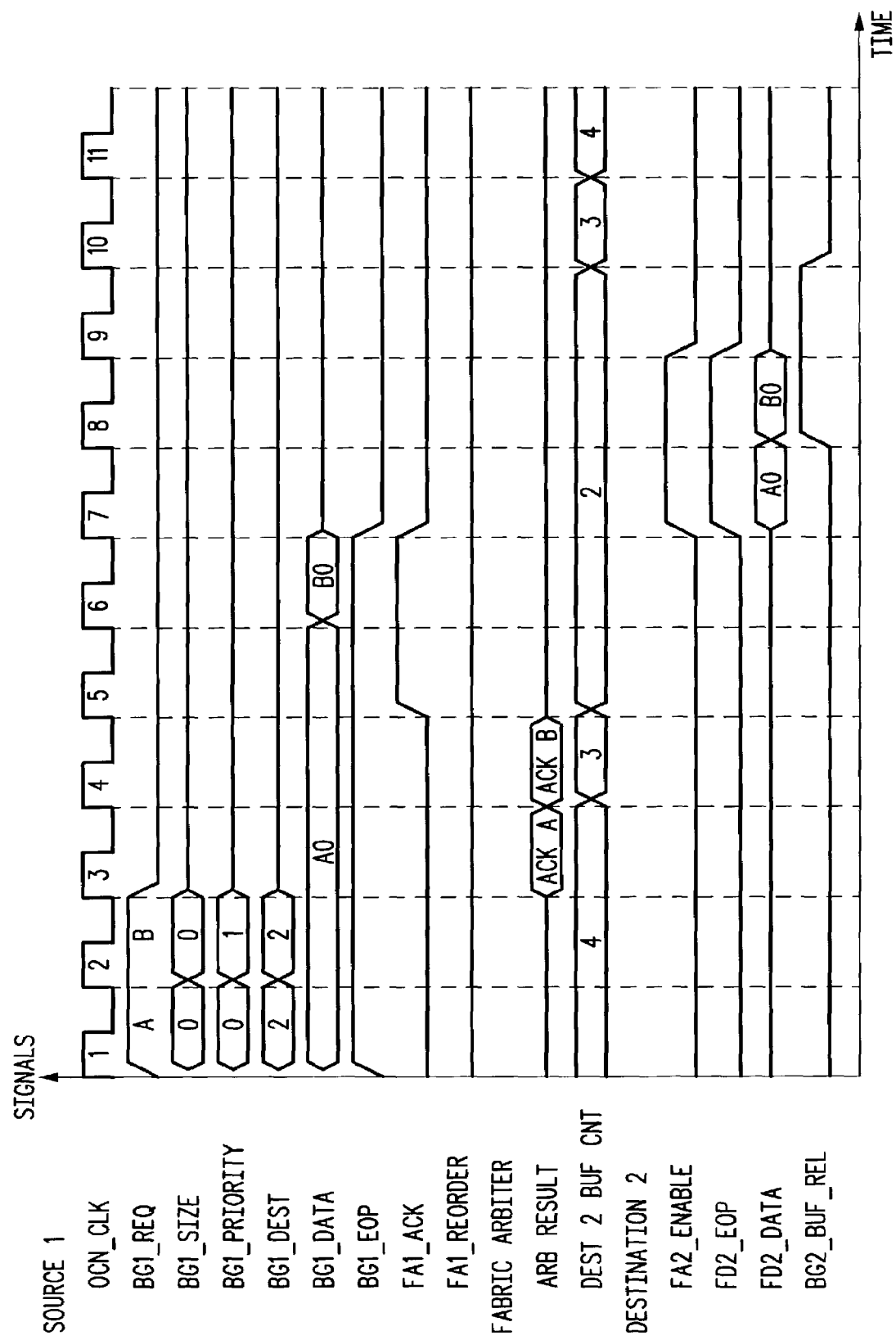

FIG. 13 illustrates a single datum packet followed by another single datum packet from Source 1 to Destination 2.

Figure 14:
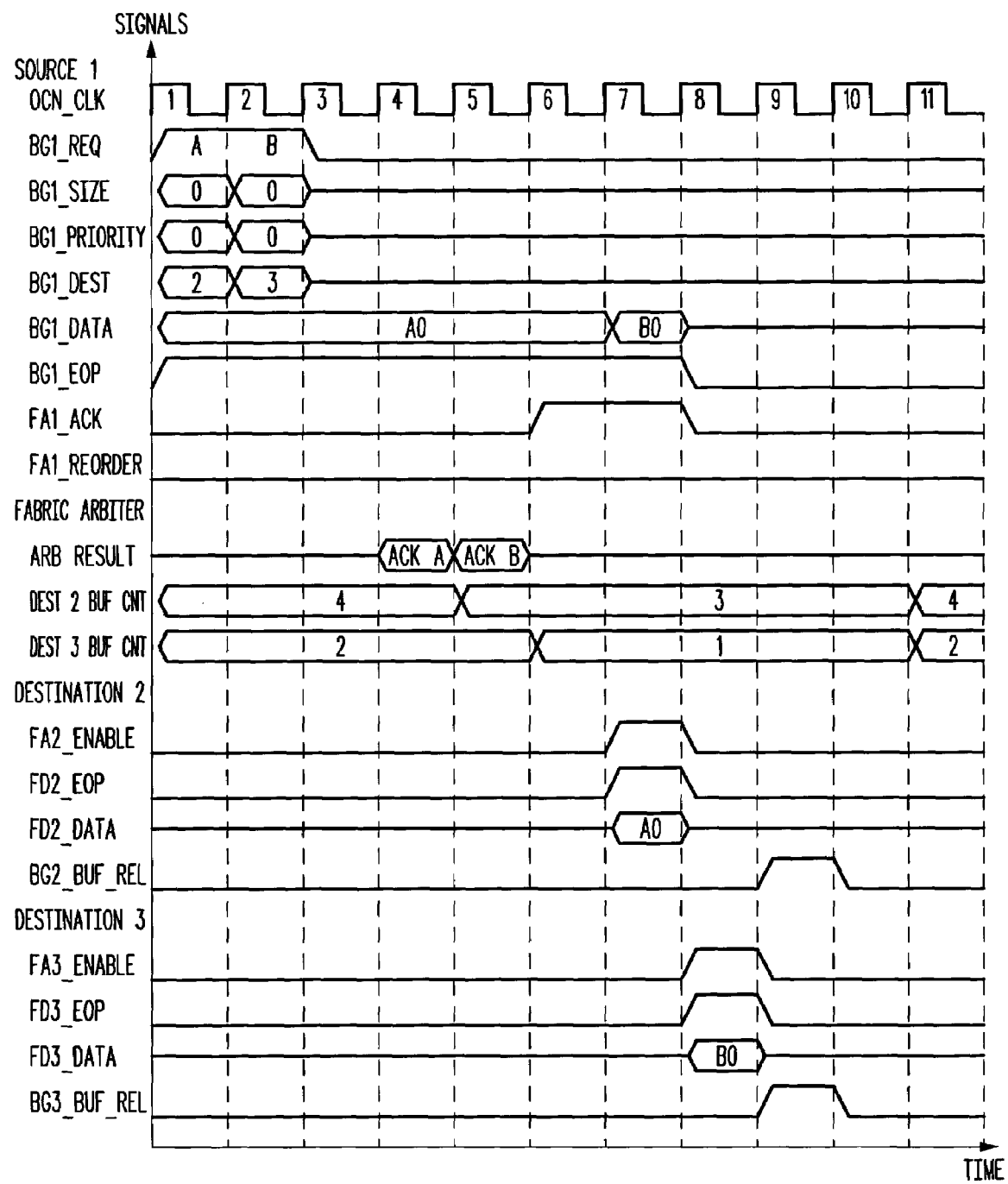
Figure 15:
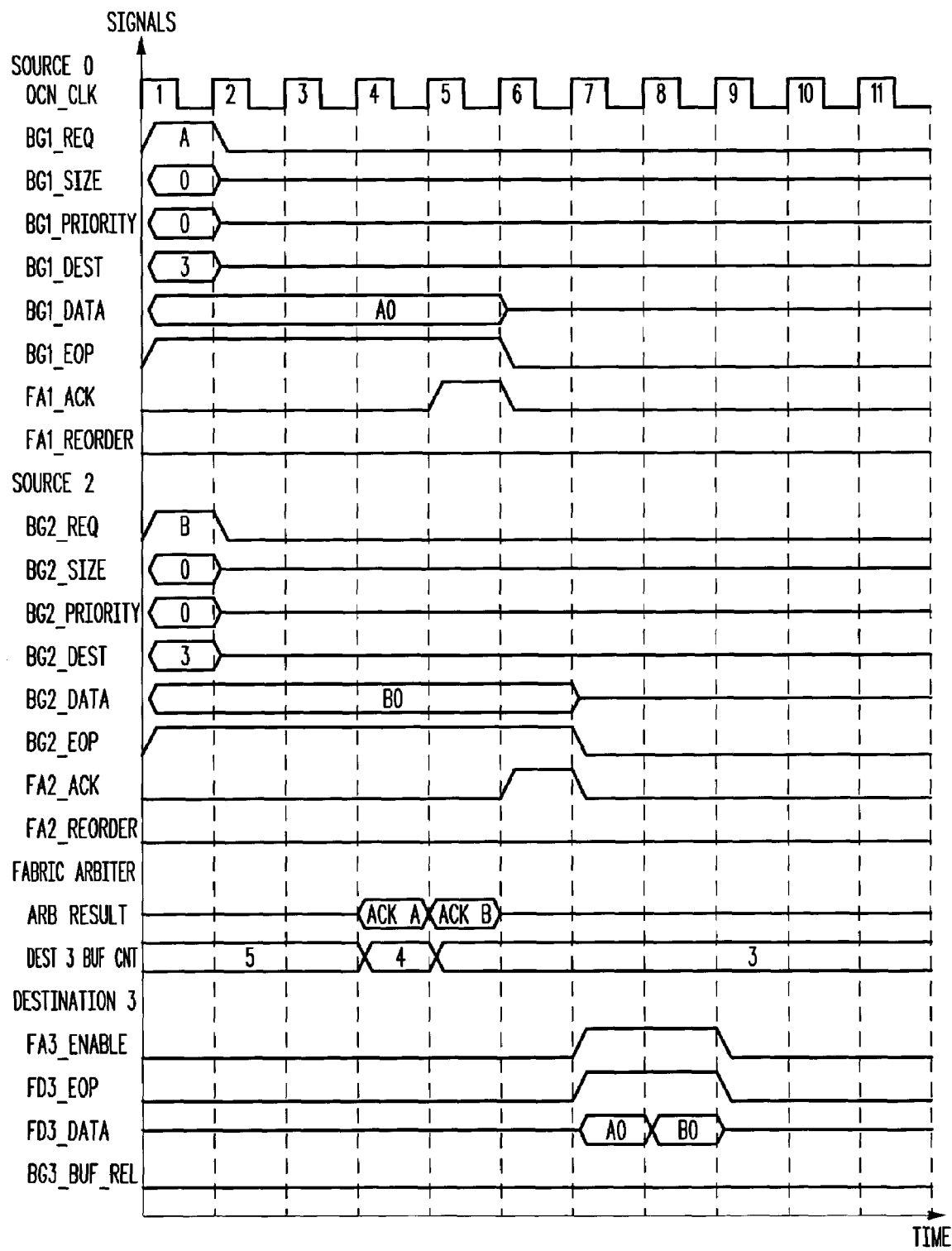
Figure 16:
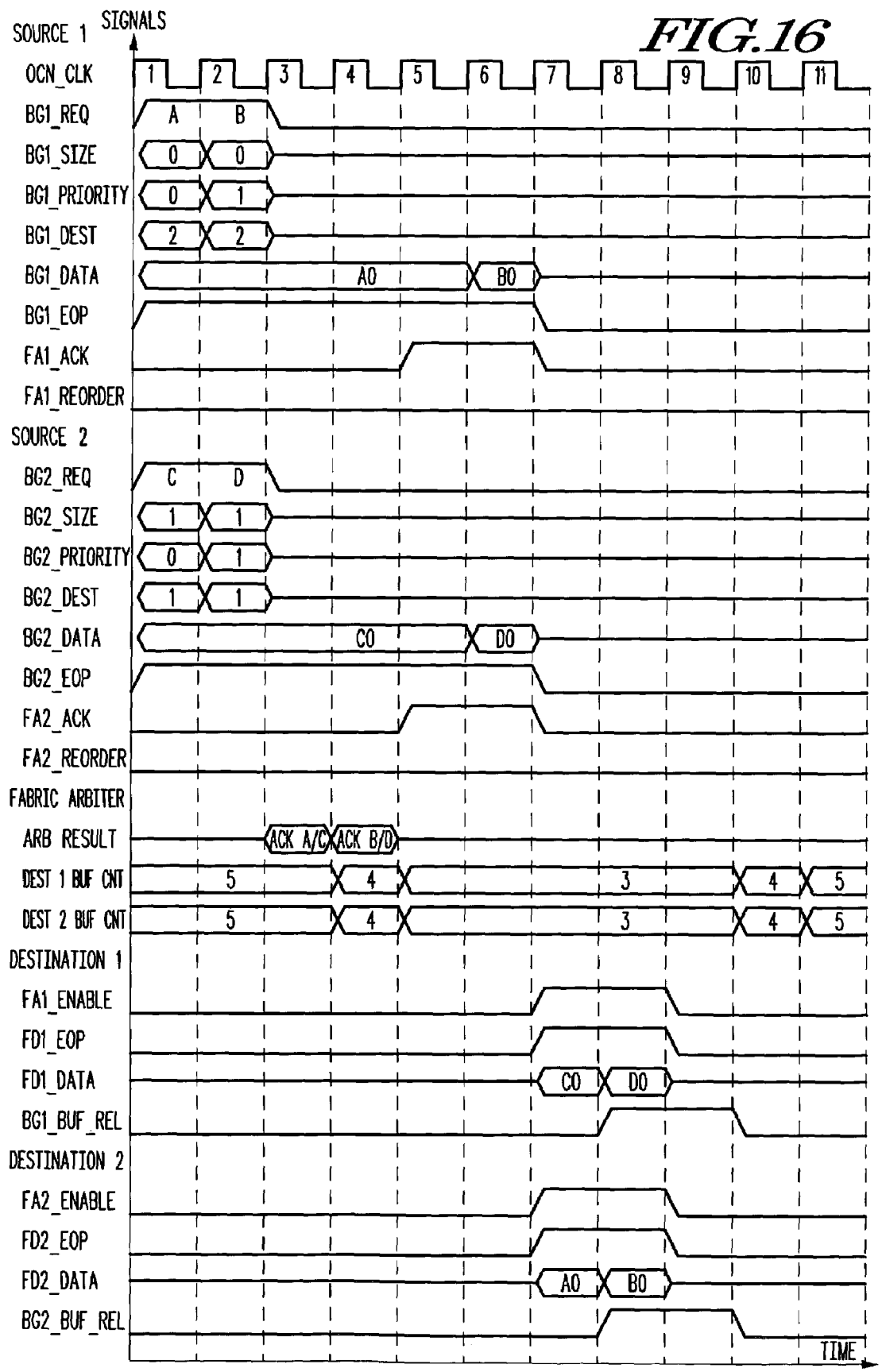

FIG. 14 illustrates a single datum packet from Source 1 to Destination 2 followed by another single datum packet from Source 1 to Destination 3. FIG. 15 illustrates a single datum packet from Source 1 to Destination 3 followed by another single datum packet from Source 2 to Destination 3. FIG. 16 illustrates a single datum packet followed by another single datum packet from Source 1 to Destination 2 illustrating two concurrent packet transfers.

Figure 17:
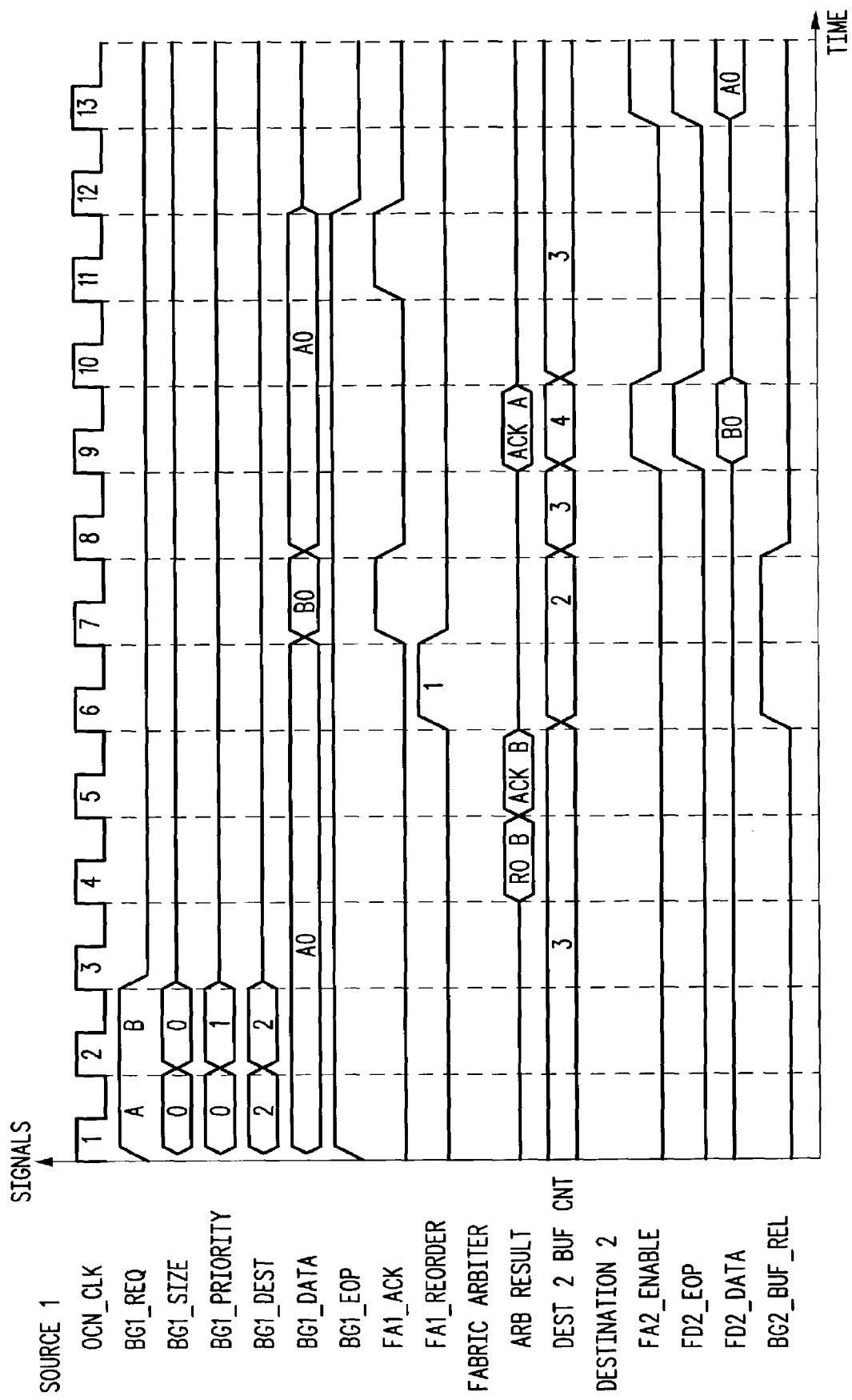

FIG. 17 illustrates a priority 0 single datum packet followed by a priority 1 single datum packet from Source 1 to Destination 2 in which re-ordering occurs. In this case, the second packet B is re-ordered in front of the first packet A since only three buffers are available at destination 1. Although this is not really a deadlock condition since the bg2_buf_rel signal asserted in clock 6 and 7, but the fabric arbiter 233 assumed it was.

Figure 18:
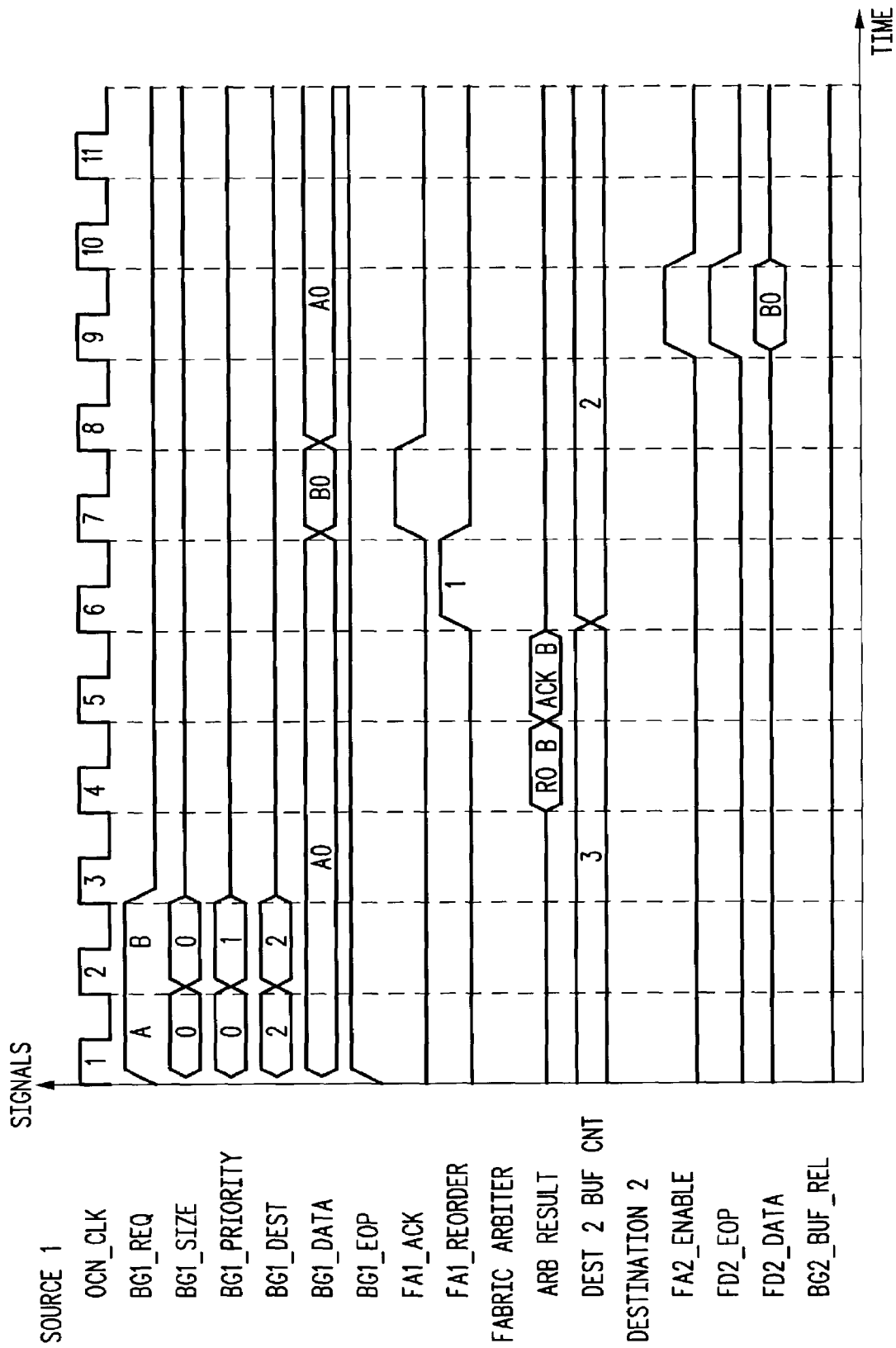

FIG. 18 illustrates a priority 0 single datum packet followed by a priority 1 single datum packet from Source 1 to Destination 2 in which re-ordering occurs. Note that the second packet B is re-ordered in front of the first packet A since only three buffers are available at destination 1. In this case, the re-ordering may have been needed to prevent deadlock.

Figure 19:
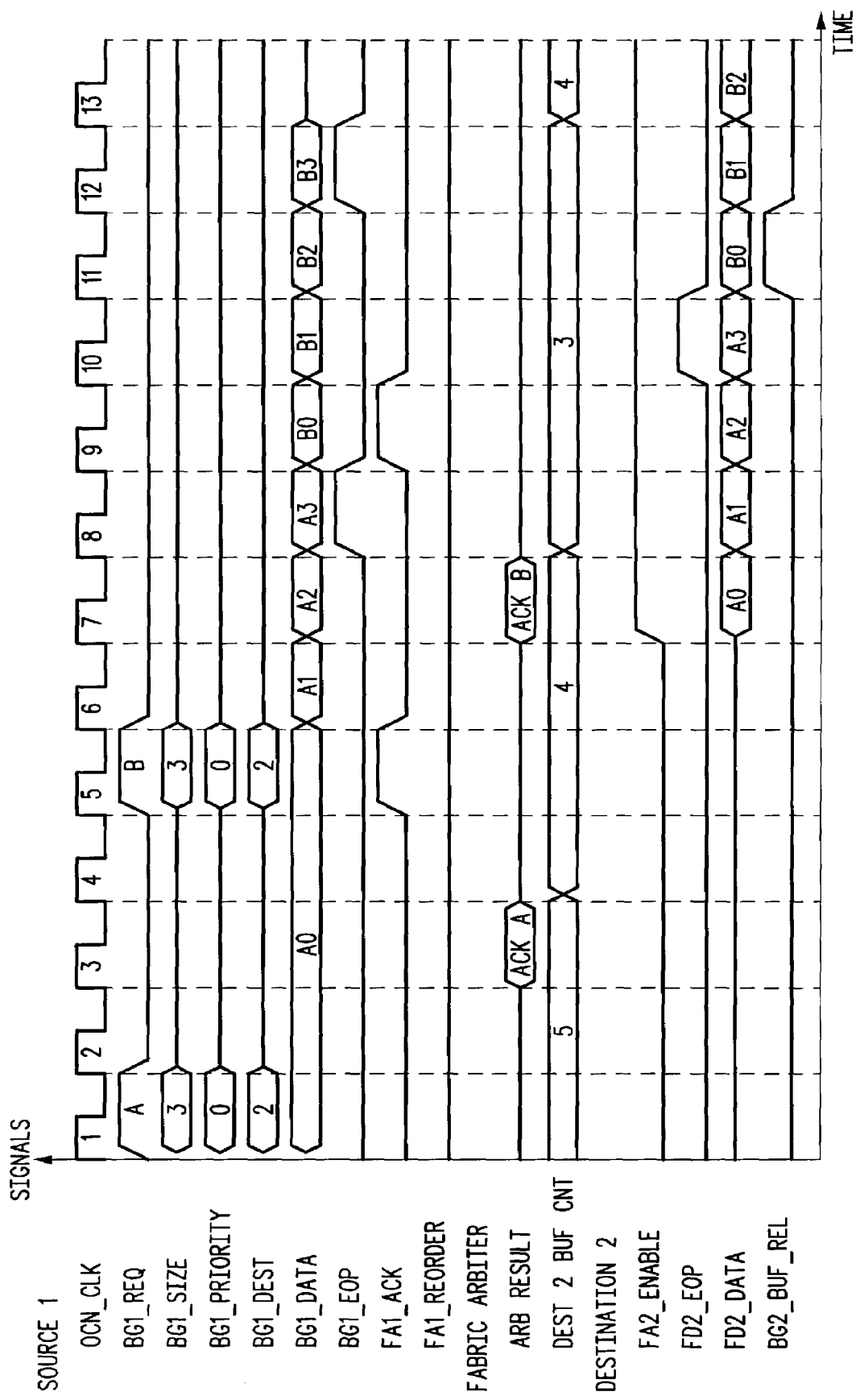

FIG. 19 illustrates a four datum packet A followed by another four datum packet B from Source 1 to Destination 2. Note that the second request for packet B is intentionally delayed until clock cycle 5 so that the source can pick the best packet transfer request. This is not required but is an optimization. A higher priority packet transfer request should not be delayed. If the fabric arbiter 233 supported head of line blocking re-ordering, a request to a different destination should also not be delayed.

Figure 20:
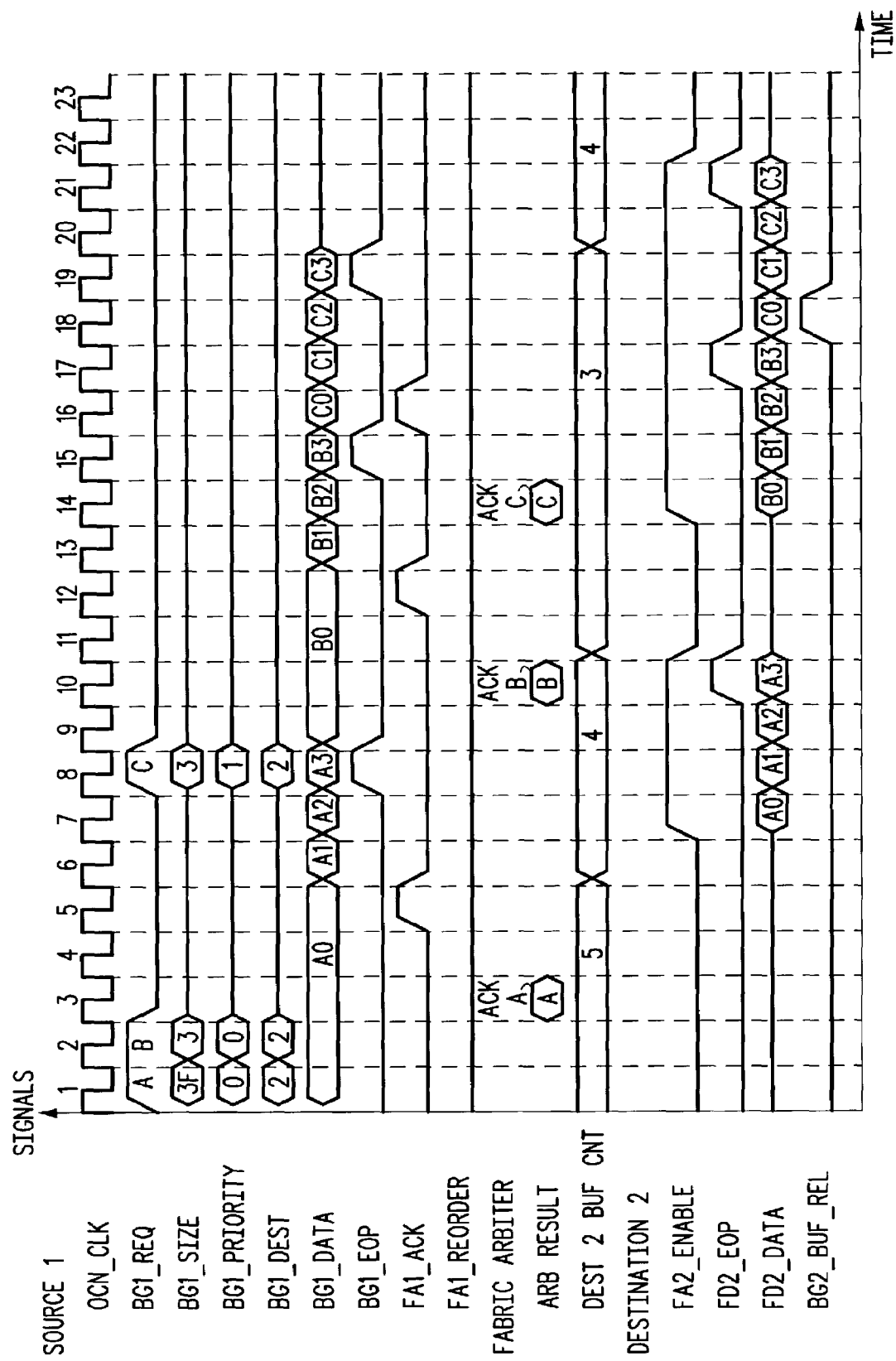

FIG. 20 illustrates a cut-through packet A followed by a four datum packet B and another four datum packet C from Source 1 to Destination 2 and illustrates the use of EOP for arbitration in a cut-through operation for packet A. The request size of 3Fh for packet A is equivalent to the binary representation 111111b to indicate the cut-through mode of operation. Since the fabric arbiter 233 does not know the size of packet A, three dead clock cycles between the transactions results even though packet A is eventually four datums in length. The number of dead cycles is one less than the arbitration latency of the particular fabric arbiter implemented. The use of EOP for arbitration mode, as illustrated by the bg1_eop signal, allows sources to begin transmission of a packet before the full size is known or before all data has been received.

FIGS. 21–27 are miscellaneous timing diagrams based on the OCN 301 having arbitration latency of 0 and datapath latency of 0. The signals of each are plotted versus time in a similar manner as previous Figures and the OCN_CLK signal is shown at top to provide a timing reference. In this case, the fabric gaskets 111 are removed as well as other register sets. For implementations with 0 arbitration and 0 datapath latency, there is a combinational logic-only path from the bgn_req signal to the fan_ack signal. Although not shown, there are sequential elements in the fabric arbiter 333. Such implementations with 0 latency are limited in frequency of operation, and it is included here to illustrate the latency independence of the OCN protocol.

Figure 21:
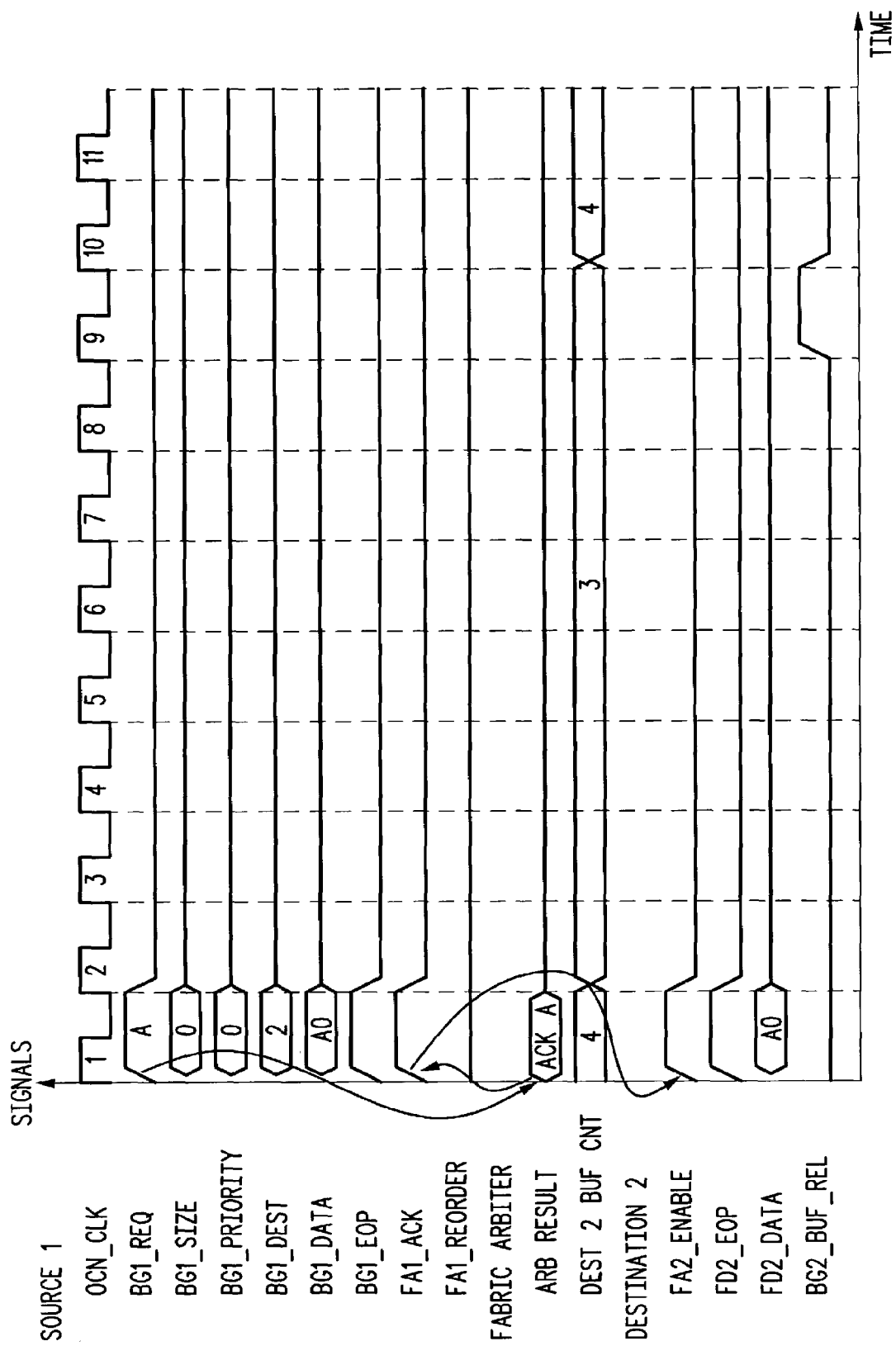
FIGS. 21–27 are miscellaneous timing diagrams based on the OCN of FIG. 3 having arbitration latency of 0 and datapath latency of 0.

FIG. 21 illustrates a single datum packet A from Source 1 to Destination 2. The arrows shown indicate combinatorial logic paths. These paths exist for all of the 0 latency cases. These waveforms show only functionality and do not reflect the delay associated with combinatorial logic paths.

Figure 22:
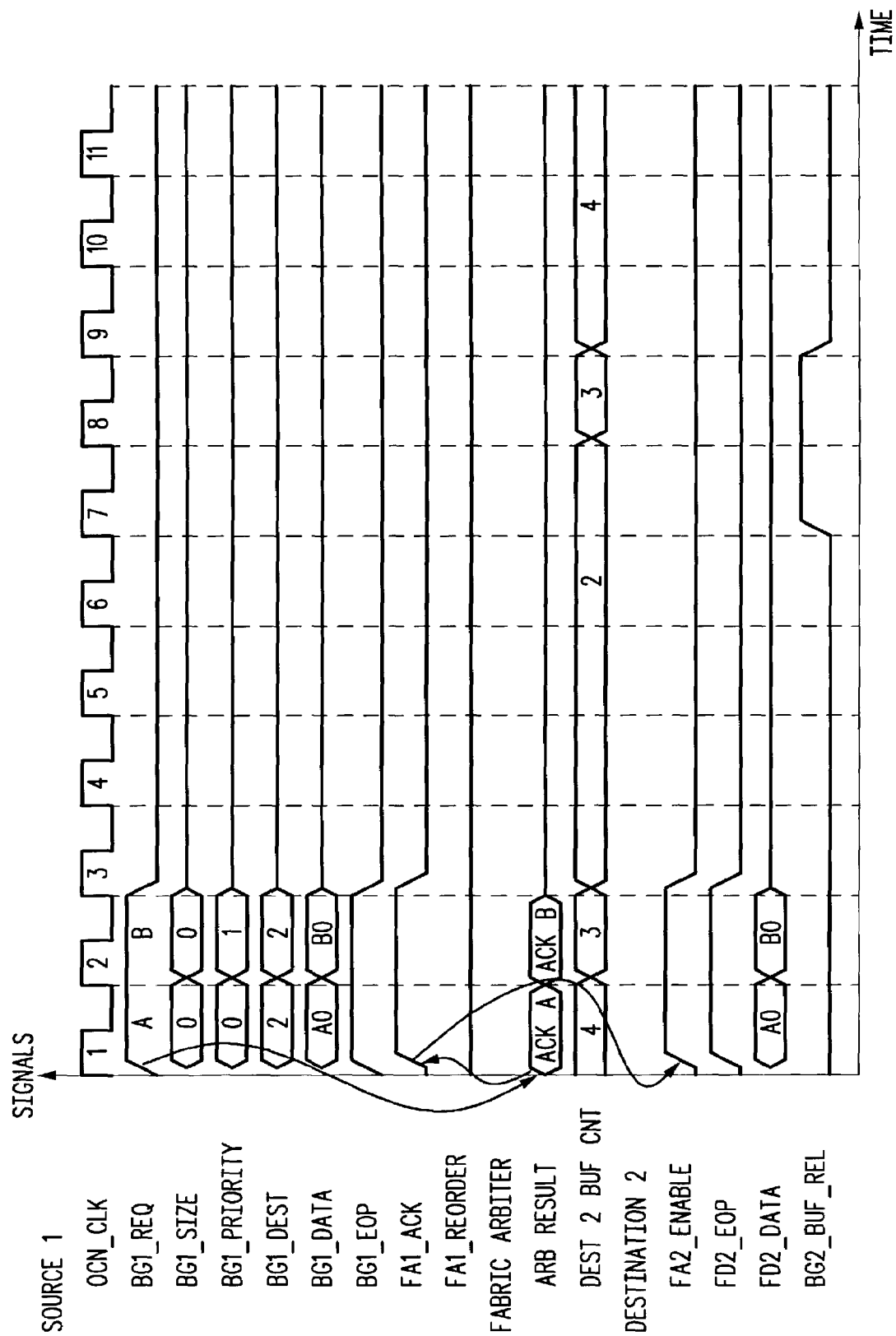
Figure 23:
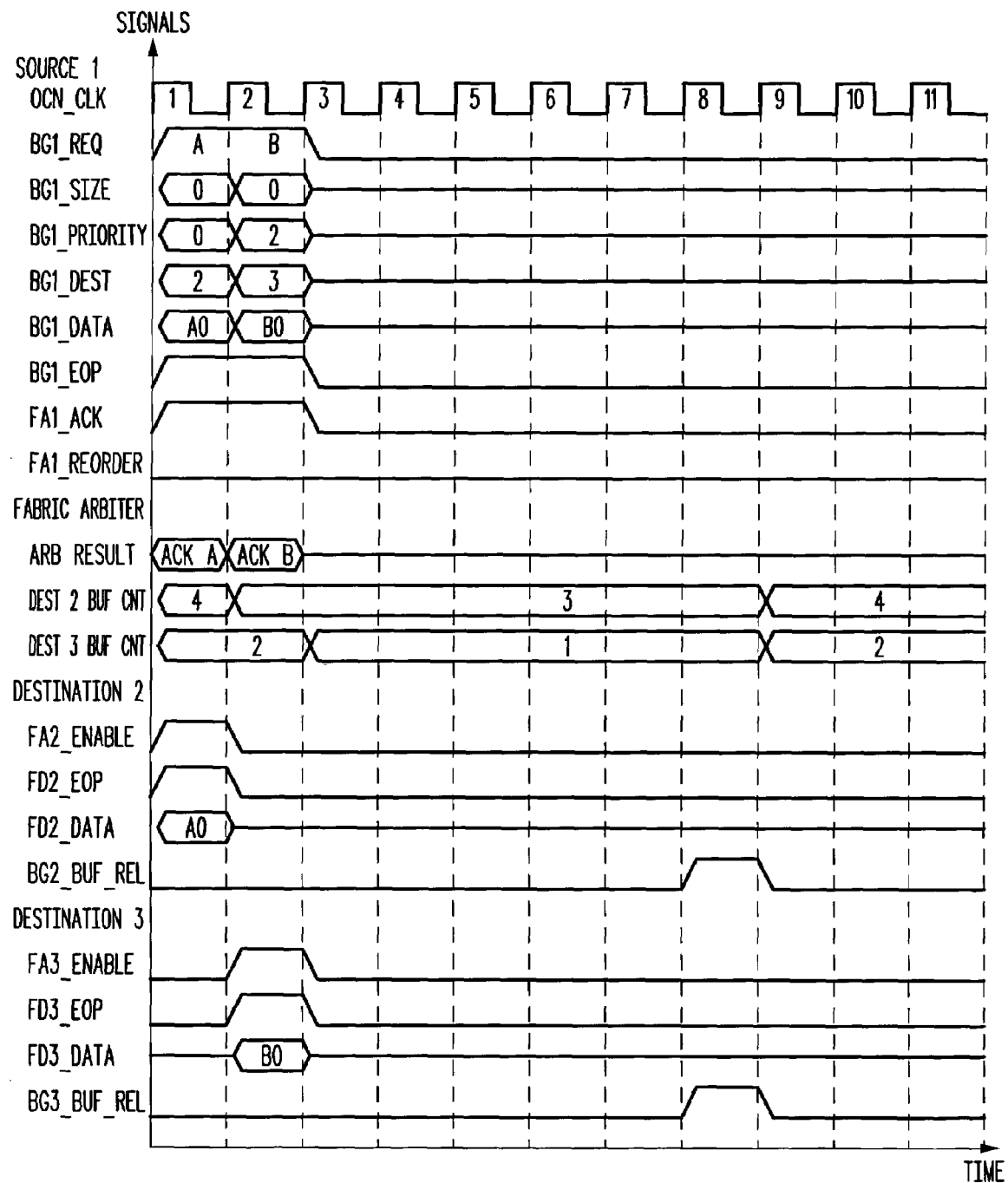
Figure 24:
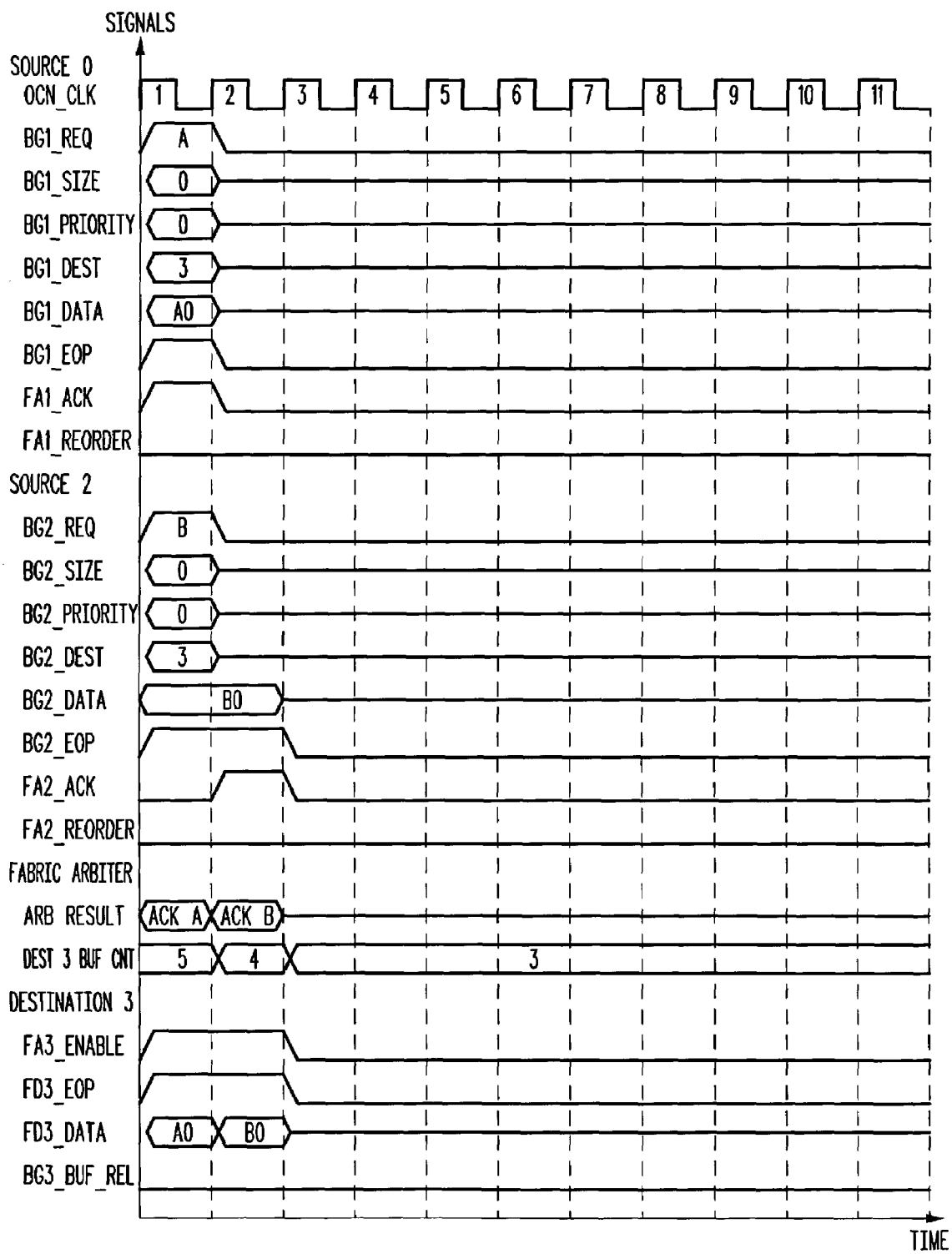

FIG. 22 illustrates a single datum packet A followed by another single datum packet B from Source 1 to Destination 2. FIG. 23 illustrates a single datum packet A from Source 1 to Destination 2 followed by another single datum packet B from Source 1 to Destination 3. FIG. 24 illustrates a single datum packet A from Source 1 to Destination 3 followed by another single datum packet B from Source 2 to Destination 3.

Figure 25:
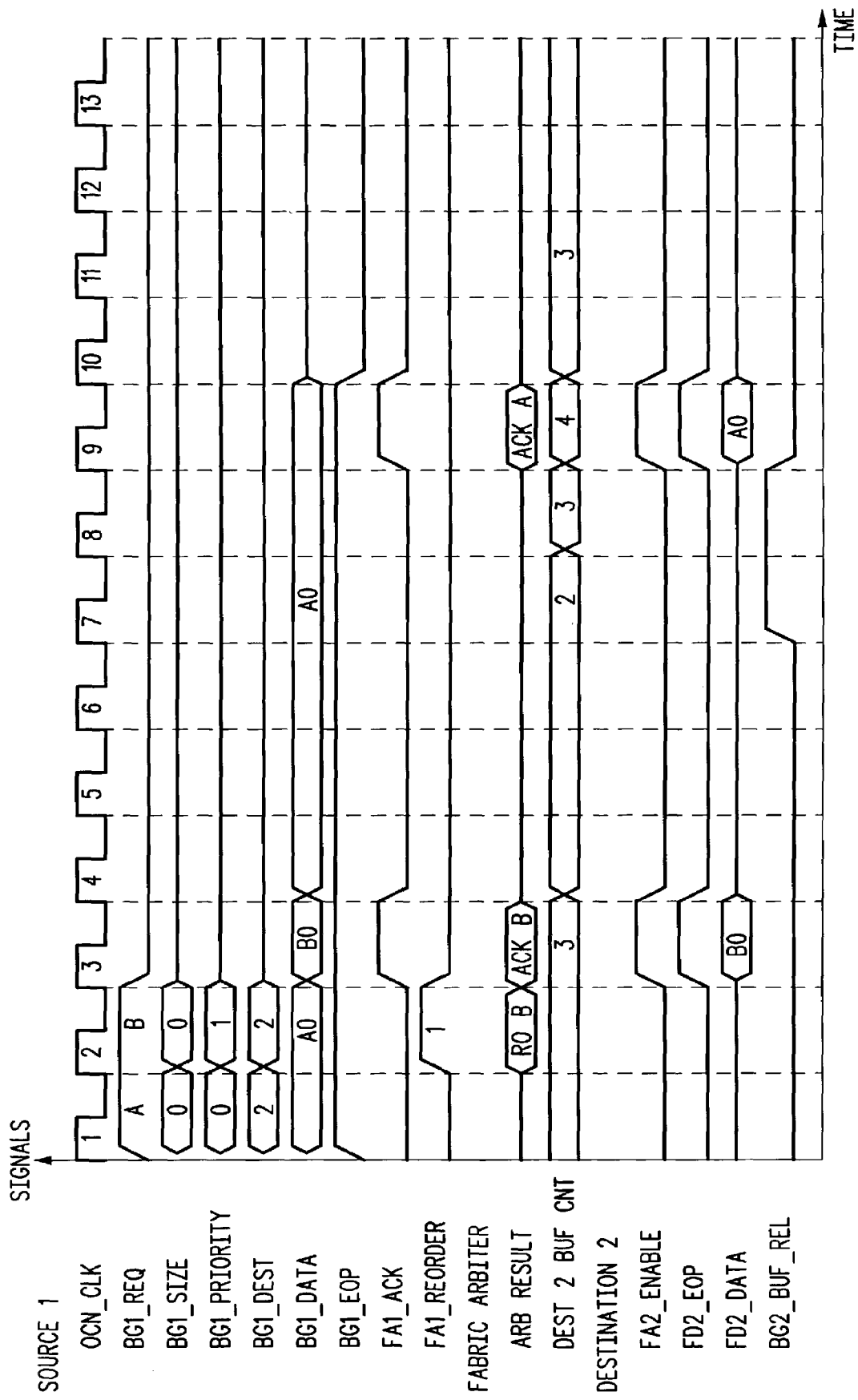

FIG. 25 illustrates a priority 0 single datum packet A followed by a priority 1 single datum packet B from Source 1 to Destination 2 in which re-ordering occurs. In this case, the second packet B is re-ordered in front of the first packet A since only three buffers are available at destination 1. Although this is not really a deadlock condition since the bg2_buf_rel signal asserted in clock 7 and 8, but the fabric arbiter 233 assumed it was.

Figure 26:
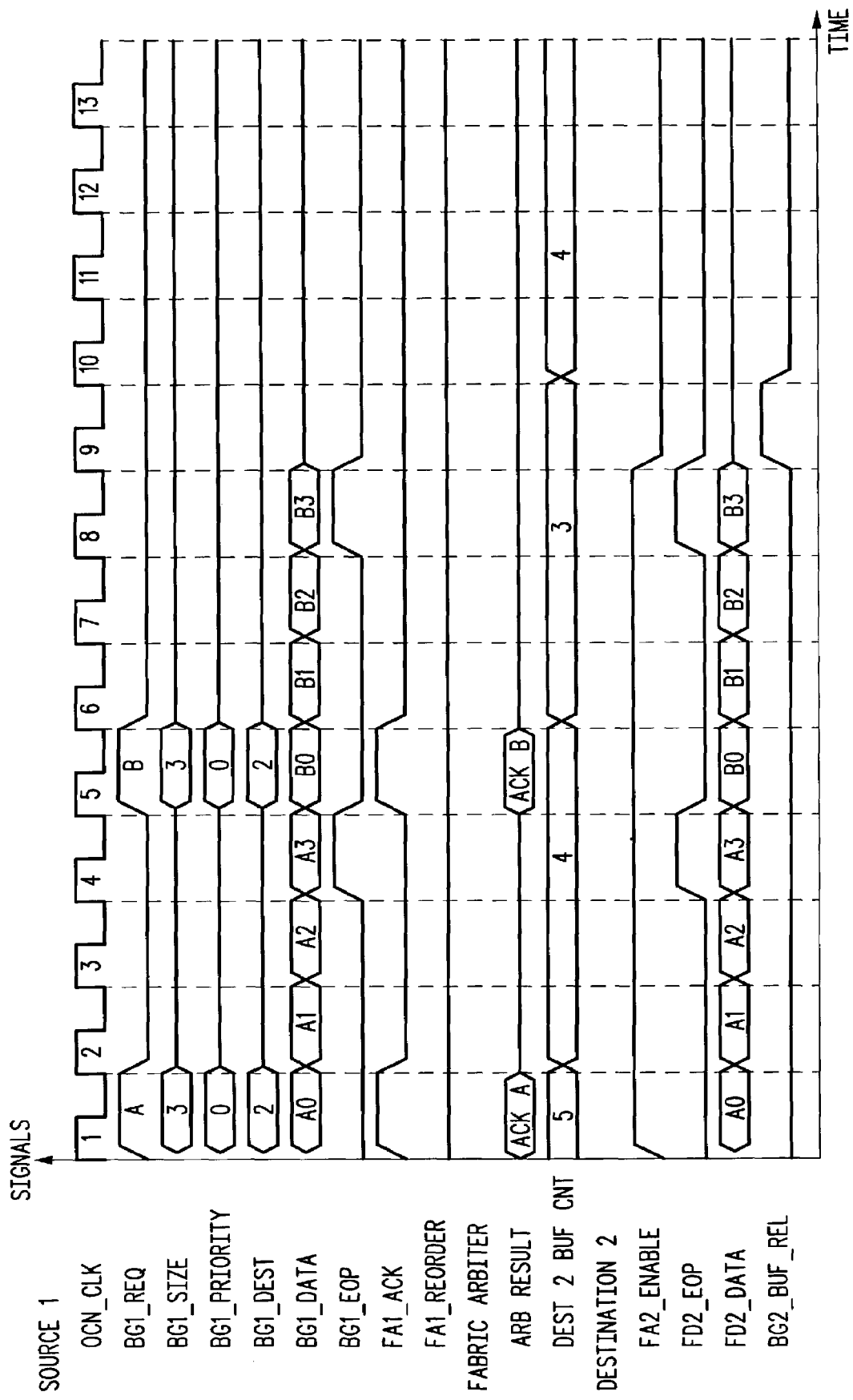

FIG. 26 illustrates a four datum packet A followed by another four datum packet B from Source 1 to Destination 2. Note that the second request for packet B is intentionally delayed until clock cycle 5 so that the source can pick the best packet transfer request. As stated before, this is not required but is an optimization.

Figure 27:
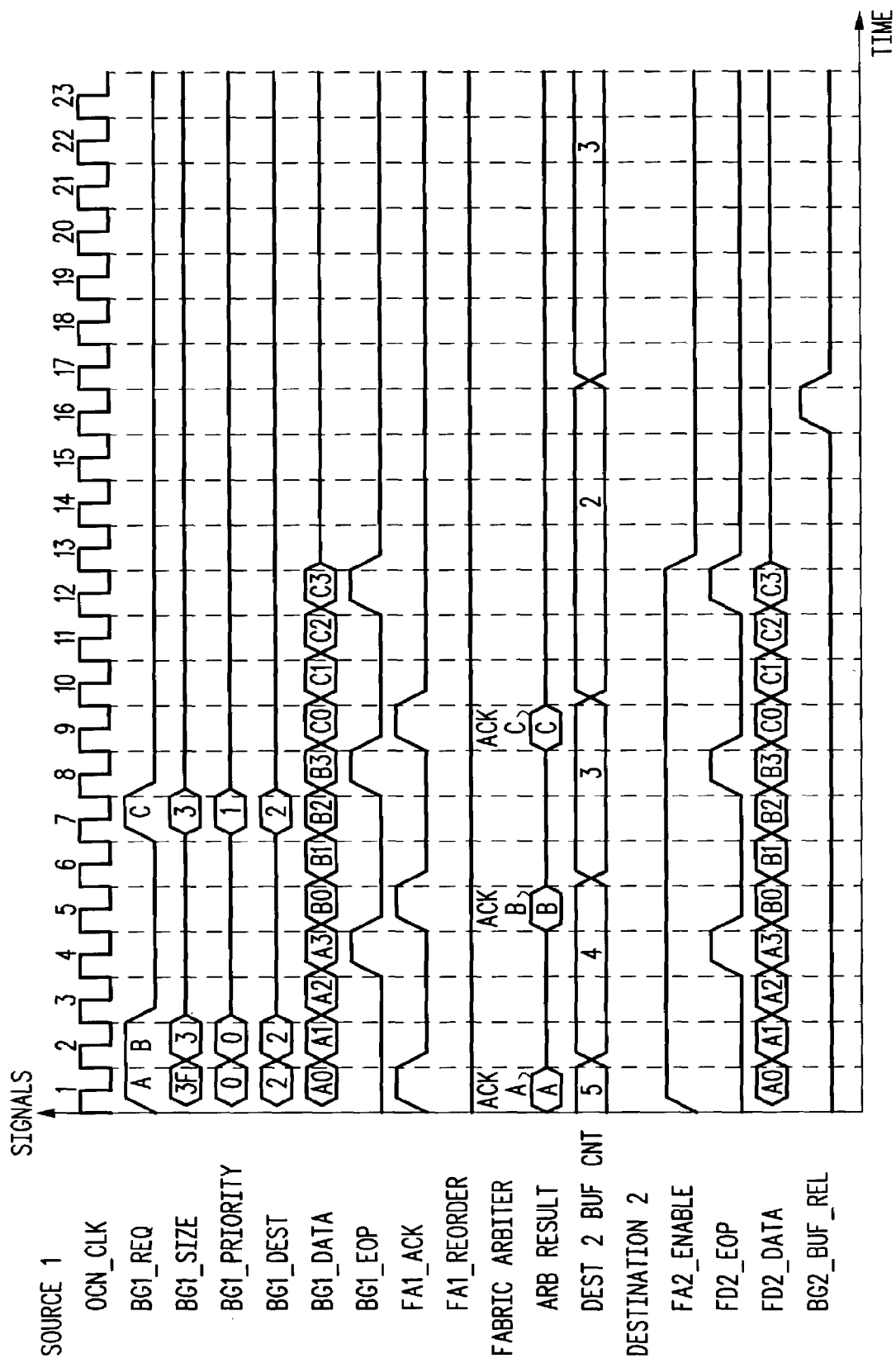

FIG. 27 illustrates a cut-through packet A followed by a four datum packet B and another four datum packet C from Source 1 to Destination 2 and further illustrates the use of EOP for arbitration in a cut-through operation. The request size of 3Fh for packet A indicates the cut-through mode of operation as previously described. Since the fabric arbiter 333 does not know the size of packet A, dead clock cycles result even though packet A is eventually four datums in length. The use of EOP for arbitration mode, as illustrated by the bg1_eop signal, allows sources to begin transmission of a packet before the full size is known or before all data has been received. The bg1_eop signal must be sampled before it is used to start the arbitration process.

FIGS. 28–34 are miscellaneous timing diagrams based on the OCN 501 having arbitration latency of 3 and datapath latency of 2. The signals of each are plotted versus time in a similar manner as previous Figures and the OCN_CLK signal is shown at top to provide a timing reference.

Figure 28:
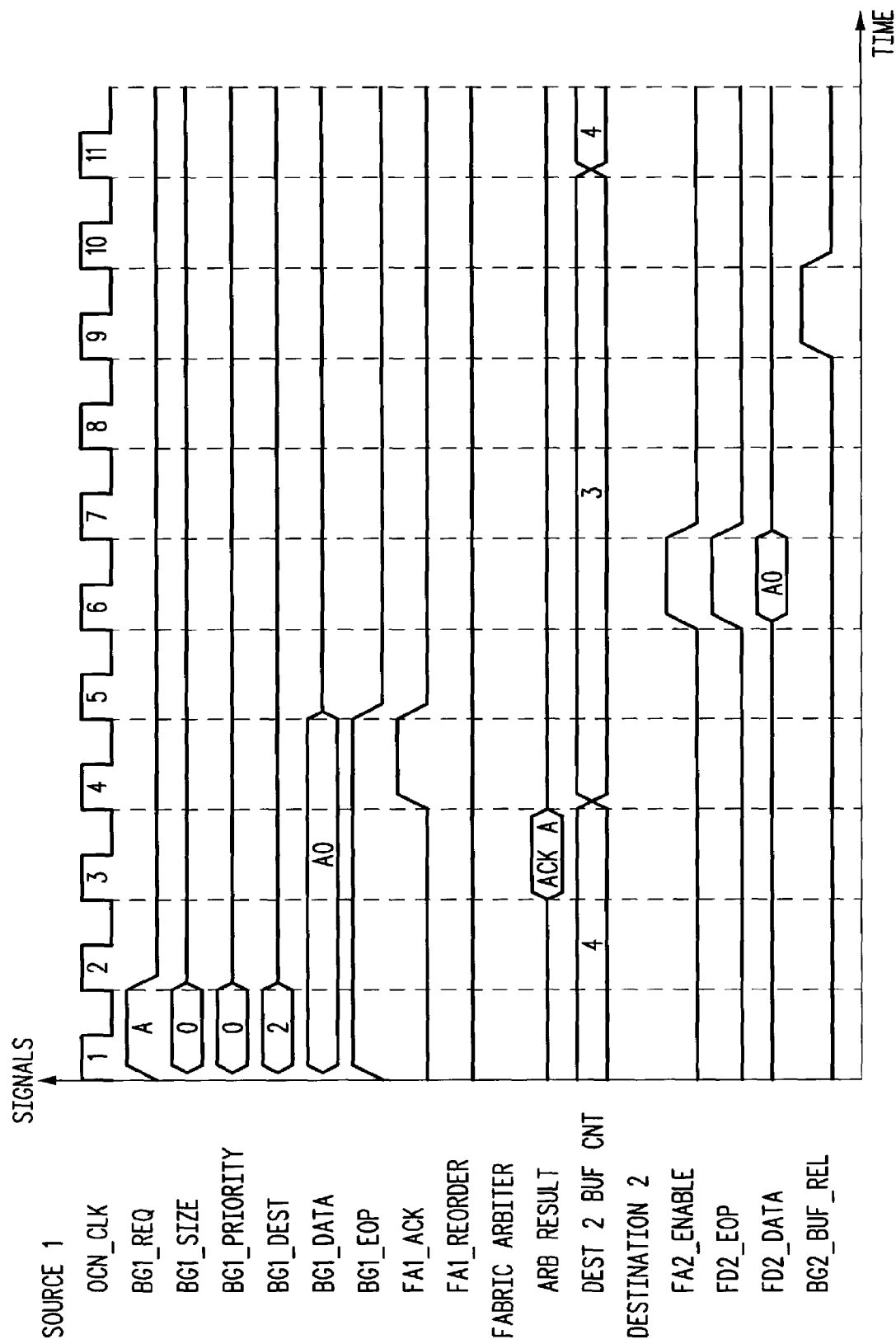
FIGS. 28–34 are miscellaneous timing diagrams based on the OCN of FIG. 5 having arbitration latency of 3 and datapath latency of 2.
Figure 29:
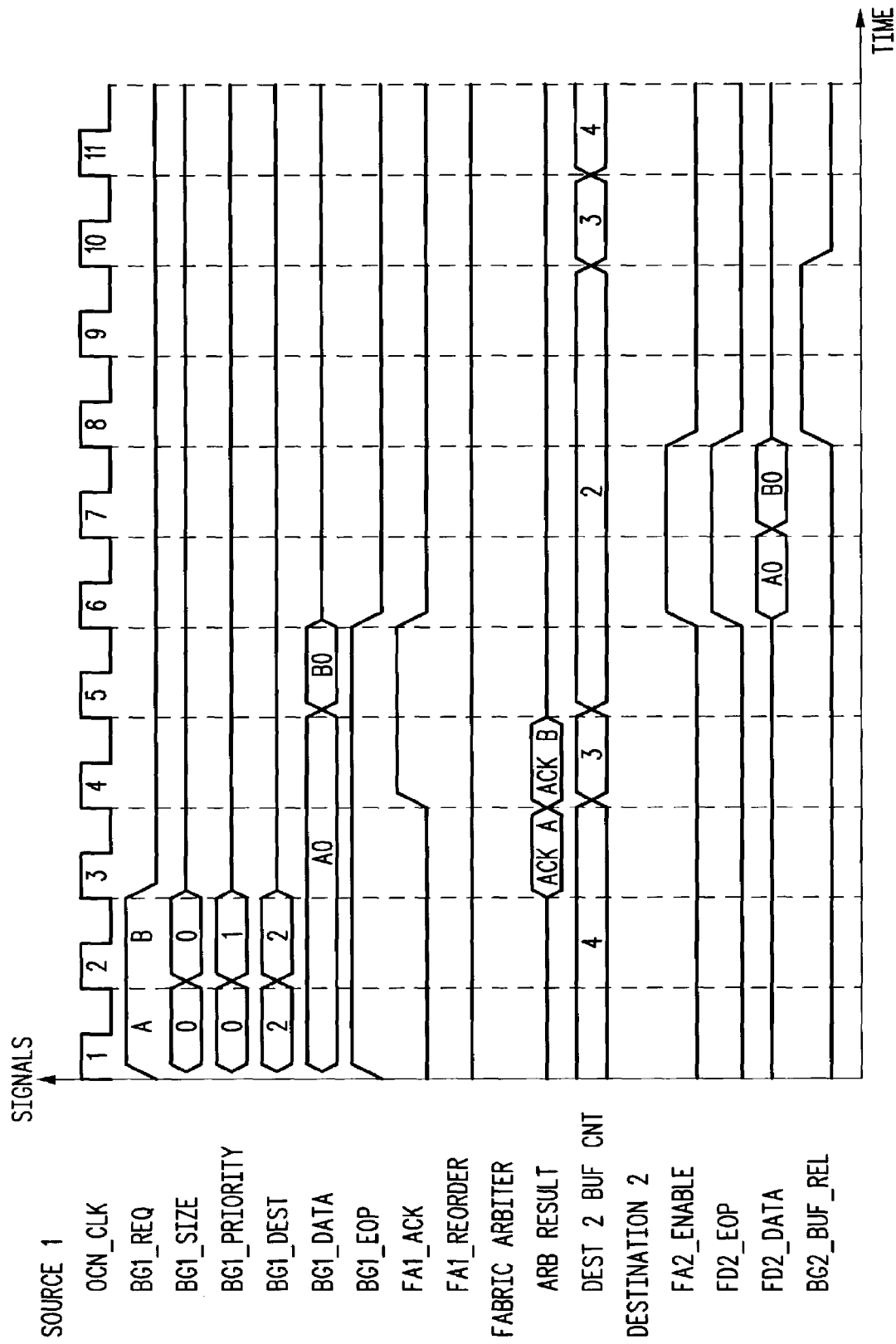
Figure 30:
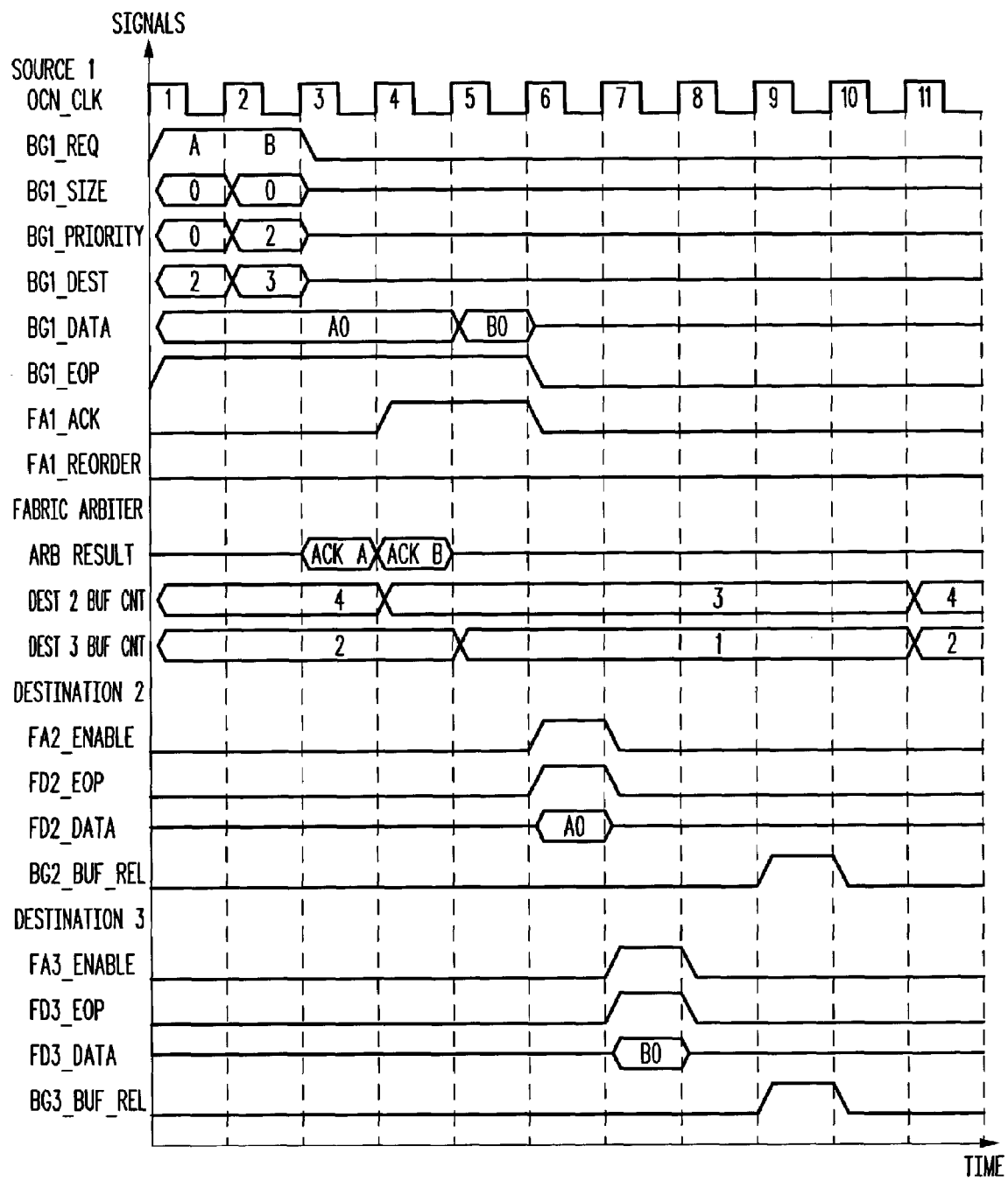
Figure 31:
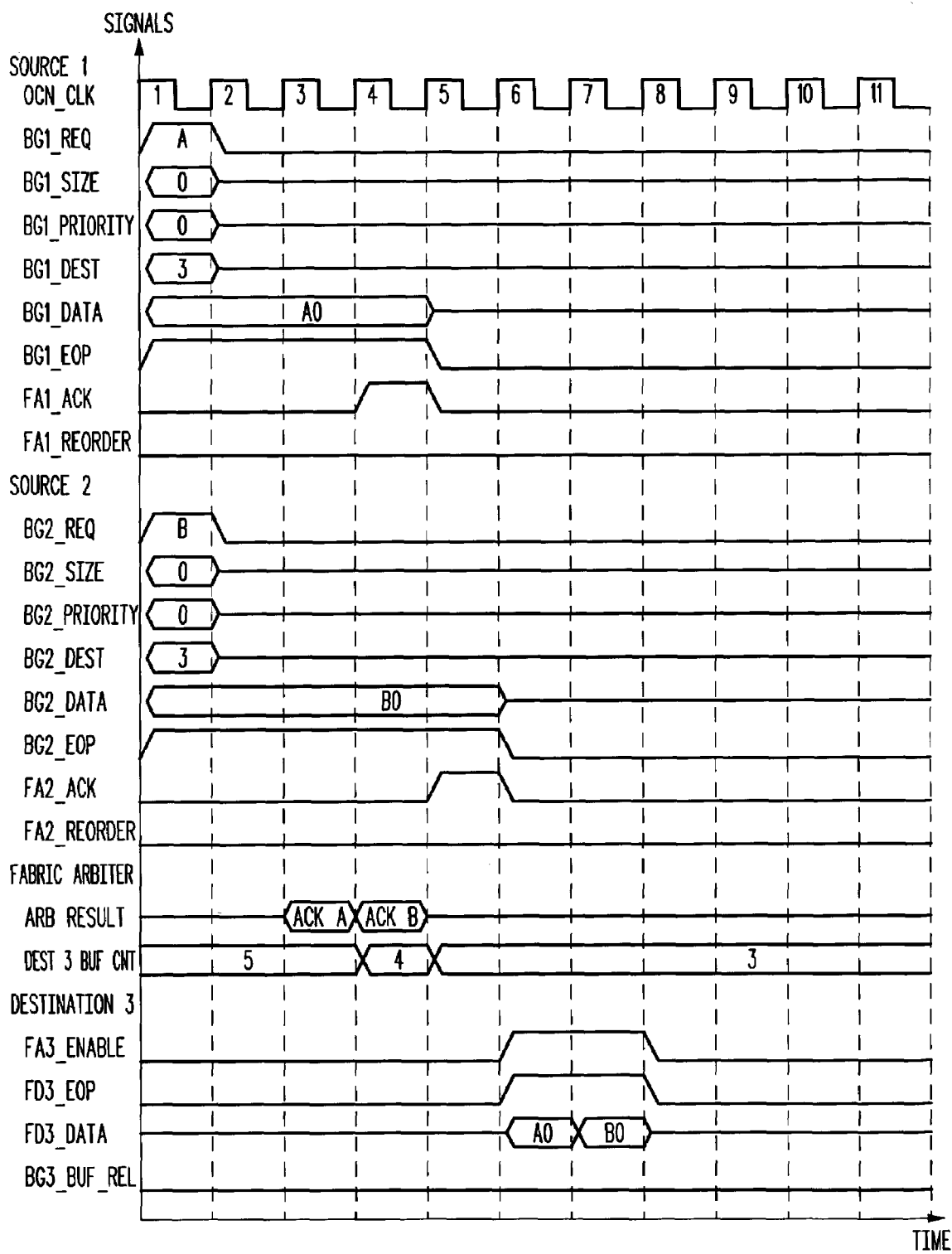

FIG. 28 illustrates a single datum packet A from Source 1 to Destination 2. FIG. 29 illustrates a single datum packet A followed by another single datum packet B from Source 1 to Destination 2. FIG. 30 illustrates a single datum packet A from Source 1 to Destination 2 followed by another single datum packet B from Source 1 to Destination 3. FIG. 31 illustrates a single datum packet A from Source 1 to Destination 3 followed by another single datum packet B from Source 2 to Destination 3.

Figure 32:
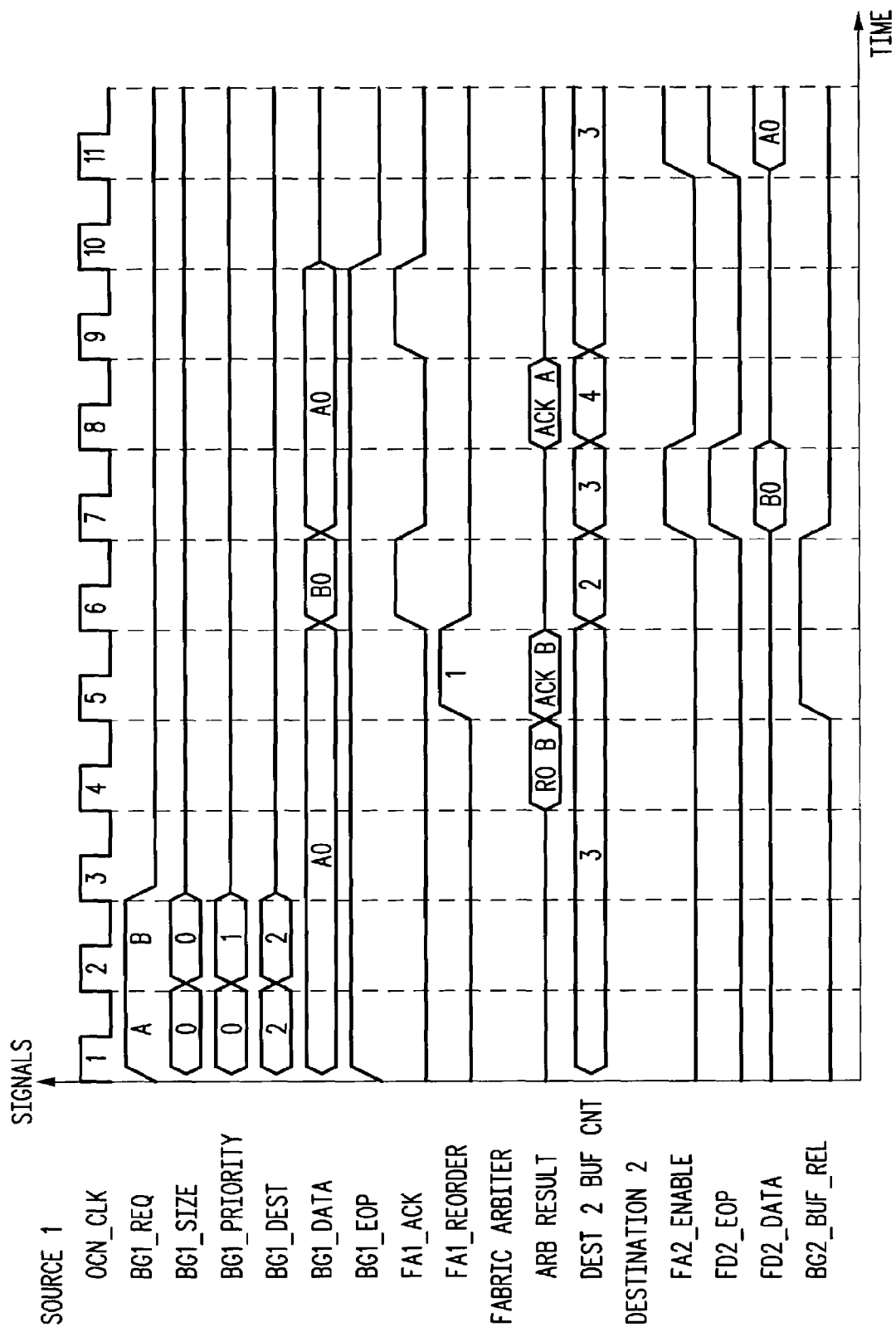

FIG. 32 illustrates a priority 0 single datum packet A followed by a priority 1 single datum packet B from Source 1 to Destination 2 in which re-ordering occurs. In this case, the second packet B is re-ordered in front of the first packet A since only three buffers are available at destination 1. Again, this is not really a deadlock condition although the fabric arbiter 433 assumed it was.

Figure 33:
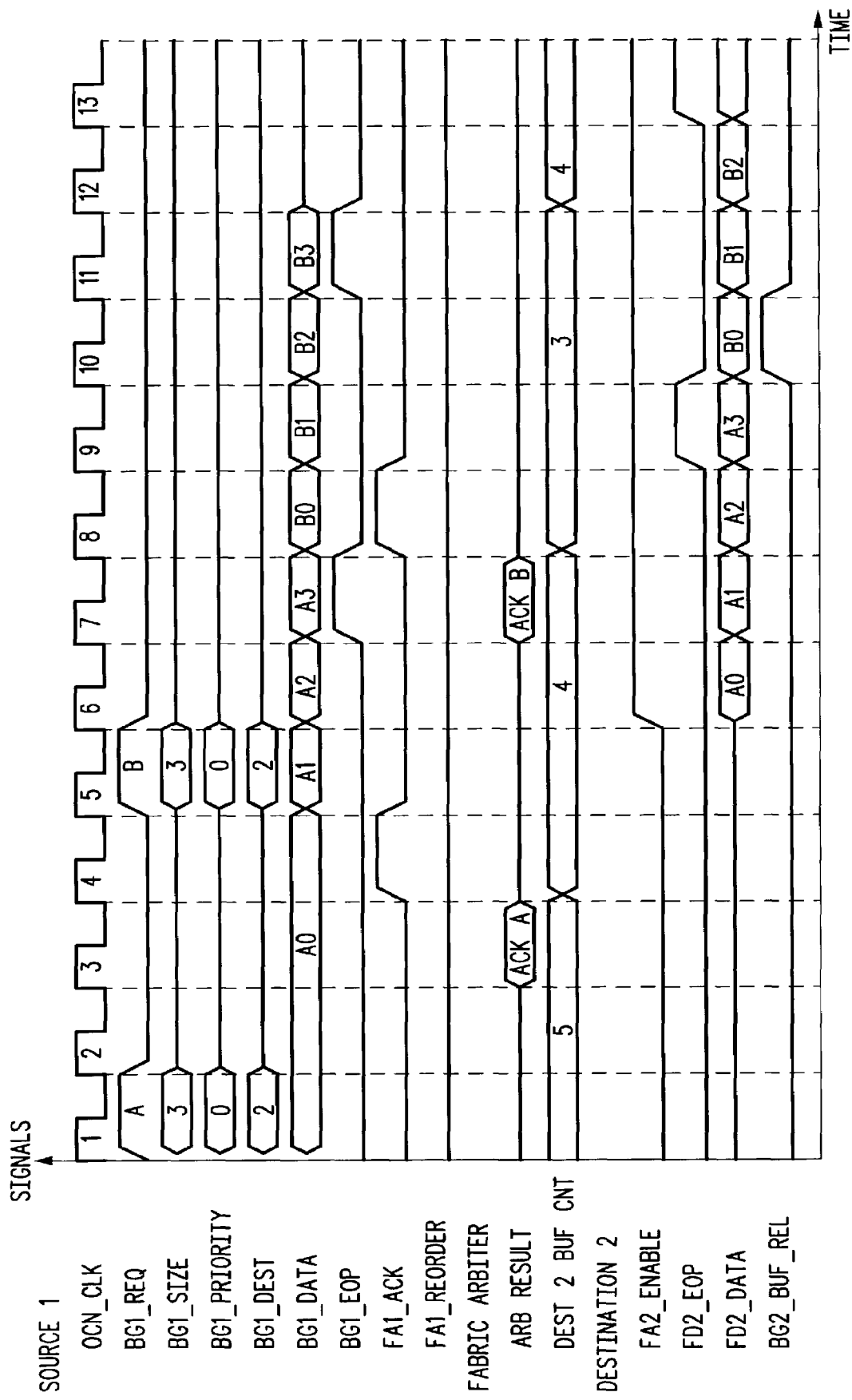

FIG. 33 illustrates a four datum packet A followed by another four datum packet B from Source 1 to Destination 2. Again, as an optimization, the second request for packet B is intentionally delayed until clock cycle 5 so that the source can pick the best packet transfer request.

Figure 34:
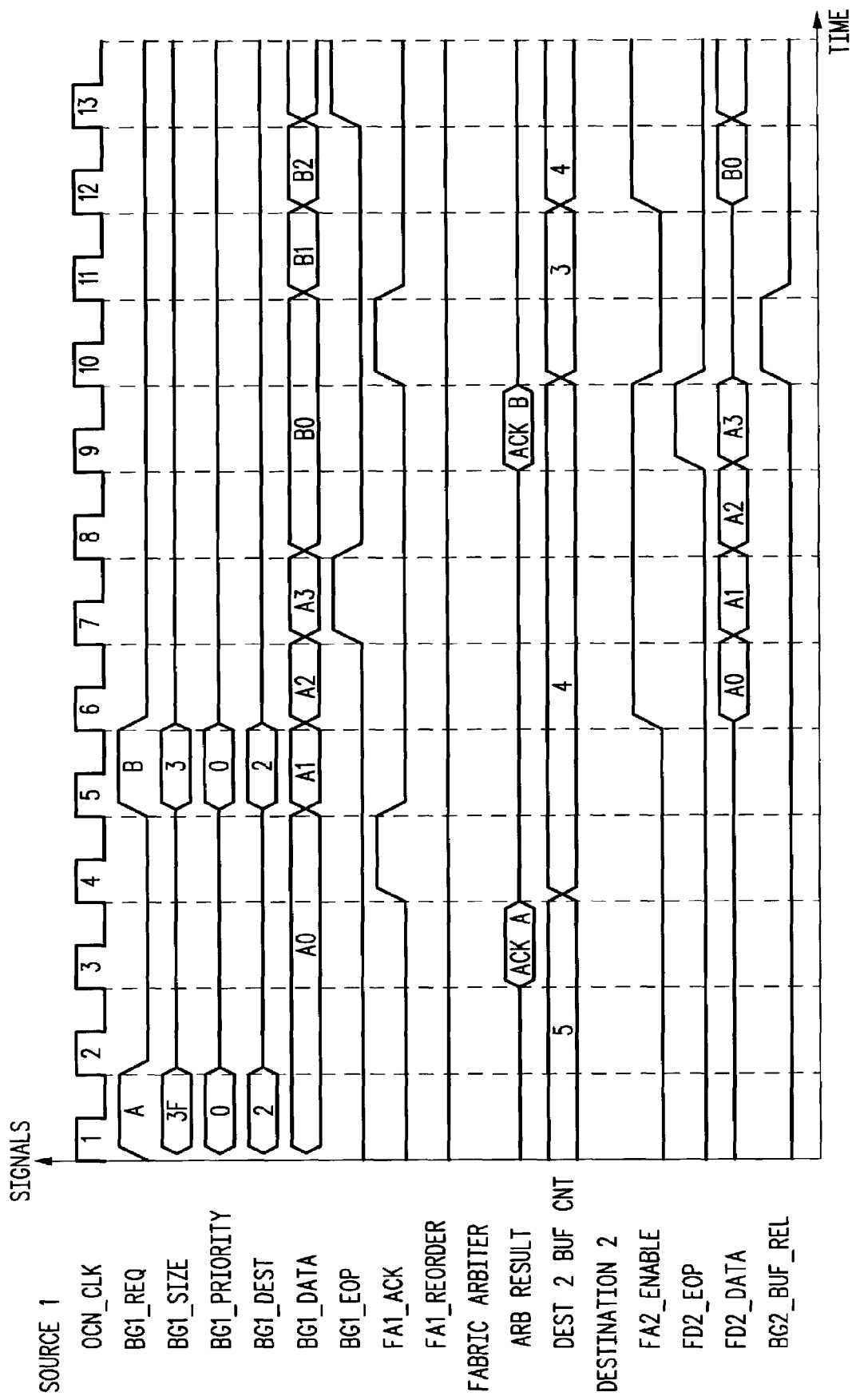

FIG. 34 illustrates a cut-through packet A followed by a four datum packet B from Source 1 to Destination 2 and further illustrates the use of EOP for arbitration in a cut-through operation. The request size of 3Fh indicates the cut-through mode of operation as previously described, and again packet A is eventually four datums in length. Since the fabric arbiter 433 does not know the size of packet A, two dead clock cycles result.

It is appreciated that the number of processing elements 103 and that the type of processing elements are both independent of the interconnect fabric 110. The bus gaskets 107 provide the appropriate translation between each processor bus and the OCN interface for each OCN port, if necessary. Pipeline stages can easily be added allowing the frequency of the interconnect fabric 110 to be tuned for particular applications. The datapath width can be from one to any desired number since the OCN protocol is agnostic of datapath width. The interconnect is designed with a maximum datum width selected to support all of the selected logical layer protocols, although different logical layer protocols using smaller datum widths may be used in the same system. The packet size is included with the transaction request to eliminate dead cycles to maximize bandwidth utilization of the interconnect, although a cut-through mode is also available to enable a source port to begin a transaction before the size is known. The OCN system provides an efficient method of tracking destination buffers. The OCN protocol provides an efficient method of re-ordering transactions when necessary to avoid deadlocks and to relieve head of line blocking. The physical layer has a consistent port definition that is independent of the processing elements included. The OCN system is scalable in terms of frequency, concurrency and datapath width. Regarding concurrency, the interconnect 113 may be implemented with as many concurrent datapaths as useful to support a given application. The OCN interface protocol enables fill utilization of bandwidth with no dead cycles and allows full utilization of fabric concurrency.

Figure 35:
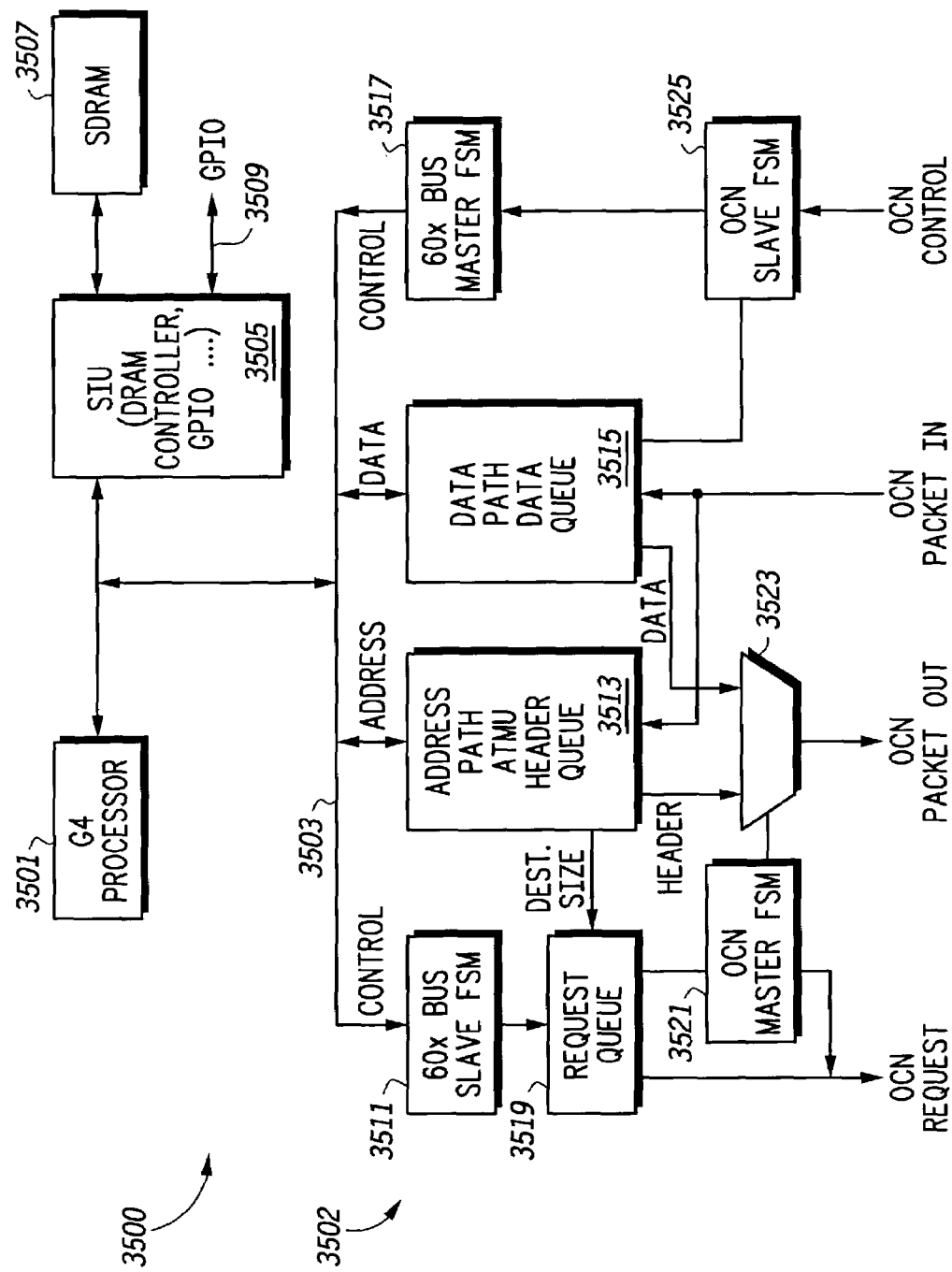
FIG. 35 is a more detailed block diagram of an exemplary processing element interface between a processing element and an exemplary bus gasket.

FIG. 35 is a more detailed block diagram of an exemplary processing element interface between a processing element 3500 and an exemplary bus gasket 3502. The exemplary processing element 3500 is designed around a G4 processor 3501 employing a 60X bus 3503. A dynamic random access memory (DRAM) controller and Input/Output (I/O) controller (GPIO), shown collectively as SIU 3505, is coupled to the bus 3503 for enabling interface of the G4 processor 3501 with a local synchronous DRAM (SDRAM) 3507 memory device and a GPIO interface 3509. The bus gasket 3502 includes a 60X bus slave 3511 Finite State Machine (FSM), an address decoder 3513, a data path and queue 3515 and a 60X bus master (Mstr) 3517 FSM, all coupled to the 60X bus 3503. The 60X bus slave 3511 detects transactions from the G4 processor 3501 on the 60X bus 3503 intended for OCN and begins construction of the request information including transaction priority information into a request queue 3519. The address decoder 3513 decodes an address asserted on the 60X bus 3503 for the transaction and determines the size of the corresponding OCN transaction and provides the destination port number (Dest) and packet size (Size) to the request queue 3519. The address decoder 3513 generates header information for each datum of a packet and provides the header to select logic 3523. The data path and queue 3515 converts one or more bus transactions on the 60X bus 3503 into packets including the data for each datum of the packets provided to the select logic 3523. The bus gasket 3502 includes an OCN master 3521 FSM, which asserts the request to the interconnect fabric 110, detects the acknowledge and/or re-order information from the interconnect fabric 110 and initiates packet transfer to the interconnect fabric 110. The select logic 3523 combines the header and data information into datums and asserts the datums of each packet and the bgn_eop sideband signal to the interconnect fabric 110 under control of the OCN master 3521.

The bus gasket 3502 includes an OCN slave 3525 FSM, which receives the fan_enable and fan_clken signals for detecting incoming datums of a packet. The fdn_eop signal is also provided to the OCN slave 3525 for determining the last datum of the received packet. The received datums are divided into data and header information provided to the data path and queue 3515 and the address decoder 3513, respectively. The data path and queue 3515 and the address decoder 3513 convert the received packet into one or more bus cycle transactions appropriate for the 60X bus 3503. The 60X bus master 3517 operates as a bus master for the 60X bus 3503 by asserting control information to provide the bus cycle transaction information to the G4 processor 3501.

Figure 36:
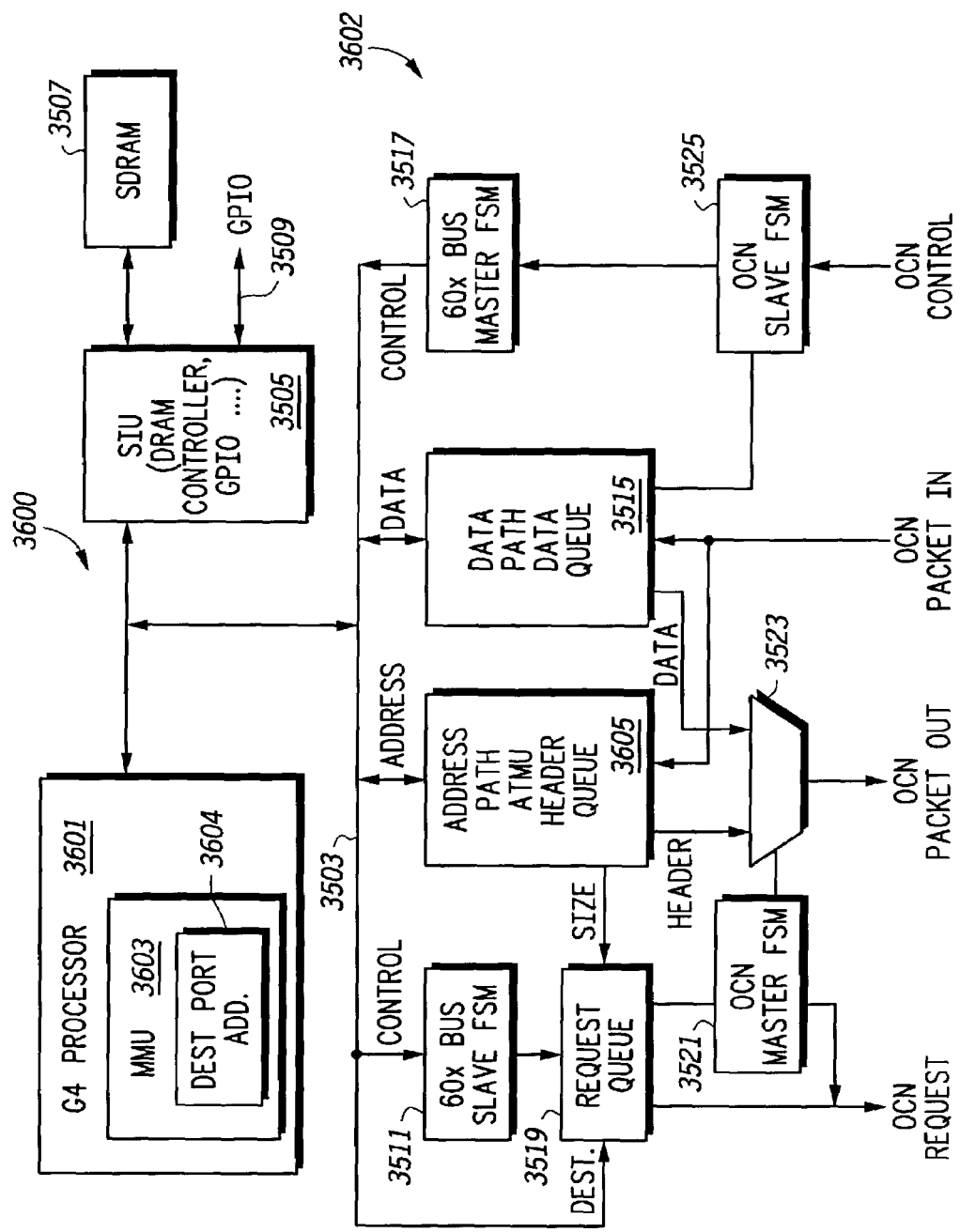
FIG. 36 is a more detailed block diagram of another exemplary processing element interface between a processing element employing an MMU and another exemplary bus gasket.

FIG. 36 is a more detailed block diagram of another exemplary processing element interface between a processing element 3600 and another exemplary bus gasket 3602. FIG. 36 is similar to FIG. 35 and similar components assume the same reference numerals. The exemplary OCN protocol specifies that the source provide the destination address to the fabric arbiter 233. A standard method for a source to determine the destination port address is with an address decoder, such as the address decoder 3513. But this standard method might otherwise require a broadcast of the address to all destinations, which would eliminate true concurrent transactions. A centralized address decode could be implemented in the OCN fabric to allow concurrent transactions, but this would require the fabric to have knowledge of the system configuration which is undesirable. Depending upon the operating frequency, the additional delay required by the address decoding may increase the latency of a transaction.

Address decoding is eliminated for a processing element that has a processor with a memory management unit (MMU). As shown, the processing element 3600 includes a G4 processor 3601 that is similar to the G4 processor 3501 except that it includes an MMU 3603. The purpose of the MMU 3603 is to translate processor transactions from one address space to another (effective address to physical address). The MMU 3603 also includes additional information about the transaction, such as cacheability, cache type (write-through versus write-back), memory coherency requirements, and endianess. The MMU 3603 includes a programmable memory 3604 that is pre-programmed with destination port addresses. By adding the destination port addresses 3604 to the MMU 3603, the destination port for each processor transaction is directly determined and provided to the 60X bus 3503 and from there to the request queue 3519 eliminating the address decode latency. The bus gasket 3602 is similar to the bus gasket 3502 except that the address decoder 3513 is replaced by an address device 3605 that does not perform address decode to the destination.

Figure 37:
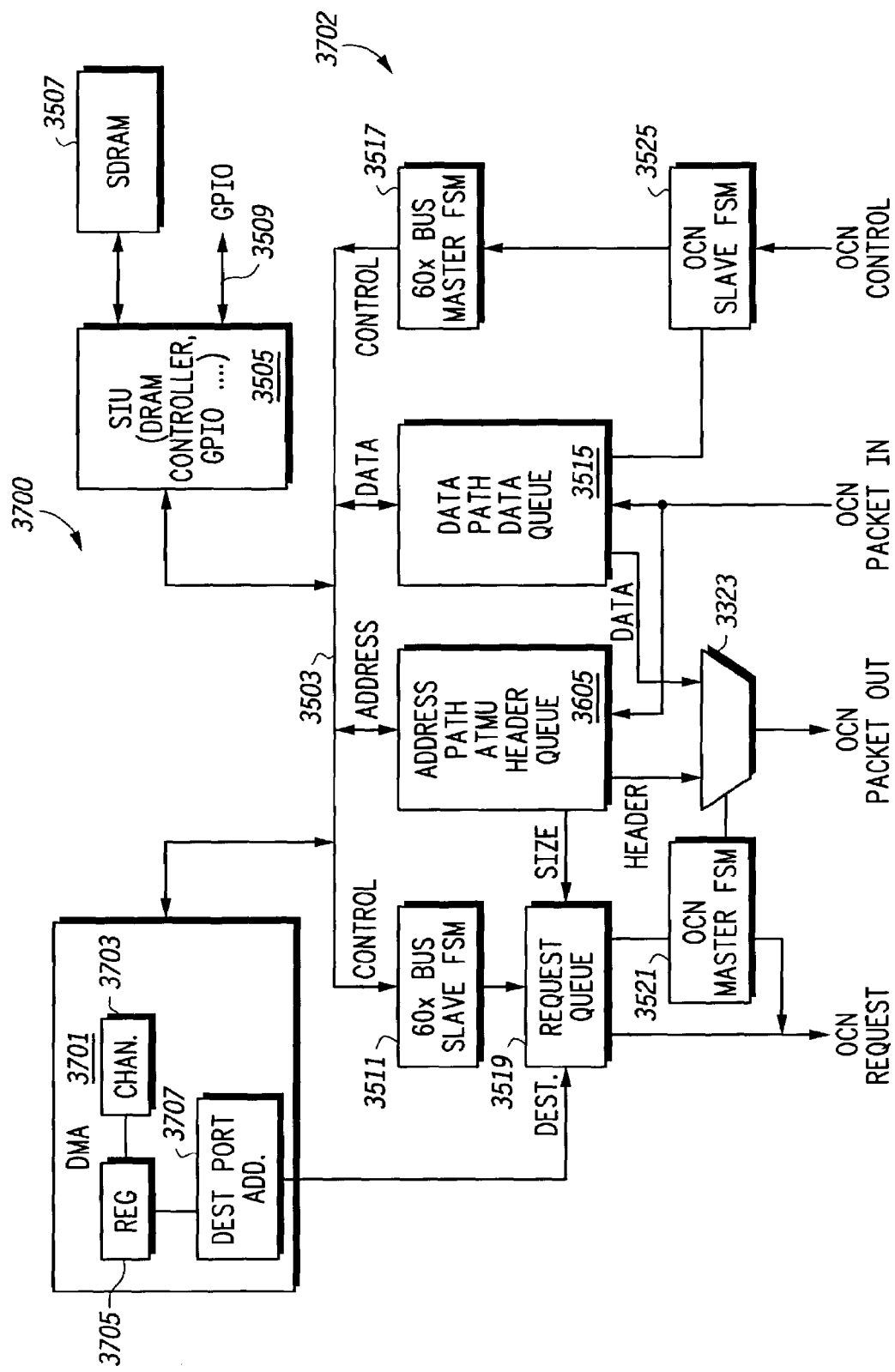
FIG. 37 is a more detailed block diagram of another exemplary processing element interface between a processing element employing a DMA device and another exemplary bus gasket.

FIG. 37 is a more detailed block diagram of another exemplary processing element interface between a processing element 3700 and another exemplary bus gasket 3702. FIG. 37 is similar to FIG. 36 and similar components assume the same reference numerals. The processing element 3700 includes a direct memory access (DMA) device 3701, which has multiple channels 3703, where each channel 3703 is configured for a block transfer. Each DMA channel 3703 has registers stored in a memory 3705, in which the channel registers 3705 are programmed with information about the transfer. This transfer information includes starting address, block transfer size, and transaction type (read or write). To eliminate the decoding of the DMA address to determine the destination port number, destination port addresses 3707 are added to the DMA channel registers in the memory. The value of the DMA destination port is directly determined and provided to the request queue 3519 eliminating the address decode latency. The address device 3605 is also employed since address decode to the destination is not necessary. The G4 processor 3501 is optional and not shown.

A logical layer protocol is described herein that defines particular packet formats and protocols for packet transactions. The logical layer contains information that may be used by the processing elements 103 to process transactions via the various embodiments of the OCN 101. The logical layer does not imply a specific physical interface. In fact, the logical layer is independent of the physical layer, so that additional messages and packet formats may be added. Also, the independence between the logical and physical layers enables the definition of different logical layers and communication formats to be defined that use the same interconnect fabric 110 and OCN interface. Furthermore, different logical layer protocols may coexist in the same system. For example, processing elements A and B may communicate according to a first protocol while processing elements C and D communicate according to a second protocol, where the first and second protocols may be completely different and even incompatible with each other. For example, the two protocols may employ different datum widths as long as the interconnect supports the largest datum width. Another processing element E may be added that communicates according to either or both of the first or second logical layer protocols. The logical layer described herein is exemplary and may be used as is, or may be modified for particular applications or even replaced with another protocol more suitable for a particular application.

The logical layer described herein defines the traditional read and write commands. In addition, higher level commands such as mailbox and doorbell messaging are defined to enable elimination of physical wires between the processing elements 103. To improve fabric utilization, the transactions across the OCN interface described herein are split, hence the name "split transactions". This means that any transaction that requires a response from the target is split into two transactions. The first transaction is a request to the target (destination) and the second transaction is the response from the target to the initiator of the request (source). Split transactions allow the fabric to be utilized while the target generates the response. The OCN protocol incorporates the use of prioritized transaction flows. Each level of transaction flow at the logical layer relates to transaction priority level at the physical layer. A transaction flow is made up of a request at priority N with at response at priority N+1. The physical layer supports at least one more level of priority than the number of levels of transaction flows at the logical layer. The OCN physical layer uses knowledge of priority to resolve dead lock conditions. New messages can easily be added as long as the source and destination understand the message definition since the logical and physical layer are independent. For a traditional bus, the messages and the physical signaling protocol are heavily dependent on each other making scalability of the traditional bus difficult.

The logical layer described herein is further described in relation to a specific physical layer implementation. The OCN logical layer supports three transaction flows using four priority levels. The transactions supported includes 45-bit local address and up to 256 bytes of data per packet. Up to 256 mailboxes per processing element 103 and up to 256 slots per mailbox are supported. Each message may include up to 16 packets in length. Packets may be sent or received out of order. Port addressing supports up to 64 processing elements 103. The logical layer provides support for user-defined packets.

The transaction protocol uses split transactions including request/response pairs. The basic operation starts when the requestor processing element sends a request packet to a completer processing element. The completer processing element performs some set of actions; if the request requires a response, the completer sends a response packet to the requester. A processing element 103 sends a request packet to another processing element 103 if it requires an activity to be carried out. The receiving processing element 103 responds with a response packet when the request has been completed. Not all requests require responses; some requests assume that the desired activity will complete properly and are generally considered "non-coherent" or "unconfirmed". A number of possible response packets can be received by a requesting processing element as further described below. Each request packet that requires a response is marked with a unique transaction identifier (ID) by the source processing element 103. The transaction ID allows responses to be easily matched to the original request when they are received by the requester. When a request has been satisfied, the associated transaction ID can be safely reused.

The transactions described herein are used for accesses to either memory space or configuration space. Examples include accesses to configuration registers, Read-Only Memory (ROM) boot code, or to noncoherent memory that does not participate in any globally shared system memory protocol. Noncoherent memory, while it does not participate in a globally shared system memory protocol, may be cached locally on a subsystem. Thus, accesses to the non-coherent memory may result in local cache snooping. Data payloads can be from 1 byte to 256 bytes in the configuration illustrated. Data payloads that are less than 8 bytes are padded and have their bytes aligned to their proper byte position within the double word, as described further below.

FIGS. 38–49 are tabular diagrams illustrating exemplary packet formats defined for the logical layer, where each packet comprises one or more datums as specified. The packets generally include an idle packet, request packets, response packets, message packets and user-defined packets. A request packet is issued by a processing element 103 that needs another processing element 103 to accomplish some activity on its behalf, such as a memory read operation. A response packet is issued by a processing element 103 when it has completed a request made to it by another processing element 103. Responses are always directed and are transmitted in the same way as request packets. The user-defined packets are reserved for user-defined functions, such as, for example, flow control or acknowledge packets. A read, write or message split transaction begins with a read, write or message request packet and completes with an appropriate response packet. An operation consists of one or more transactions, such as "read" and "write" operations. Several operations, including write operations without the requirement of a response, are completed once the request transaction is completed.

Each header datum has a maximum width of 72 bits in the configuration illustrated. The header and datum bits are further sub-divided into one or more in-band fields that provide information about the packet and/or information about the response to be received, where the bit numbers for each field are provided at the top of each Figure. Each packet includes a 2-bit CLS field containing a class value that provides a method for supporting protocols that need to define more than the number of bits in an NUSERDEFINED packet. The packet formats described herein are CLS 0 packets (class=00b). Most packets include a 4-bit TAG field that contains the transaction tag or transaction ID assigned by the transaction initiator or source. The destination's response includes the same transaction ID in its TAG field so that the source can match transaction responses with requests. Four bits allows the source to have up to 16 outstanding transactions. Since transactions might not be returned in the order requested, the transaction ID uniquely identifies each transaction by combining the source port address with the ID. The source should not have two outstanding transactions with the same transaction ID. The TAG field is not required for every packet format and is marked as reserved (rsv) for requests which do not require a response or user-defined (UD) for the NUSERDEFINED packet.

Each packet includes a 1-bit TYPE field and a 1-bit MOD field. The TYPE field contains a transaction type value which specifies whether the transaction is a request or a response. The OCN protocol defines three primary packet formats, including normal read and write packets, messaging packets and response packets. The TYPE field identifies response versus request packets. In doing so, the OCN protocol does not require a header datum for response packets. In this manner, every datum of a response with data packet can include a maximum amount of data, such as 64 bits. Such optimization decreases the response latency by one clock cycle of OCN_CLK. The TYPE field combined with the MOD field provides more complete transaction information. The MOD field is a response mode bit, which is the most-significant bit (MSB) of the REQ field, described below. When the TYPE bit is 0b, the MOD bit is WR=0b for an unconfirmed request or WR=1b for a request with a response (confirmed request). When the TYPE bit is 1b, the MOD bit indicates the response packet format with or without data. In particular, when TYPE is 1b, the MOD bit is Mod=0b for a response with data, single or multi-datum packet (confirmation) or Mod=1b for a response without data (confirmation).

FIG. 38 illustrates a non-coherent idle packet NIDLE that consists of one or more datums. The first datum 3801 is considered the header. All bits of all datums of an NIDLE packet are zero. The NIDLE packet can be sent at any time. When the destination receives an NIDLE packet, it should perform no logical operation, although it may need to perform normal end-of-operation tasks, like marking the destination packet buffer as free, marking the NIDLE packet request as completed, and asserting the corresponding bgn_ buf_rel signal to indicate that it can receive another packet.

FIGS. 39 and 40 illustrate the packet formats for read request packets. FIG. 39 shows the packet format for an NREAD_R packet, which is used by a processing element 103 to read data from the specified address. The data returned is of the size requested to complete a read operation. There are several conditions which cause the requester to request multiple transactions for a block of data as described further below in relation to packet format descriptions. If the read operation is to memory space, data is returned from the destination memory regardless of the state of any system-wide cache coherence mechanism for the specified cache line or lines, although it may cause a snoop of local processor caches. If the destination detects an error condition and can not return the requested data, an NRE-SPONSE transaction is returned indicating the error condition.

The NREAD_R request packet is TYPE 0, WR=1, and includes a 5-bit REQ field, a 2-bit PRIO field, a 6-bit SRCID field, a 9-bit SIZE field and a 42-bit PADDR (physical address) field. The REQ field contains a packet transaction request type value indicating the type of request transaction to be performed. In particular, the five bits of the REQ field are decoded to NREAD_R, NCFGREAD_R, NWRITE, NWRITE_R, etc. The PRIO field contains the transaction priority value, which defines the numeric assignment of priority of a packet to one of 4 priority levels (e.g., 00b—Lowest Priority, 01b—Medium-Low Priority, 10b—Medium-High Priority, and 11b—Highest Priority). The SRCID field contains the source port ID, which is a unique ID of the OCN port that initiated the transaction. The destination uses the source port ID to determine which port should be the target for the response. The SIZE field contains the transaction size value, which defines the size of the packet for the transaction. In the configuration shown, if the most significant bit is a 1, then the remaining 8 bits are the byte enables. Bit 0 of the SIZE field indicates the validity of byte 0 or the least significant byte, while bit 7 indicates the validity of byte 7, which is the most significant byte. If the most significant bit is a 0, then the SIZE field is an indication of the number of bytes of payload in the packet. The particular encoding of the SIZE field is not further described herein since any desired encoding scheme may be employed. It is noted, however, that the OCN size encoding may allow single packet transfers of 1, 2, 3, 4, 5, 6, 7, 8, 16, 32, 48, . . . 256 bytes of data. Such configuration supports the transfer of ATM cells (48 bytes per cell) in a single packet.

The PADDR and SIZE fields combined define a 45-bit address space in which the physical address value (PADDR) defines address bits 44 to 3 and the transaction size value (SIZE) defines the least significant address bits 2–0. When all 42 bits of physical address are not used in a destination, the PADDR field can be used to carry memory-mapped transactions (ATTR) and a transaction address (ADDR) in which case the PADDR field is defined as an ATTR/ADDR field. The ATTR/ADDR field contains an address value in the destination's address space. The maximum number of bits in the address field is defined by the destination endpoint. If the destination has a 32-bit address range, then only address bits [31:3] need to carry valid addressing information; the other bits in the ATTR/ADDR field can be used to carry transaction attributes.

The ATTR/ADDR field may be either a read attribute and address field (RATTR/ADDR) or a write attribute and address field (WATTR/ADDR). Two attributes have been identified as being commonly supported for these formats including No Snoop (NS) and Prefetchable (PF). By convention, these bits are carried in the upper bits of the address field. In particular, for the RATTR/ATTR and WATTR/ATTR fields, bit 44 is the NS bit, which is 0b for a normal cache snoop transaction and 1b for a no cache snoop transaction. When NS is 1b, the memory coherence mechanisms do not see the transaction. For the RATTR/ATTR field, the PF bit is 0b when the memory being referenced is prefetchable in which case the target is permitted to read more than the number of bytes indicated by the SIZE field. The target may use the extra bytes for the next read operation. The PF bit is 1b if the memory being referenced is not prefetched, so that only the number of bytes indicated by the SIZE field are read.

FIG. 40 shows the format for an NCFGREAD_R packet, which is used by a processing element 103 to read configuration registers for purposes of system exploration, system initialization, or system configuration. The NCFGREAD_R packet includes the same CLS, TAG, TYPE, MOD, REQ, PRIO, SRCID and SIZE fields as the NREAD_R packet and is a TYPE 0, WR=1, single datum packet. The NCFGREAD_R packet does not include a PADDR field, however, but instead includes a 29-bit INDEX field that contains a configuration register index value. The configuration register index value is a pointer to a specific configuration register location that is to be read. The configuration register index value is used in a similar manner as the physical address value (PADDR) in the specification of which bytes are accessed.

FIGS. 41 and 42 illustrate the packet formats for response packets used to as responses to complete operations including read and write operations. FIG. 41 illustrates the NRESPONSE_D packet format, which is returned in response to transactions that request data to be returned and that have completed normally at the destination. The NRESPONSE_D packet is used to indicate to the requestor that the desired transaction has completed and to return data to complete read operations initiated by the NREAD_R or NCFGREAD_R read-type transaction requests. The NRESPONSE_D packet is a TYPE 1, MOD 0 packet indicating a response and having one or more datums containing data. The first NRESPONSE_D datum is the packet header and includes the CLS, TAG, TYPE and MOD fields along with a 64-bit DATA field. The DATA field contains one double-word (64 bits) of the payload data of the packet. Each subsequent datum, if included, includes a reserved field, a 1-bit ERROR field, a 1-bit INV field and the 64-bit DATA field. The ERROR field contains an error bit that is set to 1b (asserted) when there is a packet transfer error and that is otherwise set to 0b. Once the error bit is asserted, it is asserted in all remaining packet datums of the packet. The ERROR field appears in the second and higher datums of a multi-datum packet. If the source bus gasket detects an error after the first datum (the packet header) is sent to the OCN fabric, then the error bit may be asserted. When a destination receives a datum with the error bit asserted, the destination discards the packet and the destination should log an error. The INV field contains an invalid data bit that is set to 1b (asserted) when a datum contains invalid data and that is set to 0b otherwise. When a packet is being sent in EOP arbitration mode, the INV field appears in the second and higher datums of a multi-datum packet. The source may use the INV field to avoid underrun situations when sending a packet in EOP arbitration mode.

FIG. 42 illustrates the NRESPONSE packet format which returns information about the completion of a request without data. The NRESPONSE packet can be returned in response to any of the request type transactions that require a response. The NRESPONSE packet includes the CLS, TAG, TYPE and MOD fields and is a TYPE 1, MOD=1 packet defining a response without data. The NRESPONSE packet further includes a 2-bit RSPTYPE response type field and a 16-bit STATUS field. The RSPTYPE field indicates the type of response that is being returned, including normal, error or retry. In a specific configuration, the encoding of the RSPTYPE field is 00b for a normal completion, 10b for an error indication and 11b for a retry indication. The retry indication is only valid for NMESSAGE_R and NDOORBELL_R message transaction types in the configuration illustrated. The error indication denotes that an unrecoverable error was detected. The error condition is described using the STATUS field. The STATUS field defines the response status for a response without data, and is used to pass information about the response type. It is especially useful with error and retry response types. For an error response type, the STATUS field may be used to indicate the type of error condition. The retry response type is only used in response to a message transaction. In the message transaction case, the STATUS field may be used to return buffer status information or other messaging unit information. The NRESPONSE packet may be returned to complete any read-type transaction in which the target encountered an unrecoverable error and could not complete the transaction.

FIGS. 43, 44 and 45 illustrate the formats for write request packets. FIG. 43 illustrates the NWRITE packet format, which is used by a processing element 103 that needs to write data to a specified address. The NWRITE transaction allows multiple double word, double word, word, half word and byte writes with properly padded and aligned (to the 8-byte boundary) data payload. The write size and alignment for these transactions may be specified in a similar manner as the transaction size encoding of the SIZE field. Non-contiguous byte writes are not supported in the configuration illustrated. It is the requestor's responsibility to break up a write into multiple transactions if the bytes are not contiguous. The requestor also breaks a write into multiple transactions depending on the alignment and number of bytes in the block. Data alignment is further described below. NWRITE transactions are non-coherent (without response) and do not receive response packets, so there is no notification to the sender when the transaction has completed at the destination. If the NWRITE is to memory space, data is written to the destination memory regardless of the state of any system-wide cache coherence mechanism for the specified cache line or lines, although it may cause a snoop of local processor caches.

The NWRITE packet includes two or more datums. The first datum includes the CLS, TYPE, MOD, REQ, PRIO, SIZE and ATTR/ADDR fields used in a similar manner as previously described, except that the SIZE field contains the number of bytes of data to be written to the destination and thus corresponds to the overall size of the packet (although it does not define the packet size as previously defined). The NWRITE packet is a TYPE 0, WR=0 packet. The TAG field is not used since there is no response and matching responses with requests is not necessary. Subsequent datums include the ERROR field, the INV field and the 64-bit DATA field to carry the data to be written.

FIG. 44 illustrates the NWRITE_R packet format, which is similar to the NWRITE packet format except that the destination must return an NRESPONSE packet to notify the sender that the write completed at the destination. The SRCID and TAG fields are included to identify the transaction and the target for the response since a response is requested. Subsequent datums, if any, are substantially identical to the subsequent datums of the NWRITE packet. The NWRITE_R and NRESPONSE operation is useful for guaranteeing read-after-write and write-after-write ordering through a system that can re-order transactions and for enforcing other required system behaviors.

FIG. 45 illustrates the NCFGWRITE_R packet format, which is similar to the NWRITE_R packet format but is intended to perform configuration updates. The ATTR/ADDR field is replaced with the 29-bit INDEX field. The NCFGWRITE_R packet is useful for writing configuration registers, where the INDEX field is used as a pointer to a specific register location. The destination responds with an NRESPONSE packet to complete a configuration write operation initiated by an NCFGWRITE_R packet.

FIG. 46 illustrates the NMESSAGE_R data message packet format. The data message operation, consisting of the NMESSAGE_R and NRESPONSE transactions, is used by a processing element's message-passing support logic and/or hardware to send a data message to other processing elements 103. A data message operation may consist of up to 16 individual NMESSAGE_R transactions. The message-passing mailbox memory is only accessible by the local processing element 103 since these transactions do not participate in the coherence protocol.

The first NMESSAGE_R datum includes the CLS, TAG, TYPE, MOD, REQ, PRIO, SRCID and SIZE fields and identifies a TYPE 0, WR=1 packet. Additional datums include the ERROR, INV and DATA fields. The first datum of the NMESSAGE_R packet further includes MLEN, MSIZE, MSEG, MBOX and MSLOT fields. The 5-bit MLEN field contains a message length value that indicates the total number of NMESSAGE_R packets that make up the full message. The 4-bit MSEG field contains a segment value that specifies which packet of a full message is being transmitted in the particular transaction. Since a message may contain multiple packets, the segment value specifies the packet number of the total number of packets, so that the segment value ranges from 1 to the message length value. The 8-bit MB0X field contains a mailbox address that specifies which mailbox within a bus gasket 107 is the target of the data message. The 8-bit MSLOT field contains a slot number within a mailbox where the packet is delivered. The MSLOT field allows the receipt of multiple concurrent data messages from the same source to the same mailbox. The 6-bit MSIZE field contains a standard size value that specifies the data size (e.g., number of bytes) of all of the packets except possibly the last packet in the data message. The standard size value is useful for determining the location the data should be written to when packets are received out of order.

The information in the first NMESSAGE_R datum enables the message-passing hardware of the recipient processing element 103 to calculate the destination memory address of the data location to which the data should be placed. In the configuration illustrated, an NMESSAGE_R packet should be aligned to a double-word boundary. A data message that is sub-double word or is not double-word-aligned must be handled in software in the overlying message protocol. The message-passing hardware may also snoop the caching hierarchy of the local processing element 103 when writing destination memory if the mailbox memory is defined as being cacheable by that processing element 103.

FIG. 47 illustrates the format for the NDOORBELL_R doorbell message packet. A doorbell message operation, consisting of the NDOORBELL_R and NRESPONSE transactions, is used by one processing element 103 to send a very short message with no data payload to another processing element 103. The NDOORBELL_R packet includes a single datum including the CLS, TAG, TYPE, MOD, REQ, PRIO and SRCID fields that identifies a TYPE 0, WR=1 packet. The NDOORBELL_R packet further includes a 32-bit INFO field that contains doorbell information, which is user-defined information related to a doorbell event. The INFO field may be used, for example, to identify the type and source of the event which caused the doorbell message to be generated. The INFO field is software defined and can be used for any desired purpose. A processing element 103 that receives a doorbell packet takes the packet and puts it in a doorbell message queue within the processing element 103. This queue may be implemented in hardware or in local memory. The doorbell message handling hardware behavior is similar to that of the message-passing mailbox hardware. The local processor is expected to read the queue to determine the sending processing element 103, to read the INFO field and to determine what action to take based on that information. An exemplary use of the doorbell message operation is for in-band interrupt support so that processing elements 103 can send interrupts to each other.

FIGS. 48 and 49 illustrate the packet formats used for user-defined operations. The NUSERDEFINED packet format shown in FIG. 48 is a TYPE 0, WR=0 packet reserved for user-defined functions (e.g., flow control). The first datum of the NUSERDEFINED packet includes the CLS, TAG, TYPE, MOD and REQ fields and a 59-bit USER_DEFINED field. Subsequent datums may be included in the NUSERDEFINED packet, where all bits are entirely user defined. NUSERDEFINED transactions do not receive response packets. The NUSERDEFINED_D packet format shown in FIG. 49 is a TYPE 0, WR=1 packet reserved for user-defined functions. NUSERDEFINED_D packets are similar to the NUSERDEFINED packets except that NUSERDEFINED_D transactions receive response packets. The response packet may be either NRESPONSE or the NRESPONSE D packets.

Additional packet types may be described. For example, atomic (read-modify-write) operations in memory space are contemplated, including NATOMIC_CLR_R, NATOMIC_DEC_R, NATOMIC_INC_R, and NATOMIC_SET_R, for example. If the read operation is to memory space, data is returned from the destination memory regardless of the state of any system-wide cache coherence mechanism for the specified cache line or lines, although it may cause a snoop of local processor caches in the coherence domain of the memory controller. If the destination detects an error condition and can not return the requested data, the NRESPONSE transaction is returned indication the error condition. Atomic read operations are typically implemented in high-performance memory controllers to help a processor implement synchronization mechanisms like mutexes and semaphores.

The NATOMIC_CLR_R packet is a read-modify-write operation, which reads an aligned (4-byte, 2-byte, or 1-byte) scalar value from a memory-mapped location in a completer processing element's memory space. A read value is returned to the requestor. After reading the location, each byte that was read is written. The operation is atomic in that the completer guarantees that no intervening operation occurs between the read and the write subsequent read of the location will return the written value. The NATOMIC_DEC_R packet is a read-modify-write operation. It reads an aligned (4-byte, 2-byte, or 1-byte) scalar value from a memory-mapped location in the completer's memory space. The read value is returned to the requestor. After reading the location, the scalar value is decremented by 1 and written back to the same memory location. The operation is atomic in that the completer guarantees that no intervening operation occurs between the read and the write. A subsequent read of the location returns the decremented value. The NATOMIC_INC_R packet is a read-modify-write operation. It reads an aligned (4-byte, 2-byte, or 1-byte) scalar value from a memory-mapped location in the completer's memory space. The read value is returned to the requester. After reading the location, the scalar value is incremented by 1 and written back to the same memory location. The operation is atomic in that the completer guarantees that no intervening operation occurs between the read and the write. A subsequent read of the location will return the incremented value. The NATOMIC_SET_R packet is a read-modify-write operation. It reads an aligned (4-byte, 2-byte, or 1-byte) scalar value from a memory-mapped location in the completer's memory space. The read value is returned to the requestor. After reading the location, the bytes are written. The operation is atomic in that the completer guarantees that no intervening operation occurs between the read and the write. A subsequent read of the location will return the written value.

The packet formats of the exemplary logical layer described herein are medium independent so that the system interconnect can be optimized for a particular application. Additional fields may be added where desired for different transport and physical layer requirements. Addresses are aligned to a 64-bit boundary. The three least significant bits of the address, in conjunction with the transaction size, specify the valid byte lanes for the transaction. Read and write request addresses are aligned to any specifiable byte boundary. Data payloads start at address 0 and proceed linearly through the address space. Data payloads less than 64 bits are padded and properly aligned within the 64-bit boundary. Noncontiguous operations that would ordinarily require a byte mask are not supported. A sending device that requires this behavior must break the operation into multiple request packets. A request must not be made such that the address and size refer to memory locations that are assigned to two different processing elements 103. The result of such operation is undefined. A request must not be made such that the address refers to memory locations not assigned to the requested destination processing element 103. The result of such operation may be aliasing and memory corruption.

All data and addresses are assumed to be big-endian (versus little-endian) in the exemplary configuration illustrate. All data payloads are 64-bit aligned big-endian data payloads. This means that the OCN interface to devices that are little-endian perform byte-swapping at the output to properly format a data payload for the receiving device and also perform byte-swapping at the input when receiving a data payload. An example of such a device is an OCN to PCI bridge. Operations that specify data quantities that are less that 8 bytes have the bytes aligned to their proper byte position within the big-endian double word.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A network, comprising:
a plurality of bus gaskets, each coupled between a corresponding one of a plurality of processing elements and a corresponding one of a plurality of ports, each bus gasket converting between processing element transactions and packets in which each packet includes at least one datum and is configured according to a logical layer protocol; and
a physical layer interface, including an arbiter and an interconnect coupled to each port, that is independent of packet datum contents in which it operates according to a consistent port interface protocol to transfer packet datums between selected ones of the plurality of ports.

2. The network of claim 1, wherein the plurality of bus gaskets includes a first bus gasket which configures packets according to a first logical layer protocol and a second bus gasket which configures packets according to a second logical layer protocol, and wherein the first and second logical layer protocols are different from each other.

3. The network of claim 2, wherein the first and second logical layer protocols define packet datum formats that are incompatible with each other.

4. The network of claim 3, further comprising a third bus gasket which is configured to communicate according to either one of the first and second logical layer protocols.

5. The network of claim 1, wherein at least one processor element operates according to a processor element protocol and wherein a corresponding bus gasket converts between the processor element protocol and the logical layer protocol.

6. The network of claim 1, further comprising first and second processing elements coupled to first and second bus gaskets, wherein the first and second processing elements are of different types resulting in a heterogeneous system, and wherein the first and second bus gaskets convert between different processor element protocols and the logical layer protocol.

7. The network of claim 1, wherein the logical layer protocol defines a plurality of packet formats including read transactions, write transactions and data message transactions.

8. The network of claim 7, wherein the data message transactions includes a doorbell transaction that may be employed to deliver an interrupt to another processing element.

9. The network of claim 1, wherein each bus gasket defines a plurality of priority levels, wherein a priority level is assigned to each packet, wherein a priority level is provided to the arbiter in a request transaction for each packet, and wherein the arbiter uses the priority levels during an arbitration process.

10. The network of claim 9, wherein a packet size indicative of the number of datums is provided to the arbiter in the request transaction.

11. The network of claim 10, wherein the logical layer protocol defines split transactions in which a response transaction is conducted from a destination port bus gasket in response to a request transaction from a source port bus gasket and in which the response transaction has a higher priority level than the corresponding request transaction.

12. The network of claim 1, wherein a datum width of the physical layer interface interconnect is determined independent of the logical layer protocol.

13. An integrated circuit (IC), comprising:
a plurality of processing elements;
a plurality of bus gaskets, each coupled between a corresponding one of the processing elements and one of a plurality of ports, each port including an arbitration interface and a data interface configured according to a consistent port interface protocol for sending and receiving packets;
wherein each packet includes one or more datums which are configured according to a selected logical layer protocol which is independent of the consistent port interface protocol; and a physical layer interface, including an arbiter coupled to the arbitration interfaces of each port and an interconnect coupled to the arbiter and to the data interfaces of each port, which operates according to the consistent port interface to transfer packet datums between ports.

14. The IC of claim 13, wherein:
the interconnect includes selectable data paths between the data interfaces of each of the plurality of ports; and
wherein the arbiter arbitrates among transaction requests, sends acknowledgements, enables data paths in the interconnect between source and destination ports, and sends data enable signals to the data interfaces of destination ports.

15. The IC of claim 13, wherein the plurality of bus gaskets includes first and second bus gaskets that operate according to a first logical layer protocol and third and fourth bus gaskets that operate according to a second logical layer protocol which is different than the first logical layer protocol, and wherein the consistent port interface protocol is independent of the first and second logical layer protocols.

16. The IC of claim 15, wherein the first and second logical layer protocols define packet datum formats that are incompatible with each other.

17. The IC of claim 16, wherein at least one of the first, second, third and fourth bus gaskets is configured to communicate according to both of the first and second logical layer protocols.

18. The IC of claim 13, wherein at least two of the processing elements coupled to the plurality of bus gaskets are of the different types resulting in a heterogeneous system.

19. The IC of claim 13, wherein at least one of the logical layer protocols defines a plurality of packet formats including read transactions, write transactions and data message transactions.

20. The IC of claim 19, wherein the data message transactions includes a doorbell transaction that may be employed to deliver an interrupt to another processing element.

21. The IC of claim 13, wherein each selected logical layer protocol supports a plurality of priority levels, wherein a priority level is assigned to each packet, wherein a priority level is provided to the arbiter via the arbitration interface in a request transaction for each packet, and wherein the arbiter uses the priority levels during an arbitration process.

22. The IC of claim 21, wherein a packet size indicative of the number of datums is provided to the arbiter via the arbitration interface in the request transaction.

23. The IC of claim 22, wherein at least one selected logical layer protocol defines split transactions in which a response transaction is conducted from a destination port bus gasket in response to a request transaction from a source port bus gasket and in which the response transaction has a higher priority level than the corresponding request transaction.

24. The IC of claim 13, wherein a datum width of the physical layer interface interconnect is selected independent of each selected logical layer protocol.

25. A network platform for enabling communication among a plurality of processing elements, each processing element coupled to a separate processing interface operating according to a selected processor interface protocol, the network platform comprising:
a plurality of processor interface means, each for coupling to a corresponding processing element, and each configured to operate according to a selected packet-based logical layer protocol, wherein each packet includes one or more same-sized datums and is formatted according to the selected logical layer protocol;
a plurality of port interfaces, each coupled to a corresponding processor interface means and a corresponding one of a plurality of ports, each for sending packets by submitting transaction requests and receiving acknowledgements via a port arbitration interface, for providing datums of acknowledged packets via a port data interface and for receiving datums from the data interface in response to receiving a data enable signal;
an interconnect, coupled to a data interface of each of the plurality of ports, that includes selectable data paths; and
arbiter means, coupled to the interconnect means and to each of the plurality of ports, that arbitrates among transaction requests and provides acknowledgements via port arbitration interfaces, that controls the interconnect means to enable a data path from a source port to a destination port for each acknowledged transaction, and that provides data enable signals to the destination port as datums arrive;
wherein the port interfaces, the interconnect and the arbiter means collectively operate according to a consistent port interface protocol which is independent of the selected logical layer protocol.

26. The network platform of claim 25, wherein the plurality of interface means includes a first interface means operating according to a first logical layer protocol and a second interface means operating according to a second logical layer protocol, and wherein the consistent port interface protocol is independent of the first and second logical layer protocols.

* * * * *